(12) United States Patent  
Tanaka et al.

(10) Patent No.: US 6,873,820 B2  
(45) Date of Patent: Mar. 29, 2005

(54) IMAGE FORMING APPARATUS

(75) Inventors: Mitsugu Tanaka, Shizuoka (JP);
Eiichiro Teshima, Kanagawa (JP);
Takuya Mukaibara, Shizuoka (JP);
Tadashi Okanishi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 10/106,212

(22) Filed: Mar. 27, 2002

(65) Prior Publication Data

US 2002/0149805 A1 Oct. 17, 2002

(30) Foreign Application Priority Data

Mar. 30, 2001 (JP) ........................................ 2001-100043  
Apr. 23, 2001 (JP) ........................................ 2001-123945  
Jun. 26, 2001 (JP) ........................................ 2001-192530  
Jun. 29, 2001 (JP) ........................................ 2001-199312

(51) Int. Cl.[7] .................................................. G03G 15/14
(52) U.S. Cl. .................. 399/395; 399/394; 400/579
(58) Field of Search ............................ 399/395, 394; 400/579, 582, 624; 271/259, 258.01, 227, 226, 261; 347/218; 226/20, 27

(56) References Cited

U.S. PATENT DOCUMENTS

| 4,956,662 | A | * | 9/1990 | Sakai et al. ................. 355/403 |
| 5,078,384 | A | * | 1/1992 | Moore ......................... 271/228 |
| 5,084,626 | A | * | 1/1992 | Dragon et al. ............... 250/548 |
| 5,156,391 | A | * | 10/1992 | Roller ......................... 271/227 |
| 5,443,257 | A | * | 8/1995 | Sakamori ..................... 271/228 |
| 5,478,066 | A | | 12/1995 | Yoshida et al. ............... 271/12 |
| 5,794,176 | A | * | 8/1998 | Milillo ........................ 702/150 |
| 5,848,344 | A | * | 12/1998 | Milillo et al. ............... 399/395 |
| 5,887,996 | A | * | 3/1999 | Castelli et al. .............. 400/579 |
| 6,305,856 | B1 | * | 10/2001 | Miyazaki ..................... 400/279 |
| 6,356,735 | B1 | * | 3/2002 | Hozumi ....................... 399/395 |

* cited by examiner

Primary Examiner—Anthony H. Nguyen  
(74) Attorney, Agent, or Firm—Fitzpatrick, Cella, Harper & Scinto

(57) ABSTRACT

In an image forming apparatus and an image forming method, a paper position aberration detecting sensor including a light emitting element and a light receiving element is disposed in the paper conveying path of the image forming apparatus. The amount of paper position aberration in paper conveyance is detected by a counter, and on the basis of the result of the detection, a CPU controls the writing start position of a printed image.

18 Claims, 42 Drawing Sheets

REFLECTIVE RECEIVING TYPE

DIRECT RECEIVING TYPE

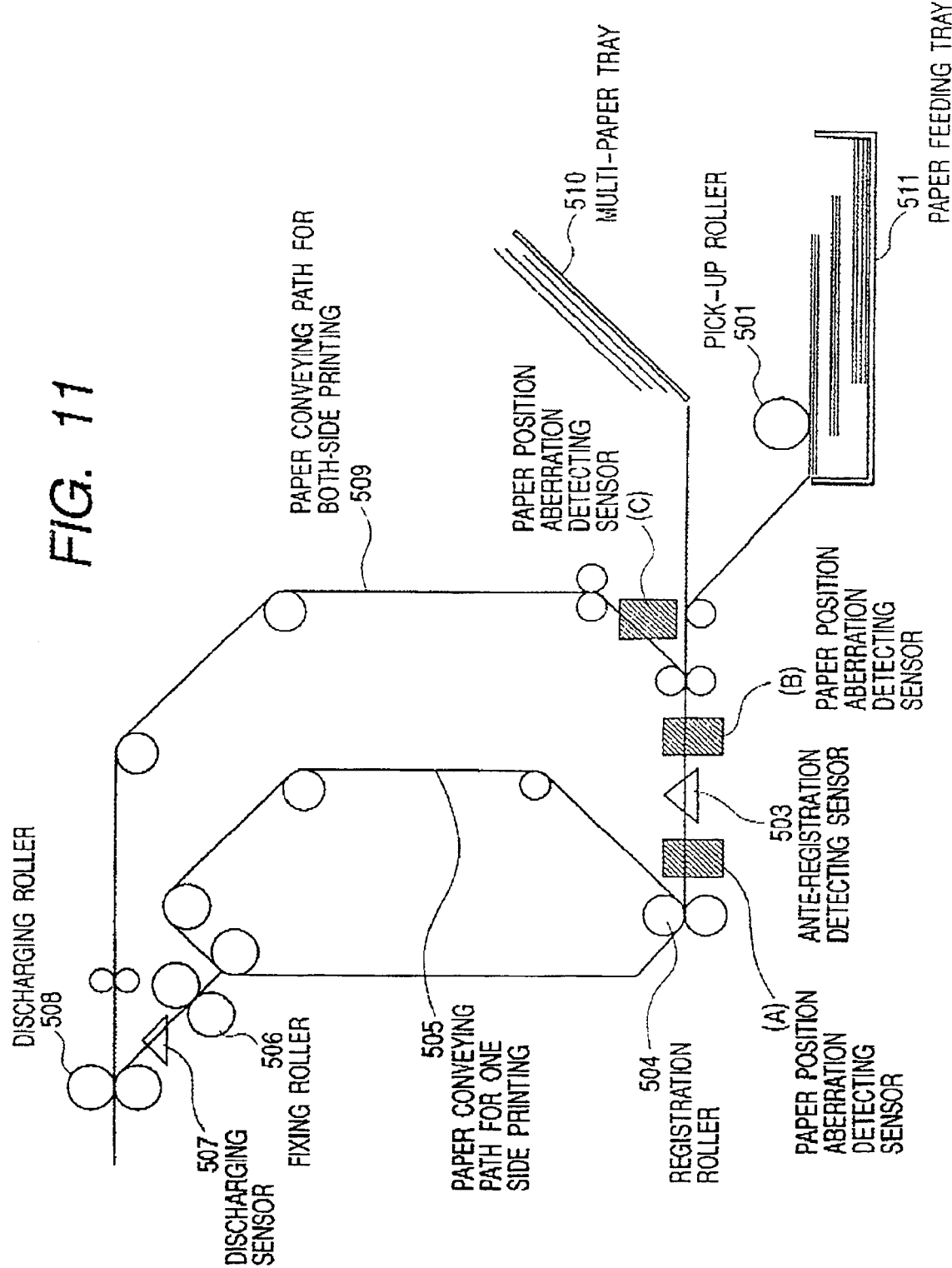

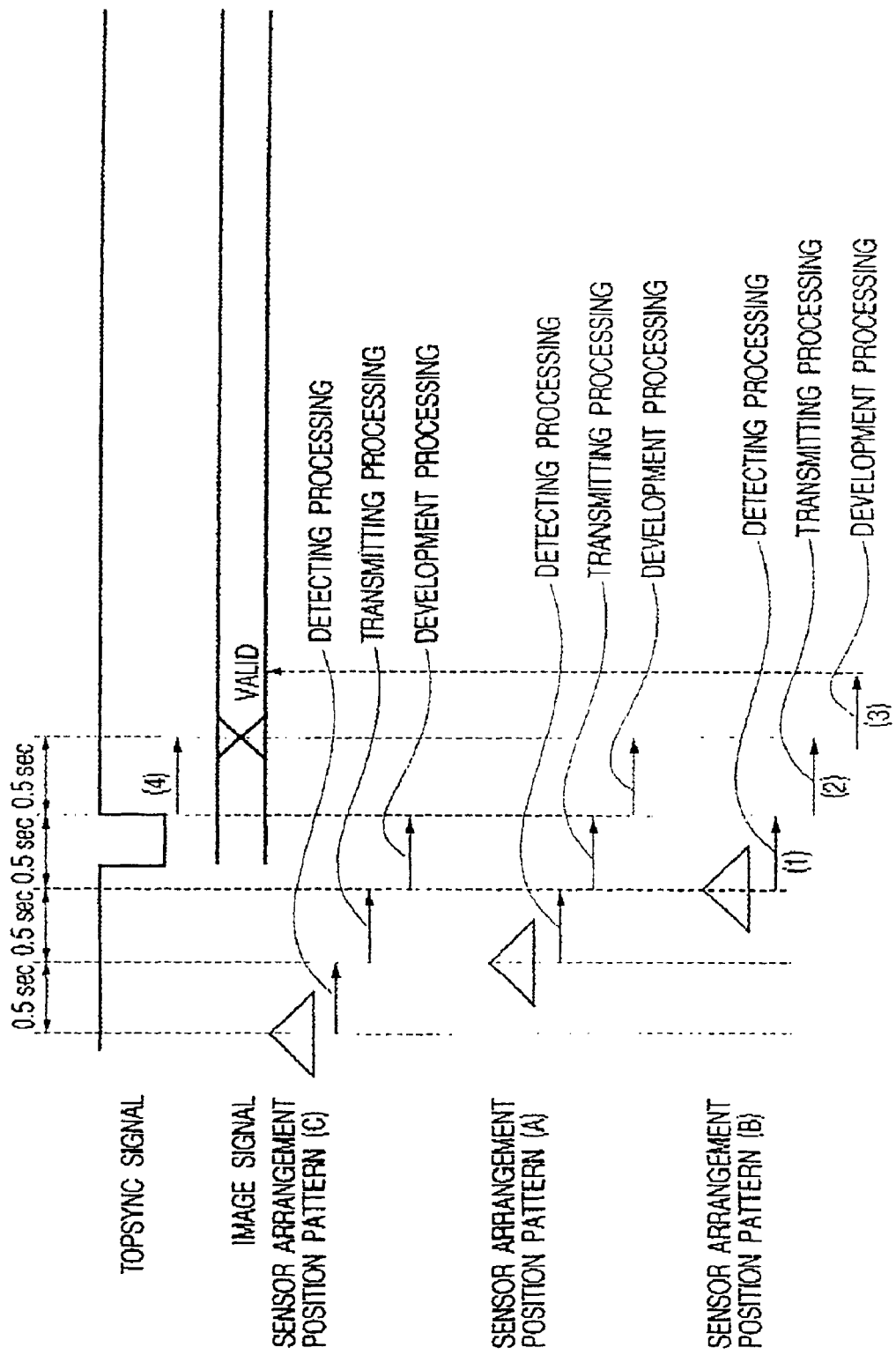

IN THE CASE OF A3

IN THE CASE OF A4

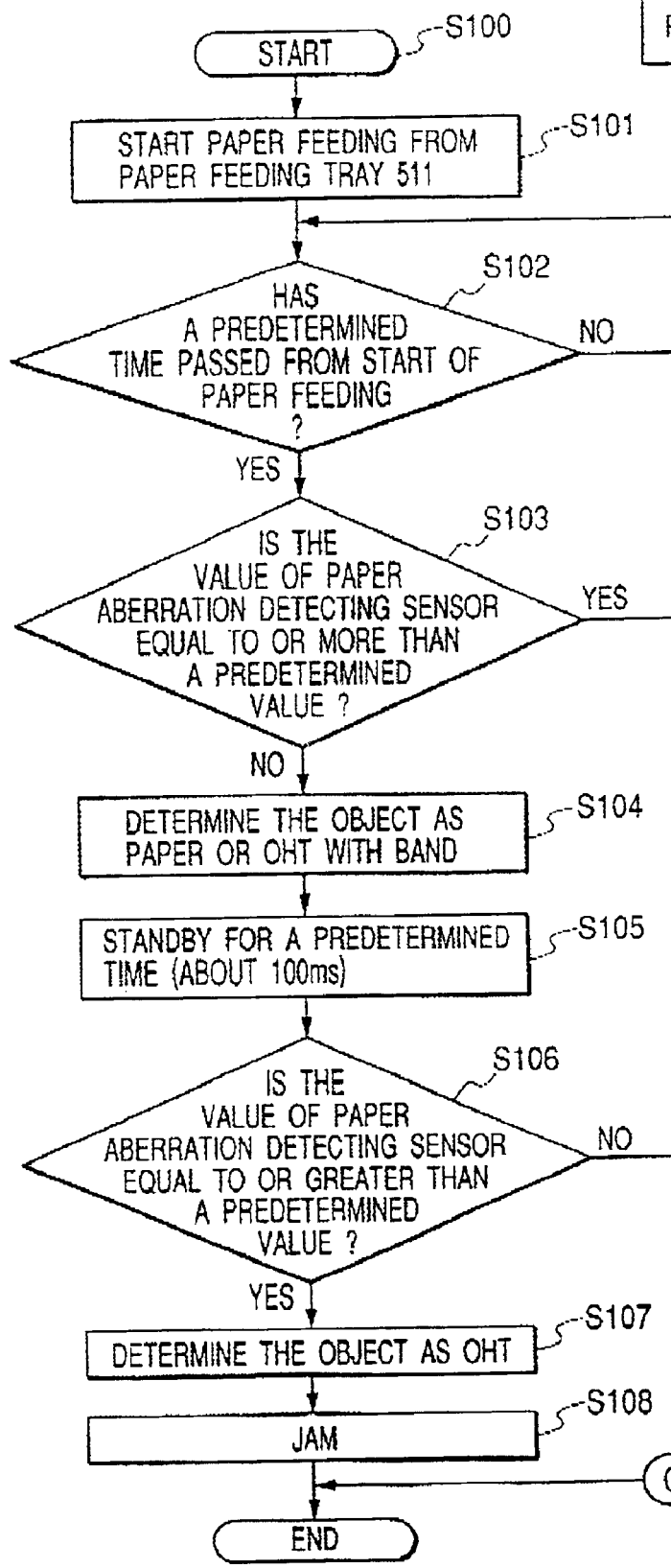
FIG. 27A
FIG. 27
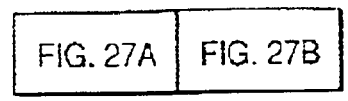

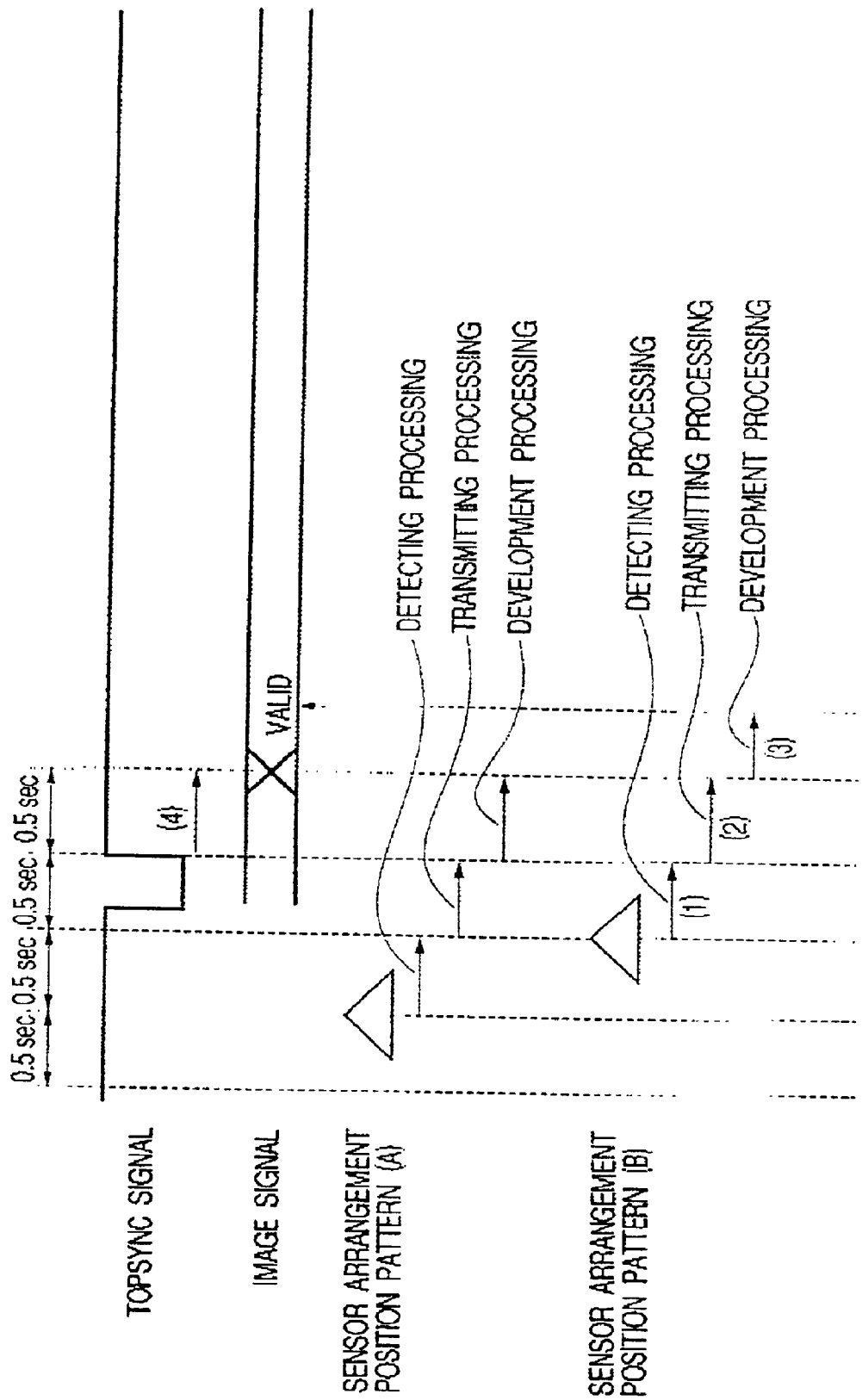

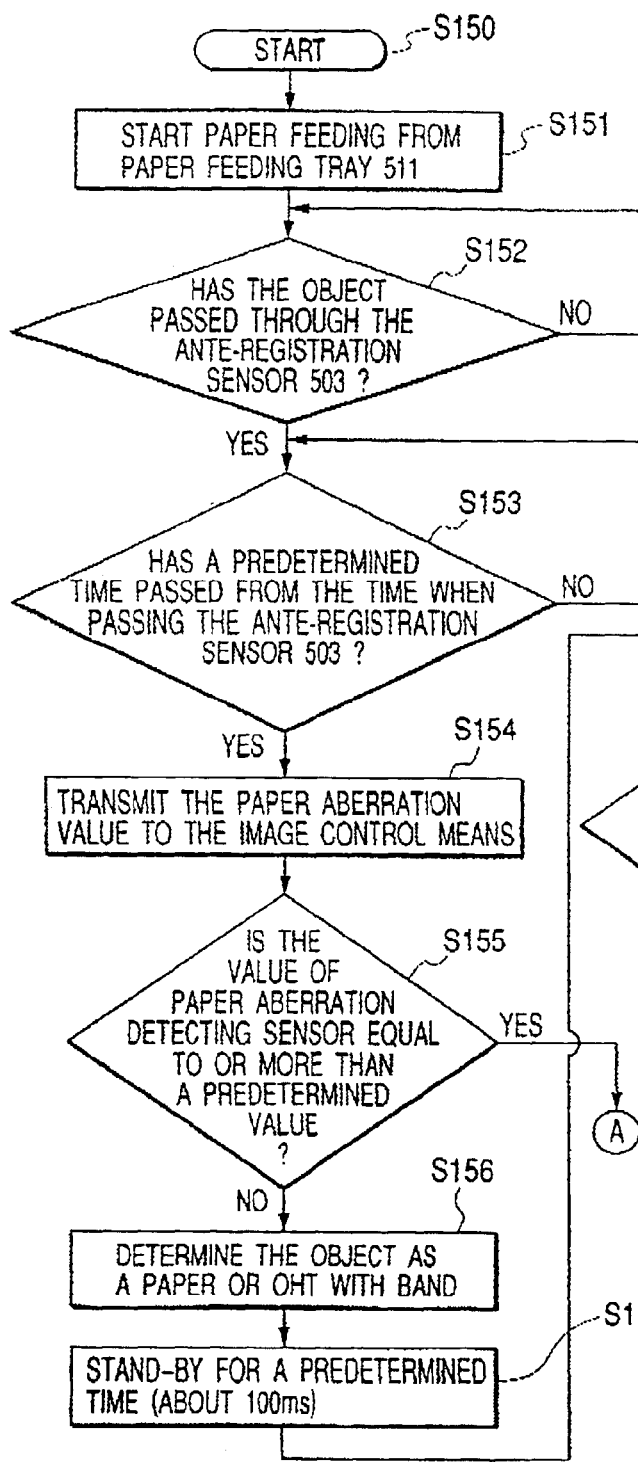
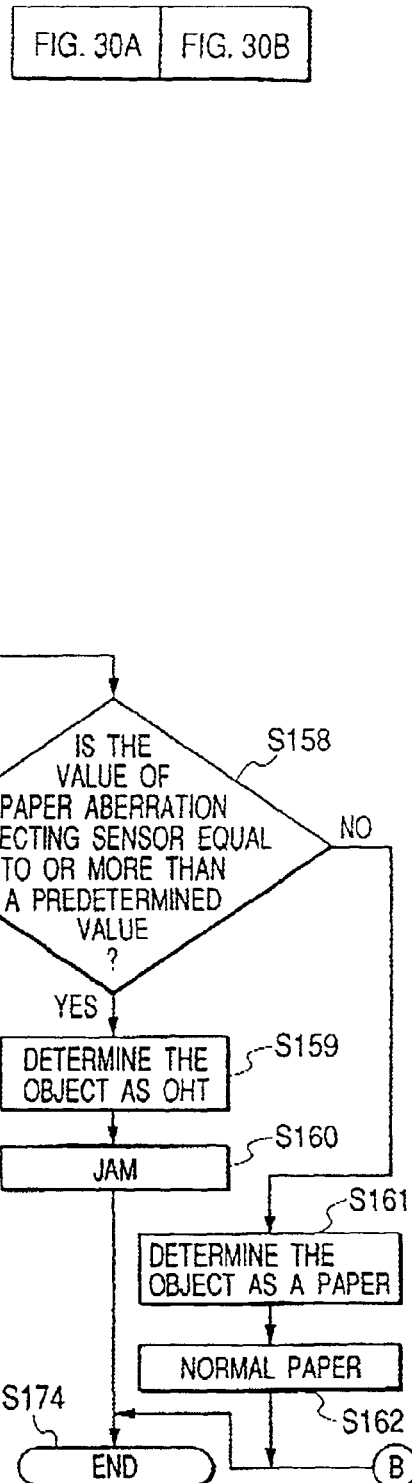
FIG. 30A
FIG. 30
| FIG. 30A | FIG. 30B |

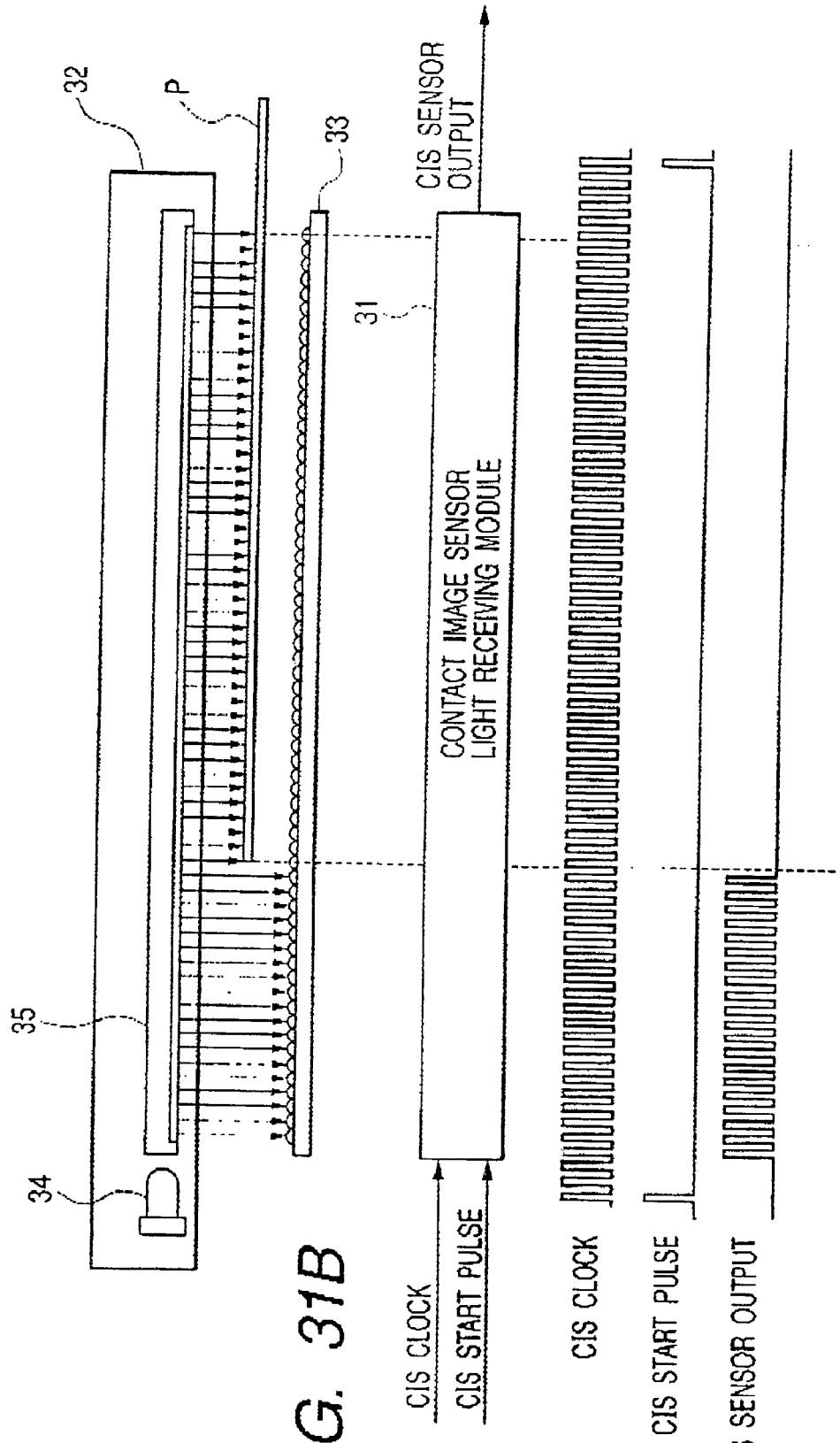

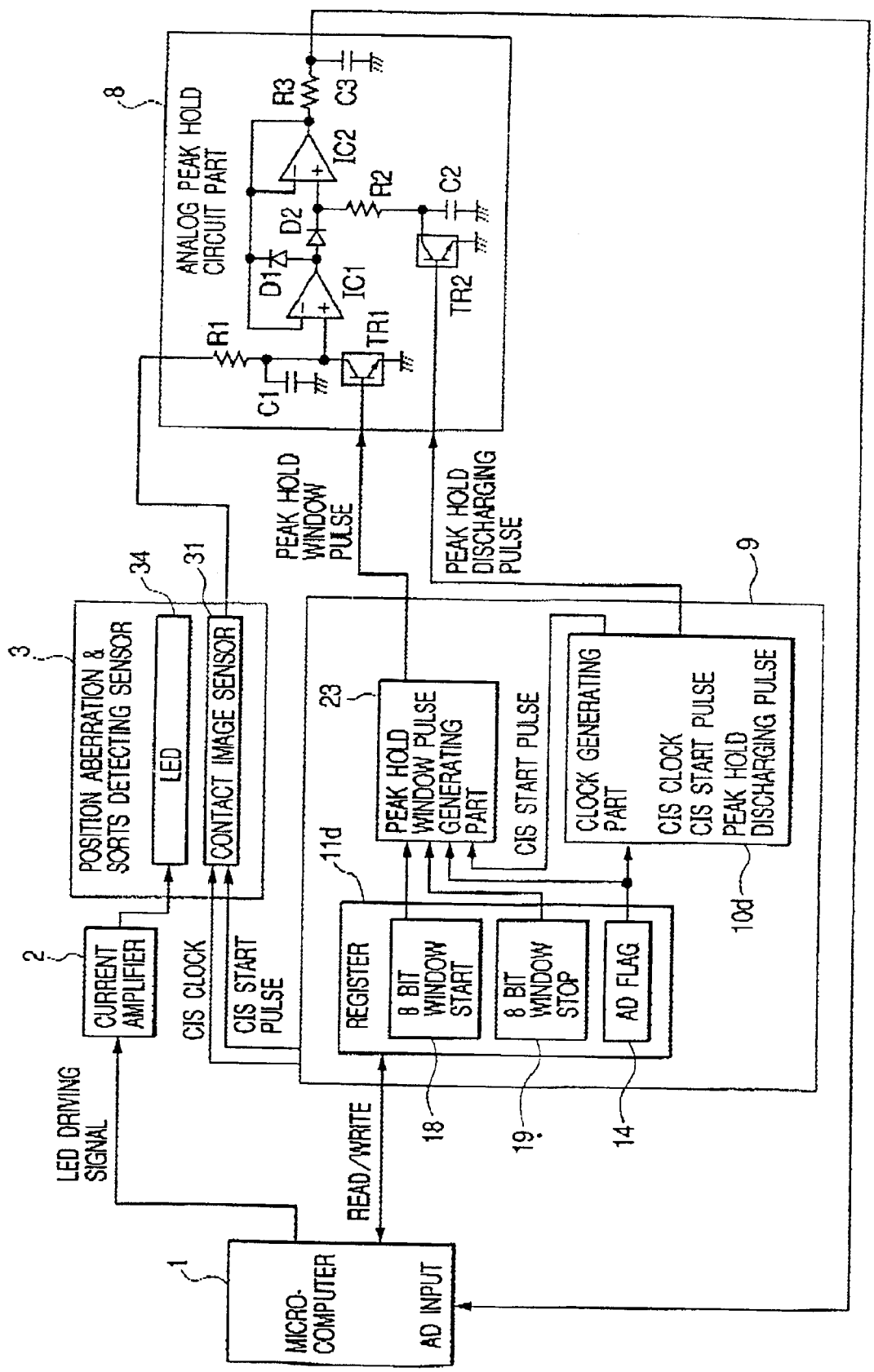

IMAGE FORMING APPARATUS

BACKGROUND OF THE INVENTION

1. Field of the Invention

This invention relates to various image forming apparatuses such as a printer, a copying machine and a facsimile apparatus for forming images on sheets, and particularly to the detection of the position aberration of sheet conveyance and the sorts (or types) of the sheets therein.

2. Related Background Art

In an image forming apparatus, when conveying a sheet from a cassette, a tray or the like to an image forming portion, the sheet deviates in a main scanning direction (a direction perpendicular to the conveying direction of the sheet), and an image formed deviates relative to the sheet.

Also, in recent years, image formation on various recording mediums such as not only normal paper (opaque recording medium) but also overhead transparencies (OHT: transparent recording medium) and glossy paper (glossy recording medium) as sheets on which images are to be formed has been required.

SUMMARY OF THE INVENTION

It is an object of the present invention to solve the above-noted problems.

It is another object to provide an image forming apparatus comprising:

conveying means for conveying a sheet;

an optical sensor comprising a plurality of light receiving elements and for optically detecting the end portion of the sheet in a direction perpendicular to the conveying direction of the sheet;

aberration amount determining means for determining the aberration amount of the sheet in the perpendicular direction on the basis of an output signal from the optical sensor; and sheet sort (type) determining means for determining the sort (type) of the sheet on the basis of the output signal from the optical sensor.

It is still another object of the present invention to provide an image forming apparatus including:

conveying means for conveying a sheet;

an optical sensor for optically detecting the sheet conveyed by the conveying means; and determining means for determining on the basis of an output from the optical sensor on the sheet is an OHT with a band.

Other objects, constructions and effects of the present invention will become apparent from the following detailed description and the accompanying drawings.

BRIEF DESCRIPTION OF THE DRAWINGS

FIG. 11 is a cross-sectional view showing examples of the disposition of a paper position aberration detecting sensor in Embodiment 2.

FIG. 12 shows the processing time and the image development processing time depending on the installed position of the paper position aberration detecting sensor.

FIG. 29 shows the processing time and the image development processing time by the installed position of the paper position aberration detecting sensor.

FIGS. 31A and 31B show the arrangement relation between a sensor for detecting both of the position aberration and sort (type) of a sheet in an image forming apparatus and the sheet, and the timing of signals inputted to and outputted from the sensor.

FIG. 40 is a schematic circuit block diagram showing a construction for detecting both of the position aberration and sort (type) of a sheet in an image forming apparatus according to a fifteenth embodiment.

DESCRIPTION OF THE PREFERRED EMBODIMENTS

Some embodiments of the present invention will hereinafter be described in detail with respect to an embodiment of a color laser printer. The present invention is not restricted to the forms of the apparatus, but can also be carried out in the forms of a method by being backed up by the description of the embodiments.

(Embodiment 1)

Figure 1:
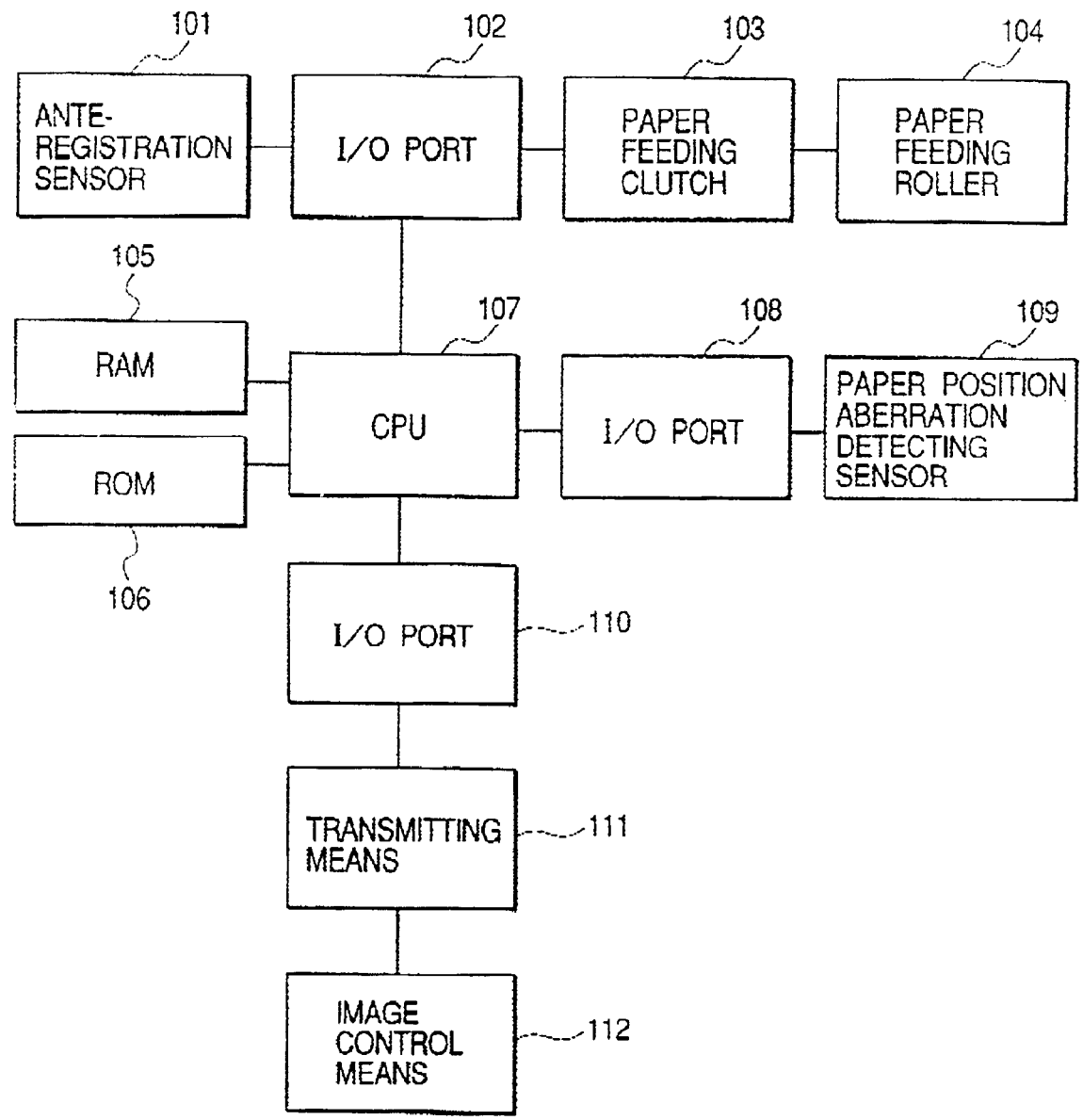
FIG. 1 is a block diagram showing the construction of a control system in Embodiment 1.

FIG. 1 is a block diagram showing the construction of the control system of a color laser printer which is Embodiment 1. In FIG. 1, the reference numeral 101 designates a sensor set before a registration roller (herein after referred to as an ante-registration sensor). That is, the ante-registration sensor implies a sensor provided immediately before the disposed position of registration rollers which will be described later, and it detects the presence or absence of fed paper detection through an I/O port 102. The reference numeral 103 denotes a paper feeding clutch for driving a paper feeding roller 104. The reference numeral 109 designates an optical sensor for detecting any paper position aberration in the main scanning direction, and it is comprised, for example, of a light emitting element and a light receiving element. The output of this optical sensor 109 is binarized by a comparator and is inputted as a detection signal to the CPU 107 through an I/O port 108. The reference numeral 105 denotes a RAM which functions as the work memory of the CPU 107. The reference numeral 106 designates a ROM storing therein a control program and a control table to be executed by the CPU 107.

In the thus constructed color laser printer (referred to also as the color laser beam printer), the amount of position aberration in a direction orthogonal to the conveying direction of the paper is calculated as the amount of feeding position aberration of the paper by the CPU on the basis of the result of the detection by the paper position aberration detecting sensor 109 for detecting the position aberration of the paper in the main scanning direction. This calculated amount of fed paper position aberration is outputted from an output port 110. The calculated value is transmitted to image control means 112 by transmitting means 111 to thereby control the writing start position of an image. Consequently, the writing start position of the image is controlled in conformity with the amount of feeding position aberration of the paper, whereby even when a paper position aberration occurs, an image can be printed at a predetermined printing position without any loss of the image.

Figure 2:
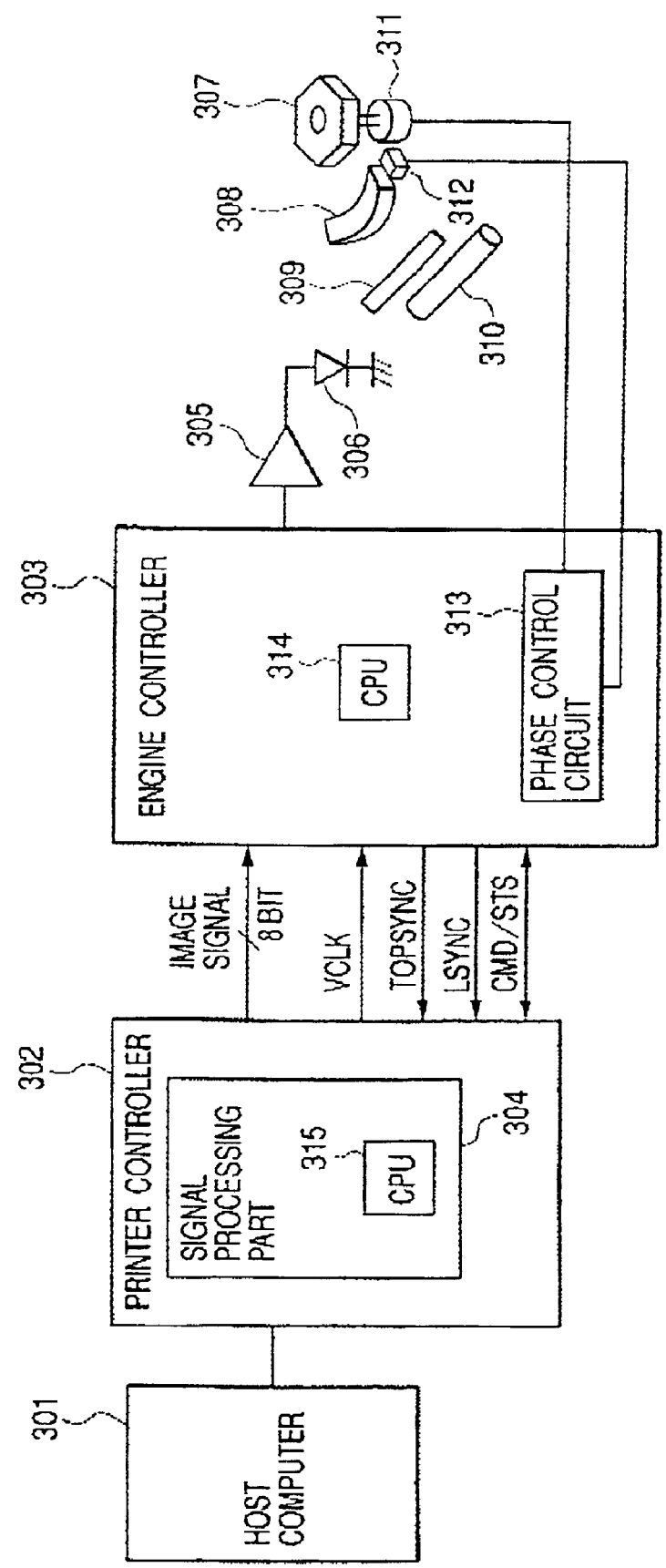
FIG. 2 is a block diagram schematically showing the construction of Embodiment 1.

The present embodiment is a color laser printer having resolution of 600 dots/inch (dpi) and effecting image recording on the basis of multivalue data in which each pixel of each color component is expressed by 8 bits, and will now be described with reference to the block diagram of FIG. 2 schematically showing the construction thereof.

As the input data of this printer, there are conceivable a color image signal (e.g. data expressed by RGB components) produced by a host computer 301, and an image signal produced by other image signal producing apparatus (such as a still image recorder) and stored in some storing medium. Therefore, the color laser printer of the present embodiment, as shown in FIG. 2, is provided with a printer controller 302 for receiving image information from the host computer 301 and generating an image signal, and a signal processing part 304 for processing the image signal.

In the description of the embodiment shown below, a color image signal sent from the host computer 301 is considered to be input data, In FIG. 2, the color laser printer is comprised of the printer controller 302 for receiving and developing the image formation of a predetermined descriptive language sent thereto from the host computer 301, and outputting it as Y, M, C and K image signals of which each color component is comprised of 8 bits (D0–D7), and an engine controller 303. Or the host computer 301 may sometimes deliver bit data of R, G, B, etc. read in by an image reader or the like as image information and in such case, the printer controller 302 processes them without interpreting them.

Besides the image signal, various control signals are given and received in the form of serial communication between the printer controller 302 and the engine controller 303. Among these signals, there is a synchronizing signal (TOPSYNC) indicative of the sub scanning direction of a page to be delivered from the engine controller 303 to the printer controller 302, and a synchronizing signal (LSYNC) in the main scanning direction. The printer controller 302 subjects the inputted image signals of R, G and B to the known masking (ground color eliminating method) process and converts them into image signals of Y, M, C and K, and thereafter makes the image signals into 8-bit signals of respective color components, and effects the conversion of the time axes of the printer controller 302 and the engine controller 303 by FiFo (Fast In Fast Out) and outputs the image signals in synchronism with a data forwarding clock (VCLK).

On the other hand, when a print starting command is delivered from the printer controller 302, the engine controller 303 starts to drive a scanner motor 311. Here, a reference clock from a reference oscillator contained in an exposing device is frequency-divided by a frequency divider, and the scanner motor 311 is rotated at a uniform speed by a phase control circuit 313 so as to make the phase difference between the frequency-divided clock and a feedback signal from the scanner motor 311 into a predetermined phase difference. For the purpose of uniform speed rotation, a conventional phase control circuit is contained in the apparatus. The rotation of the scanner motor 311 is transmitted to a polygon mirror 307, which is thus rotated at a uniform speed.

When the polygon mirror reaches steady rotation, an image signal is forwarded from the aforedescribed printer controller 302. On the basis of this image signal, an electrical signal is converted into a laser signal by an amplifier 305 and a semiconductor laser 306 emits a laser beam toward the polygon mirror 307 which is in steady rotation, and the laser beam is applied to a photosensitive drum 310 through the intermediary of the polygon mirror 307, an imaging lens 308 and a turn-back mirror 309.

Also, when the laser beam is emitted, the laser beam is detected by a detector 312 disposed on the main scanning axis, and BD signal which becomes a horizontal synchronizing signal is outputted. As a result, the photosensitive drum 310 is scanned by and exposed to the laser beam in synchronism with the BD signal, and an electrostatic latent image is formed on the photosensitive drum. The electrostatic latent image is then developed by a developing device (not shown).

On the other hand, a conveying belt is driven by a driving motor (not shown), and when the paper comes to a predetermined position, a vertical synchronizing signal (TOPSYNC) is generated from the detector. After the vertical synchronizing signal is outputted, the BD signal produced by the detector in the exposing device is made into a horizontal synchronizing signal (LSYNC), and in synchronism with the BD signal, an image signal (VDO) is sequentially delivered to the semiconductor laser 306.

Also, a CPU 314 in the engine controller 303 and a CPU 315 contained in the signal processing part 304 in the printer controller 302 effect serial communication therebetween through a CMD/STS communication line and exchange control signals with each other, and synchronize the operations of the printer controller 302 and the engine controller 303 with each other.

The printing process will now be described with reference to FIG. 3. The surface layer of the photosensitive drum 310 is of a construction in which a photoconductor is laminated on an electrically conductive substrate, and first at the charging step 401, the surface of the photosensitive drum 310 is uniformly charged. At the developing step 403, development in respective colors for visualizing an electrostatic latent image formed at the exposing step 402 is effected. A developing roller, not shown, at this developing step 403 comprises a stationary magnet and a magnetic sleeve rotated around it, and toners are charged by the friction thereof with the sleeve. A spacing of hundreds of microns is kept between the photosensitive drum 310 and the sleeve, and the toners are caused to adhere onto the photosensitive drum 310 in accordance with the electrostatic latent image formed at the exposing step 402 while being caused to fly in an alternating magnetic field in the spacing, to thereby visualize the electrostatic latent image. Thus, at the developing step 403, the visualization by the toners conforming to the electrostatic latent image is effected.

At the transferring step 404, printing paper fed from the paper feeding step 407 is brought into contact with the photosensitive drum 310, and charges opposite in polarity to the toners are imparted to the surface of the printing paper by a transfer charger, not shown, to thereby transfer the toners on the photosensitive drum 310 to the printing paper. The photosensitive drum 310 from which the visible image has been transferred has any residual toners thereon removed by a cleaning blade, not shown, at the cleaning step 406.

Next, at the separating step 405, the printing paper to which the toner image has been transferred at the aforedescribed transferring step 404 is separated from the transferring step 404. At the fixing step 408, the toners transferred onto the printing paper are subjected to heating and fixing by a fixing roller, not shown, and the toner image is fixed on the printing paper, whereafter at the discharging step 409, the printing paper on which the toner image has been fixed is discharged.

A paper conveying path and a conveying path for both-side printing will now be described with reference to a cross-sectional view shown in FIG. 4. Paper set on a paper feeding tray 511 is directed to the conveying path by a pick-up roller 501. Next, the leading edge of the paper is detected by an ante-registration detecting sensor 503. As previously described, printing is effected on the front surface of the detected paper in accordance with the conveying path 505, and via the fixing roller 506, the trailing edge of the paper is detected by a discharging sensor 507. When printing is also to be effected on the back surface of the paper thereafter, the paper on the front surface of which the image has been fixed is passed along a conveying path 509 for both-side printing in a switch-back fashion by discharging rollers 508 being reversal-driven, and the paper is again conveyed to a conveying path overlapping the conveying path from the paper feeding tray 511. The paper is again supplied from this conveying path, it is possible to print on the back surface of the paper.

Figure 4:
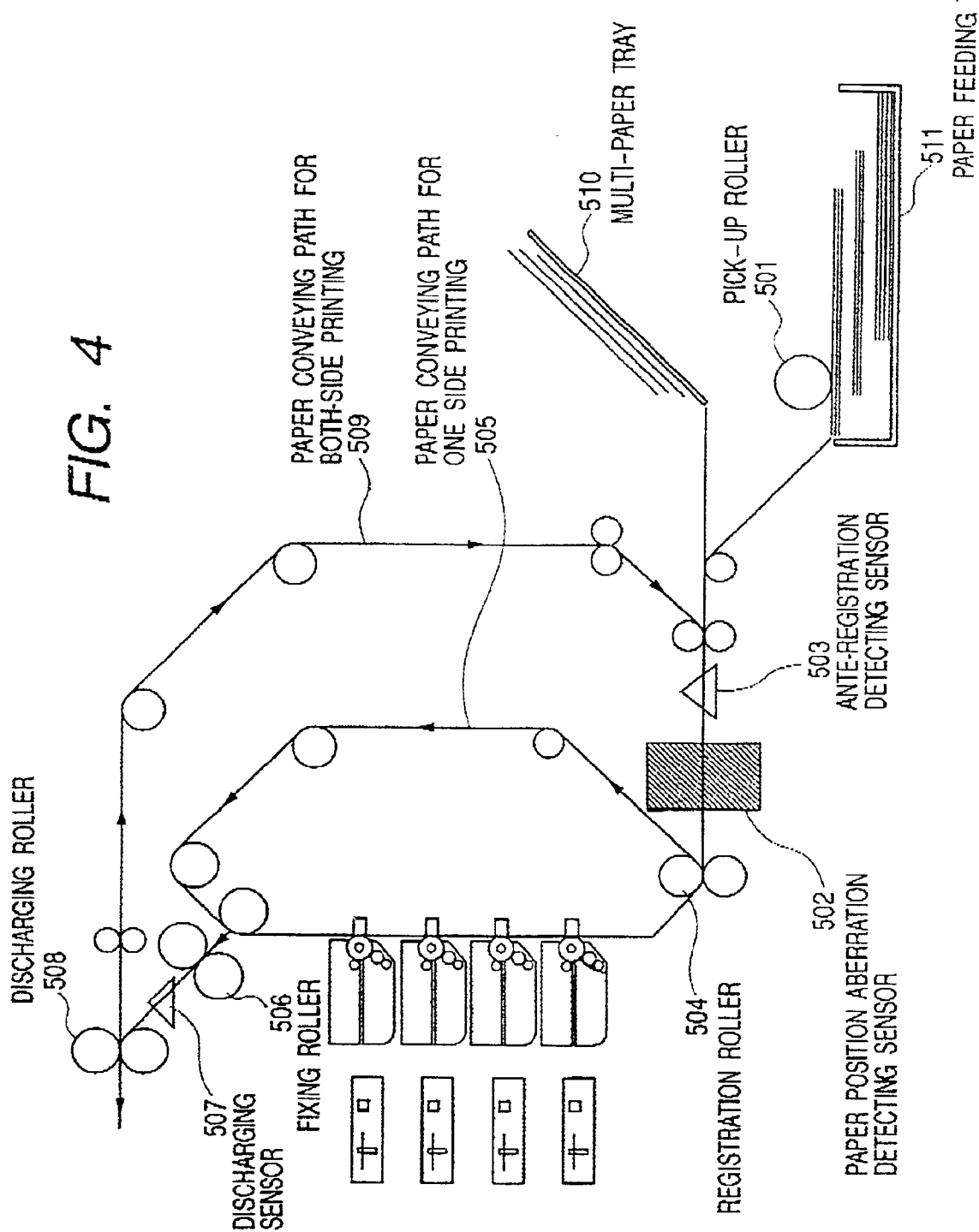
FIG. 4 is a cross-sectional view showing a paper conveying path and a conveying path for both-side printing.

While in FIG. 4, there is shown an example in which in a predetermined conveying path, a paper position aberration detecting sensor 502 for detecting the aberration of the paper in the main scanning direction is disposed downstream of the ante-registration detecting sensor 503 to thereby detect the amount of position aberration of the paper, the present invention is not restricted to this positional relationship.

Figure 5:
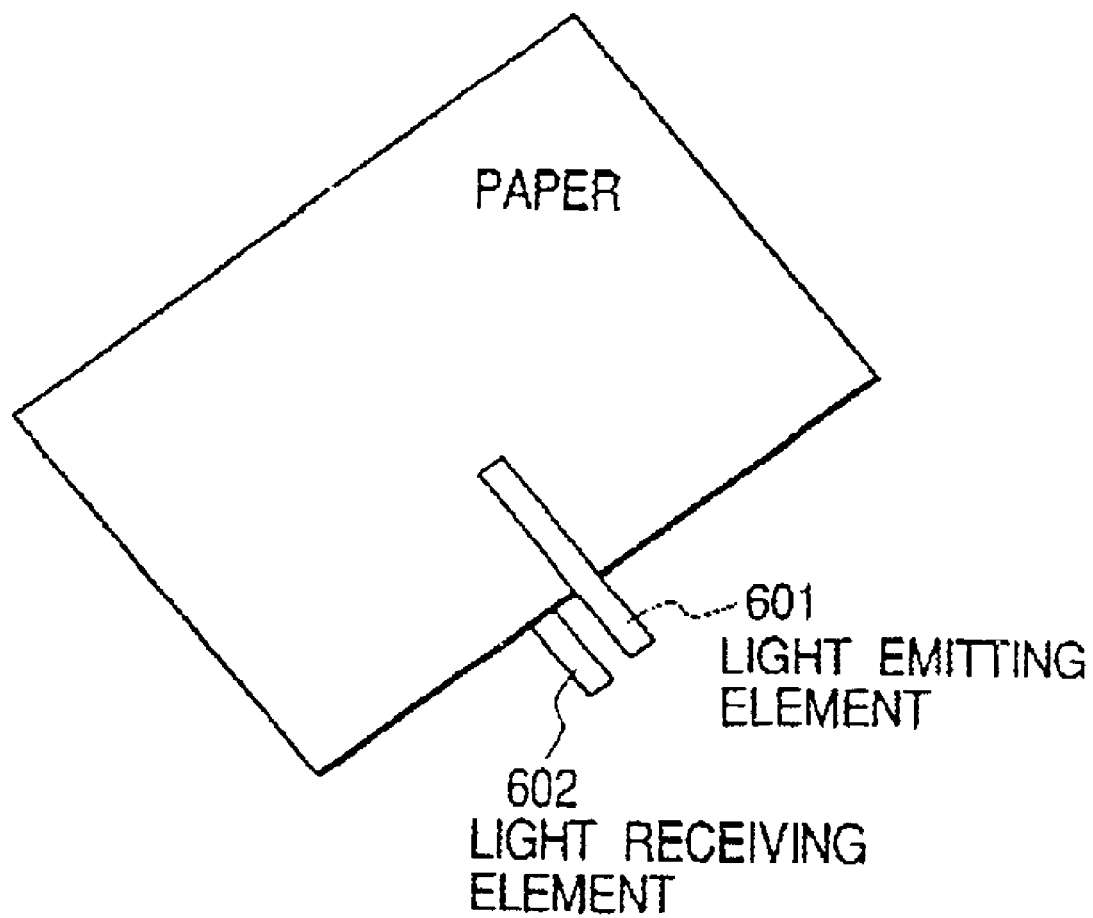
FIG. 5 is an illustration of a paper end detecting mechanism.
Figure 6:
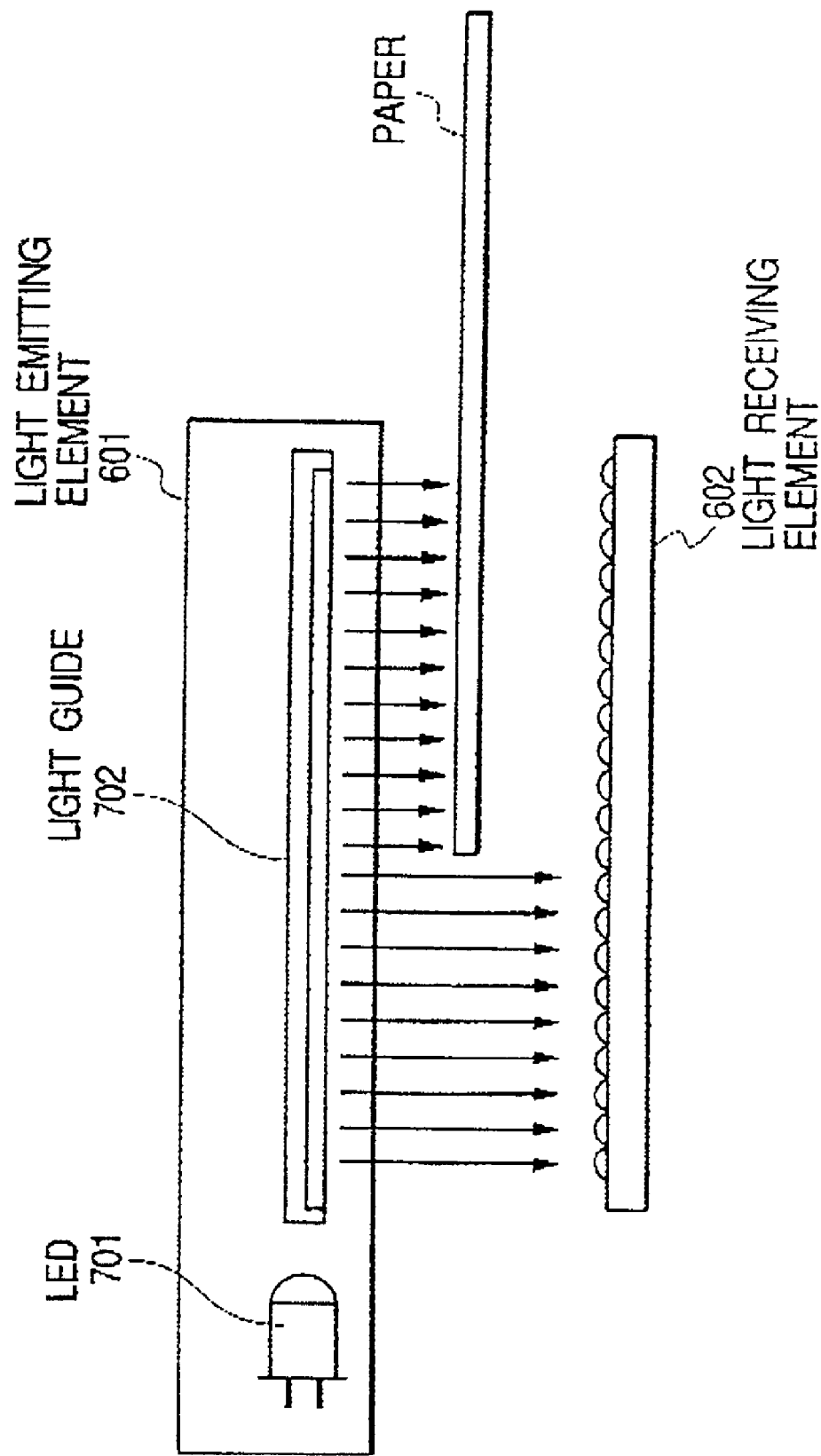
FIG. 6 shows the construction of a paper position aberration detecting sensor.

FIG. 5 is a schematic perspective view illustrating a paper end detecting mechanism mounted at a location on the paper conveying path which corresponds to one end portion of the paper. As shown in FIG. 5, a light emitting element 601 which provides a light emitting part and a light receiving element 602 which provides a light receiving part are disposed on the upper portion and lower portion, respectively, of that portion of the paper conveying path which corresponds to one end of the paper. Thus, the end of the paper exists between the light emitting element 601 and the light receiving element 602. Alternatively, the light emitting element 601 and the light receiving element 602 may be vertically conversely disposed, FIG. 6 shows the construction of the paper position aberration detecting sensor. The light emitting element 601, as shown, is comprised of a light guide 702 for uniformly applying light from an LED 701. Also, the light receiving element 602 is generally comprised of a photodiode. The output of the light receiving side is switched "OFF" when the light from the light emitting side is intercepted and therefore, depending on the position of the end of the paper, the position at which "ON" and "OFF" are changed over varies. By detecting the output from this sensor, it is possible to detect the end of the paper.

Figure 7:
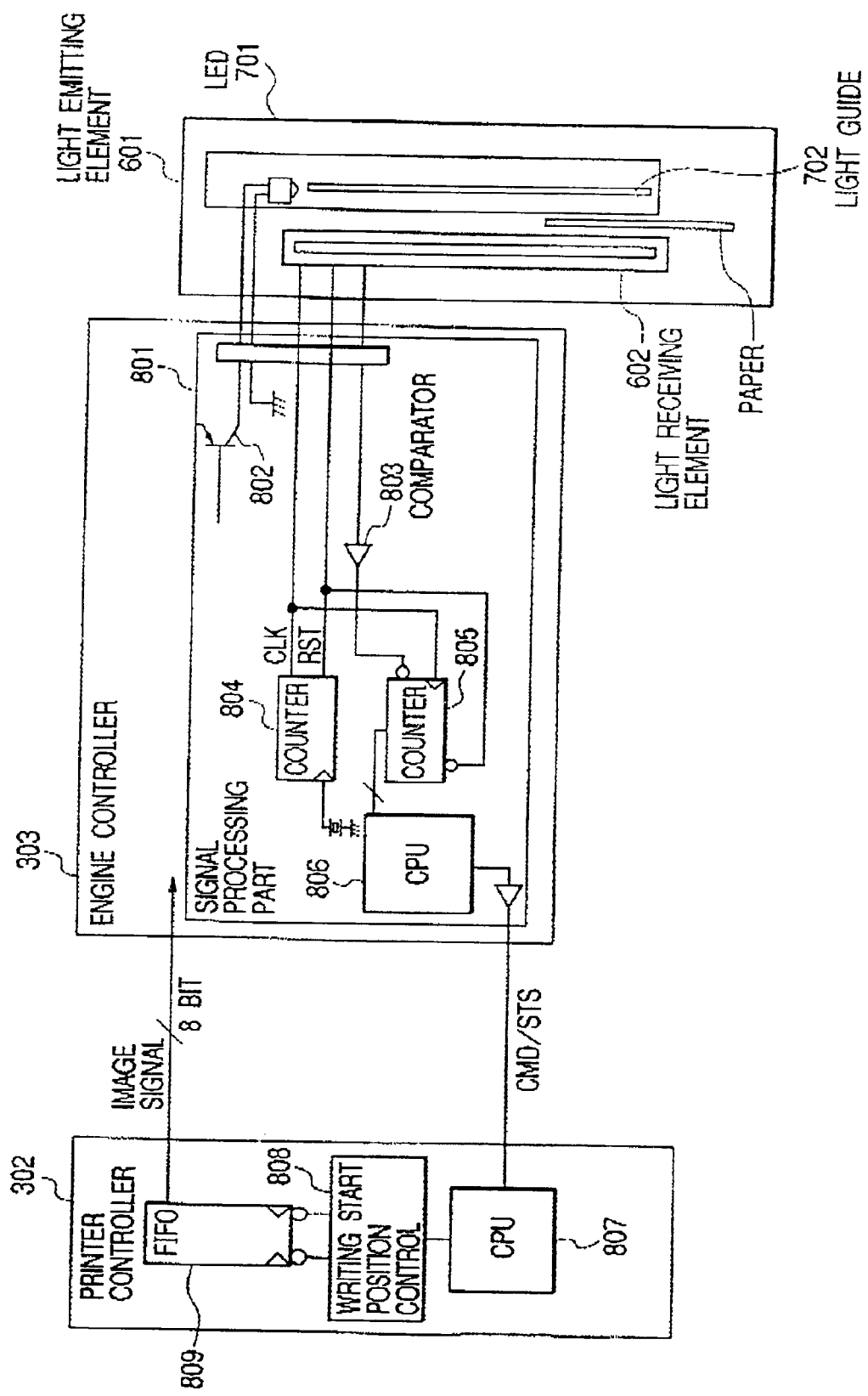
FIG. 7 is a block diagram showing the construction of a paper end detecting circuit.

FIG. 7 shows a specific circuit block diagram of paper end detection. In a predetermined signal processing part 801 provided in the engine controller 303 shown in this figure, when paper is fed, a transistor 802 is turned "ON", whereby the LED 701 of FIG. 6 is driven and light is uniformly applied to the light guide 702 and the light is received by the light receiving surface of the light receiving element 602.

In FIG. 7, CLK which is a reference signal is frequency-divided by a predetermined counter 804 and a CLK signal and a reset signal are delivered to the light receiving element 602. When a predetermined signal is delivered, there can be obtained a predetermined analog signal of which the output level fluctuates depending on whether the light is intercepted by the paper. The analog signal is inputted to the comparator 803 of the signal processing part 801 and is binarized by a threshold value.

Figure 8:
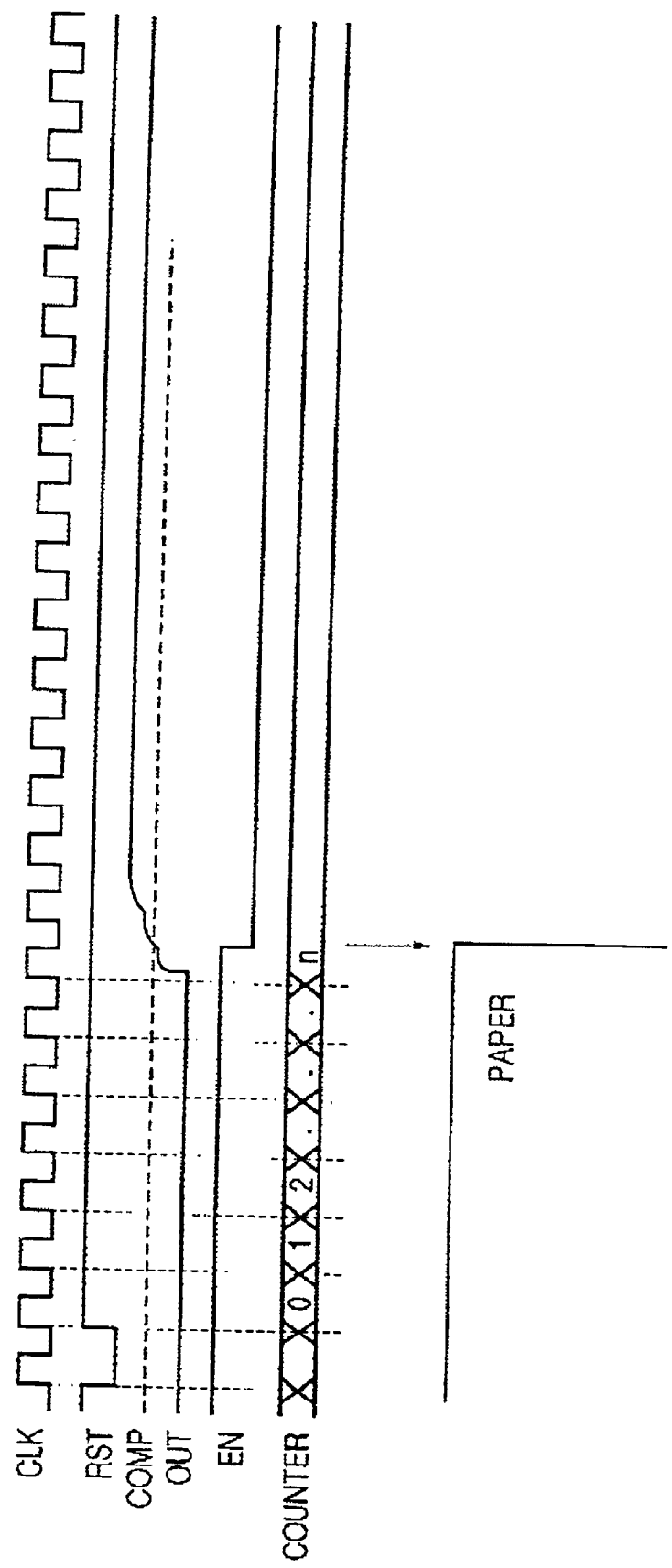
FIG. 8 shows the timing waveform of the paper end detecting circuit.

Here, the timing waveform of the paper end detecting circuit shown in FIG. 7 is shown in FIG. 8 and will be described. Here, the control of the counter 805 of FIG. 7 is effected with the logic of counting a case where the light of the light receiving surface is intercepted by the paper as an "OFF" time.

The counter 805 shown in FIG. 7 is initialized to "0" by the aforementioned reset signal. Also, signal logic H from the comparator 803 is inputted to the enable terminal of the counter 805 and therefore is counted up in synchronism with the reference signal CLK. When the signal logic from the comparator 803 becomes "L", it is held at the count value thereof in synchronism with the reference signal CLK. Here, for the sake of convenience, the counting-up operation is performed from "0" to n. Thereafter, the value calculated by this counter 805 will be again described with reference to the circuit block diagram of FIG. 7.

Here, the count value is subjected to the calculating process by a CPU 806, and the amount of position aberration of the paper is calculated, and is transmitted to a CPU 807 on the printer controller 302 side by a CMD/STS (command/status) signal. In the printer controller 302, this transmitted calculated value is received and FiFo (Fast In Fast Out) 809 for developing an image is controlled by image writing start position control 808 to thereby control the image writing start position, and the image is delivered to the engine controller 303.

Figure 9C:
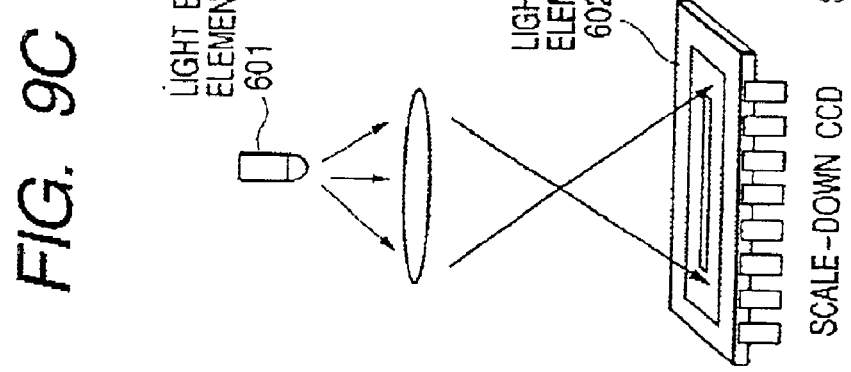
FIGS. 9A, 9B and 9C show some examples of the paper position aberration detecting sensor.
Figure 9B:
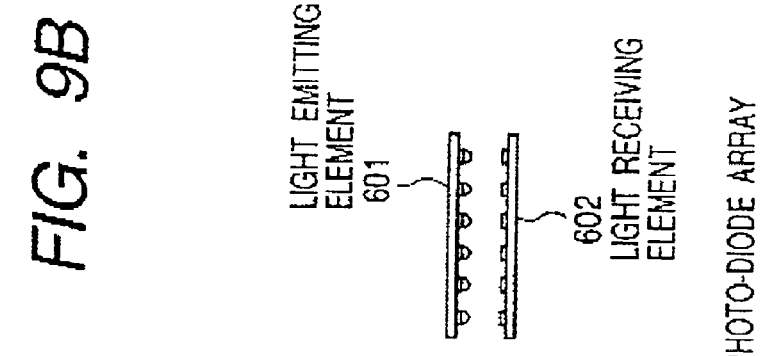
Figure 9A:
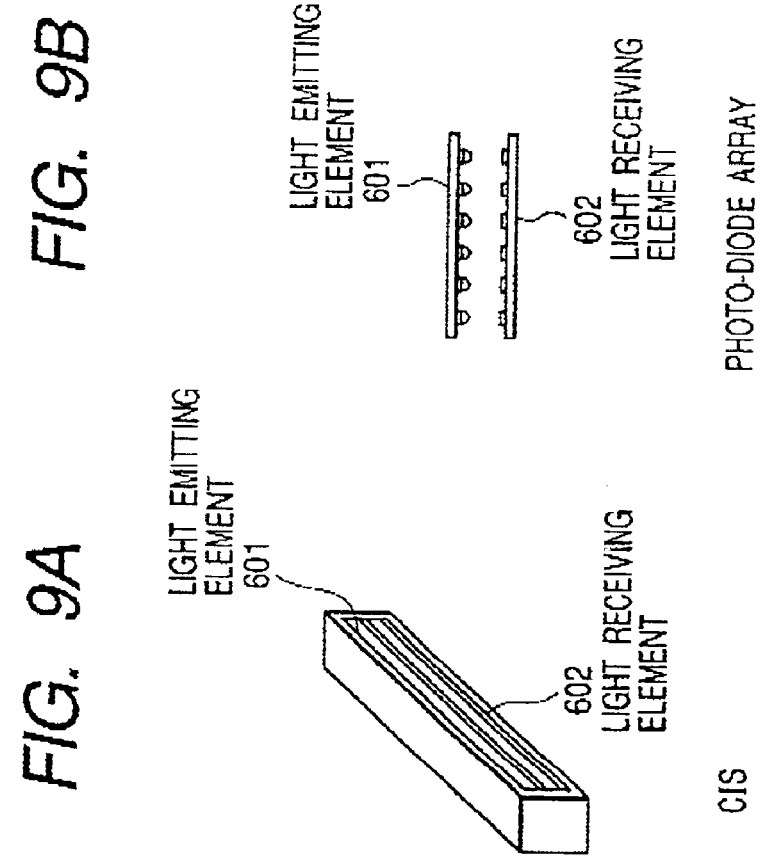
Figure 10B:
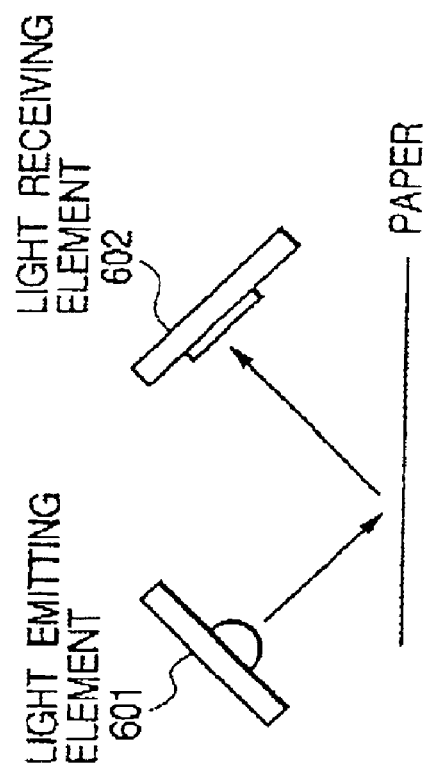
FIGS. 10A and 10B show the detecting process of the paper position aberration detecting sensor.
Figure 10A:
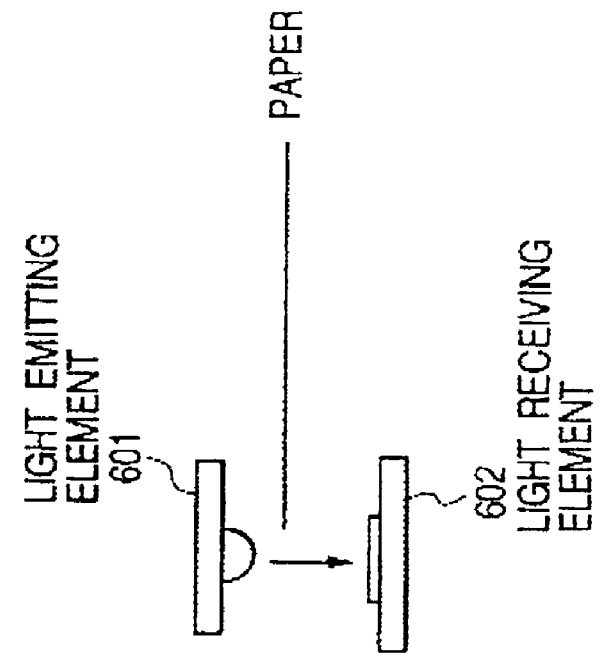

In the present embodiment, as the paper position aberration detecting sensor, description has been made of a direct receiving type detecting process using a light guide on the light emitting side and using a photodiode element on the light receiving side. However, sensors of the same type and detecting processes otherwise usable will be described with reference to FIGS. 9 and 10. As shown in FIGS. 9A, 9B and 9C, the sensors include (a) CIS (contact image sensor), (b) a photodiode array, (c) a reduction CCD (charge couple device) and a same magnification CCD sensor, and any of these sensors may be used. Also, the detecting processes include (a) a direct receiving type and (b) a reflective receiving type, as shown in FIGS. 10A and 10B, and any of these detecting processes may be used. Also, while the color laser printer has been described, this is not restrictive, but the present invention can of course be carried out in a so-called black-and-white printer or the like.

As described above, according to the present embodiment, by a simple mechanism, the writing start position of a printed image can be corrected and printing can be effected without any loss of the image even if there occurs the position aberration of supplied paper.

(Embodiment 2)

Embodiment 2 is an example showing that there is no particular limitation on the disposed position of the paper position aberration detecting sensor. This will be described with reference to the cross-sectional view of FIG. 11 showing an example in which the paper position aberration detecting sensor is disposed. In FIG. 11, (A), (B) and (C) indicate the disposed positions of the paper position aberration detecting sensor.

In FIG. 11, (A) indicates a case where the sensor is disposed at a position similar to that in the aforedescribed Embodiment 1. Further, (B) indicates a case where the sensor is disposed immediately behind the ante-registration detecting sensor, and (C) indicates a case when the sensor is disposed in the conveying path for both-side printing.

The construction and operation of the present embodiment are similar to those of Embodiment 1 and therefore the description of Embodiment 1 is invoked, and they need not be described here.

When the paper position aberration detecting sensor is disposed at (A), in any of a case where paper is fed from the paper feeding tray 511 and a case where paper is fed from a multi-paper tray 510, the position aberration of the paper can be detected.

On the other hand, when the paper position aberration detecting sensor is disposed at (C), it copes with only the case of both-side printing. That is, during back surface printing, the amount of position aberration of the paper is detected and in conformity with the amount of aberration, the writing start position of an image is controlled and is reflected.

In the case of (B), as in the case of (A), in any of the case where paper is fed from the paper feeding tray 511 and the case where paper is fed from the multi-paper tray 510, the position aberration of the paper can be detected.

Conditions limited at the respective installed positions will now be described with reference to the timing chart of FIG. 12. The TOPSYNC signal for detecting the leading edge of the paper is detected and the signal is delivered to the printer controller 302 side. On the printer controller 302 side, after the rising of the TOPSYNC signal received, the signal is subjected to predetermined processing and image data is developed and is delivered to the engine controller 303. Here, let it be assumed that the time until the TOPSYNC signal is received and an image is delivered is 0.5 second (see (4) in FIG. 12).

Here, describing with (B) as the installed position of the paper position aberration detecting sensor, for the sake of convenience, 0.5 second (see (1) in FIG. 12) is required for the reading from the paper position aberration detecting sensor, and a processing time of 0.5 second (see (2) in FIG. 12) is also required for the calculating processing and delivery. Also, assuming that 0.5 second (see (3) in FIG. 12) is required in the printer controller 302 which has received this information, when the installed position of the paper position aberration detecting sensor is (B), 1.5 seconds in total becomes necessary until the information from the paper position aberration detecting sensor is detected and processed.

The printer controller 302 requires 0.5 second as the processing time for delivering an image signal from the TOPSYNC signal and therefore, the total processing time (1.5 seconds in total) for the amount of position aberration of the paper exceeds the processing time (0.5 second) for image development) and it becomes incapable of being reflected in image development. Consequently, in such a case, it is necessary to satisfy the processing time by installing the paper position aberration detecting sensor on this side, i.e., at the position (A) or (C).

On the other hand, when the paper position aberration detecting sensor is installed at the position (B), it is also possible to provide a clutch for the registration rollers 504 and once stop the paper being conveyed by the clutch. Further, there is also possible a system in which a command signal for demanding wait is delivered from the printer controller 302 to the engine controller 303 and the printer controller 302 does not receive the TOPSYNC signal, whereby the processing time for image development is provided extra. That is, from the relation between the image development processing time of the printer controller 302 and the so-called throughput of printing on the paper and discharging the paper, there can be adopted a construction in which the paper position aberration detecting sensor is disposed at an appropriate position.

That is, if it is possible to detect the amount of paper position aberration immediately before the laser beam is applied to the photosensitive drum, and control the image writing start position in conformity with the amount of aberration, it is unnecessary to be subject to the limitation of providing the processing time for temporarily stopping the paper in the paper conveying path, and developing the image.

That is, the present embodiment sows it as an example that regarding the disposition of the paper position aberration detecting sensor, it will suffice to dispose it so as to be capable of detecting any paper position aberration in the main scanning direction orthogonal to the conveying direction of S the paper, and there is no limitation on the installed position of the sensor.

(Embodiment 3)

Embodiment 3 is an example in which even paper of indefinite sizes can be coped with by detecting the size itself of the paper used.

Figure 13:
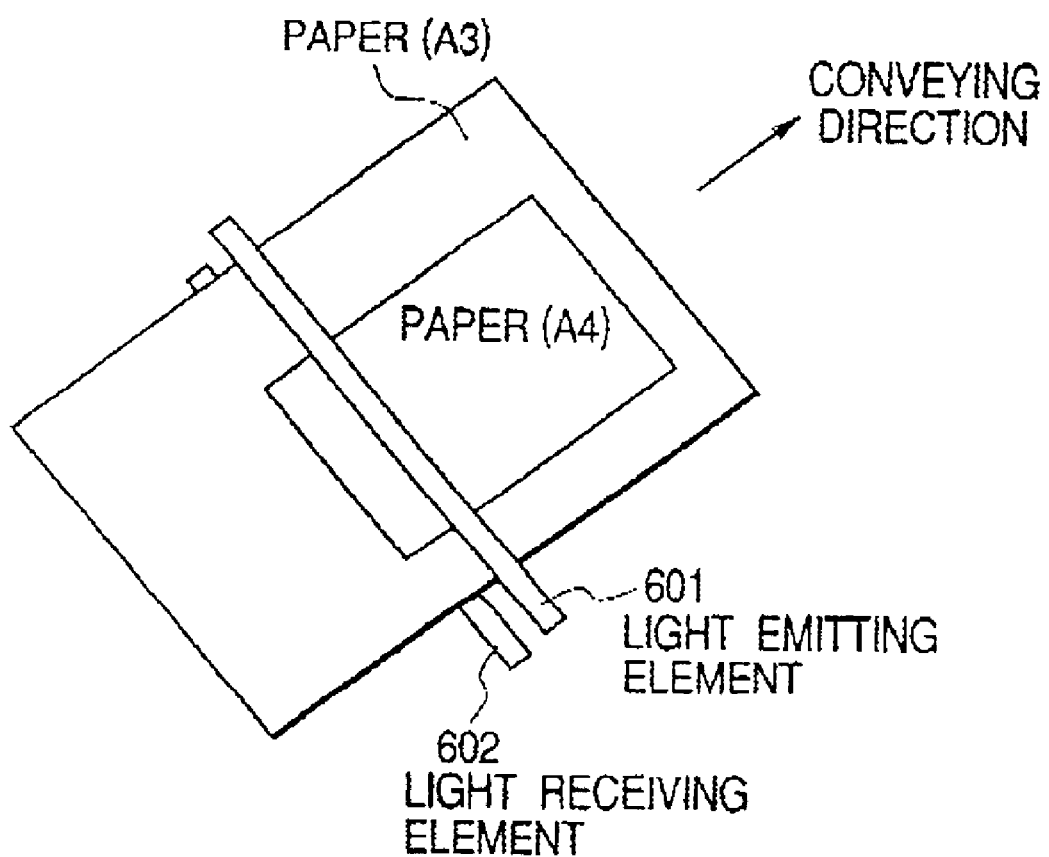
FIG. 13 shows the arrangement of a paper position aberration detecting sensor in Embodiment 3.
Figure 14A:
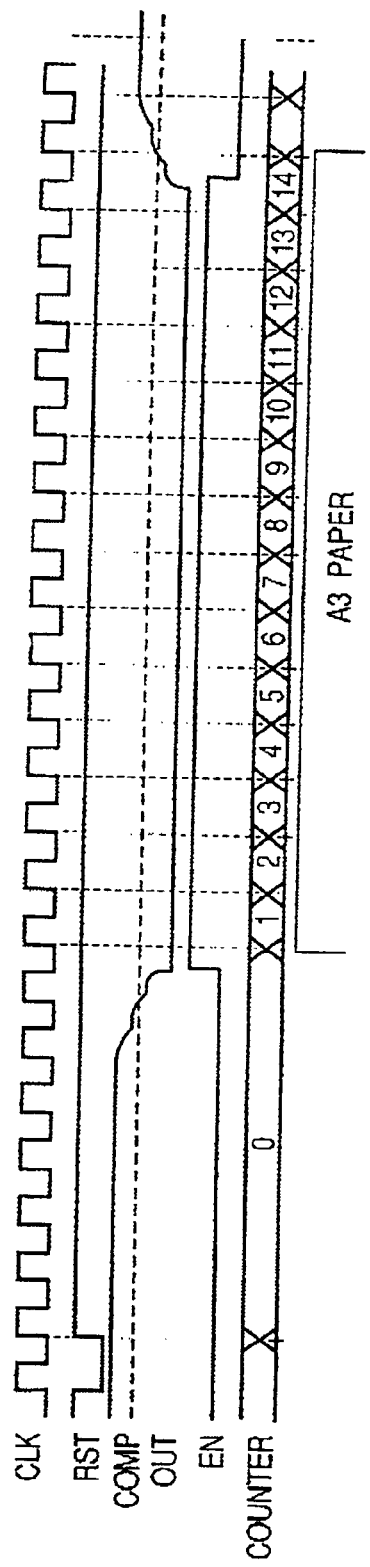
FIGS. 14A and 14B show the timing of the sequence of discriminating between paper sizes.
Figure 14B:
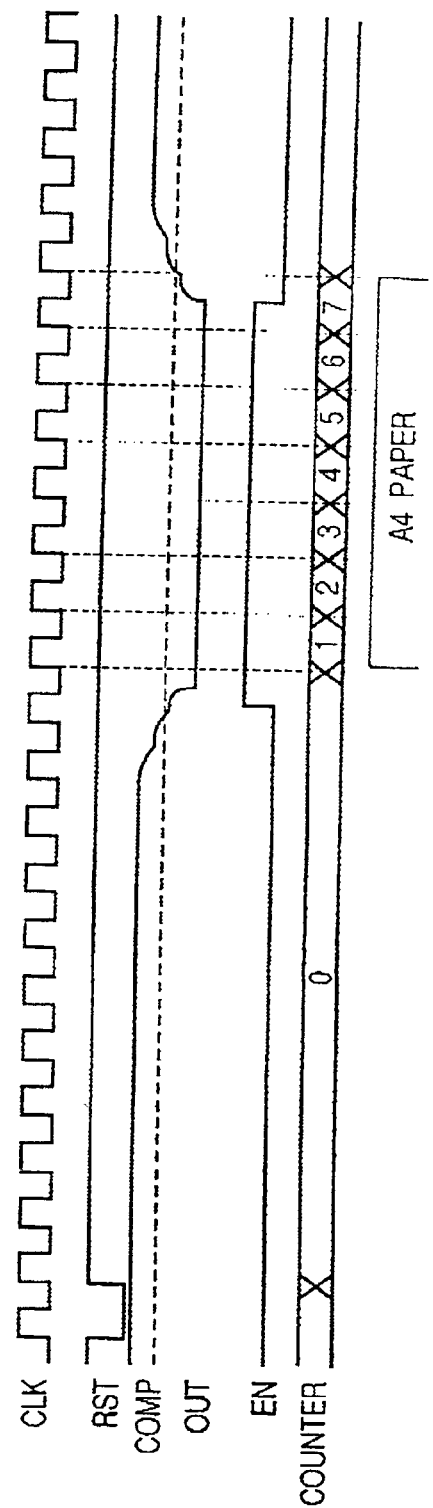

FIG. 13 shows the disposition of a paper position aberration detecting sensor for detecting the entire size of the paper used. The paper position aberration detecting sensor itself and the operation of the paper end detecting circuit (FIG. 7) are similar to those in Embodiment 1 and therefore the description of Embodiment 1 is invoked and they need not be described here. However, the sequence of discriminating the paper size by a detected value will hereinafter be described with reference to a timing chart shown in FIGS. 14A and 14B.

For the sake of convenience, let it be assumed that the sizes of paper used are A3 and A4, and the detection of the paper sizes when the paper is conveyed will be described with respect to the timing thereof on the basis of (a) the case of A3 and (b) the case of A4, in FIG. 14.

As in Embodiment 1, the case where the light on the light receiving surface is intercepted by the paper is detected as the "OFF" state. This analog output is binarized by a comparator 803. The logic here is inputted to the enable terminal of a counter 805 with the case where the light is intercepted by the paper as the logic of "H".

This counter 805 has its count value initialized to "0" by a predetermined reset signal and the count value maintains "0" because the value of the comparator is "L" section. Thereafter, the light is intercepted by the paper and the analog output becomes "L" and therefore, the value of the comparator is reversed to "H", and the counter 805 is counted up in synchronism with the reference CLK. By this counted count value, it becomes possible to detect the size of the paper used. If in this case, the conveyed paper is A3 paper, 14 is counted as shown, and if on the other hand, the conveyed paper is A4 paper, 7 is counted.

As described above, according to the present embodiment, the paper position aberration detecting sensor can perform also the paper size detecting function of detecting the width of the paper, and there can be obtained the effect of curtailing the disposition space and cost thereof.

(Embodiment 4)

Figure 15:
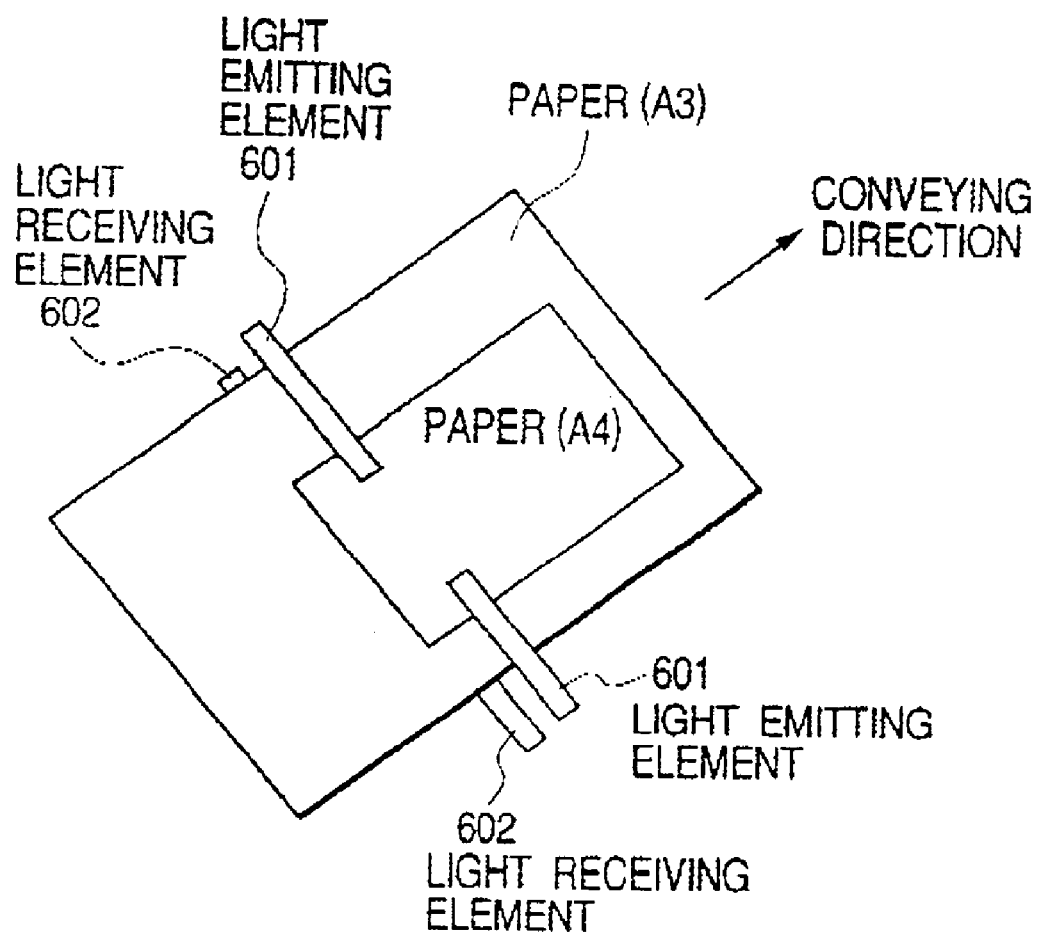
FIG. 15 shows the arrangement of paper position aberration detecting sensors in Embodiment 4.

Embodiment 4, as shown in FIG. 15, an example in which sensors are disposed at paper ends in conformity with the size of the paper used.

Figure 16:
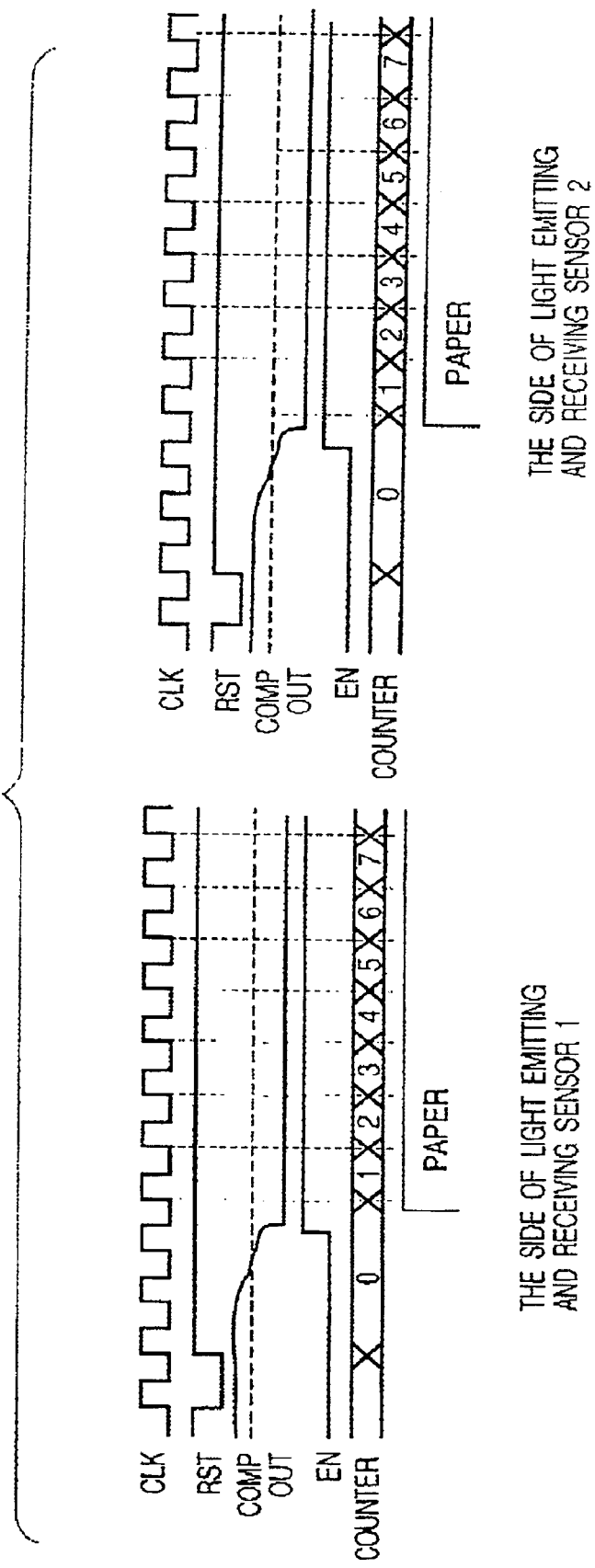
FIG. 16 shows the timing of the sequence of discriminating between paper sizes.

In the present embodiment, as shown in FIG. 15, paper position aberration detecting sensors are disposed at the right and left paper ends with respect to the conveying path for the paper size used. The timing when detecting the paper size used thereby will hereinafter be described with reference to FIG. 16.

Again in this case, as in the aforedescribed Embodiment 3, in the logic of detecting the case where the light on the light receiving surfaces is intercepted as the "OFF" state, the light is received by the respective sensors, and respective counters count up. As in the aforedescribed Embodiment 3, the counters are reset to "0" by a predetermined reset signal and that state is maintained, and when the enable signals of the counters become "H", the counting-up operation is started by the reference CLK.

By thus detecting the opposite ends of the paper, it is also possible to detect the paper size.

Figure 17:
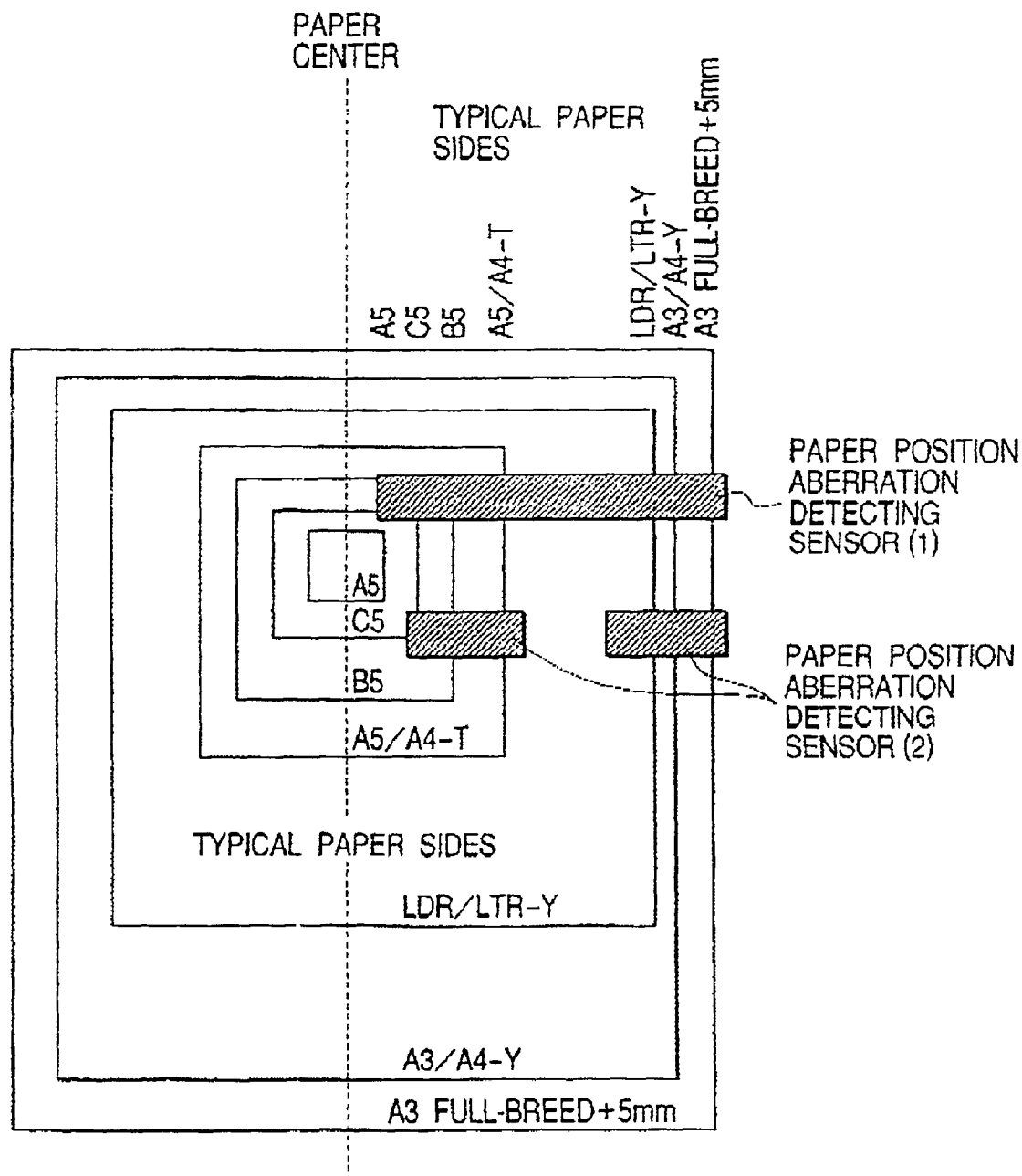
FIG. 17 is an illustration of a modification of Embodiment 4.

There is also a modification are shown in FIG. 17 regarding the paper and the disposition of the sensors. Here, suppose the sizes of paper used as A3 to A5. For this paper, it is possible to make the sensors themselves into cell (module) structure, and use necessary minimum sensors for detecting the paper ends of the paper used to thereby curtail the cost of the paper position aberration detecting sensors themselves.

That is, a case where as indicated at (1) in FIG. 17, the sensors themselves are continuously disposed, and the disposition for detecting only a predetermined paper end as indicated at (2) in FIG. 17 would occur to mind.

In the case of (1), the cost of the sensor itself increases, but the number of the detecting circuit may be one.

In the case of (2), the cost of the sensors can be reduced, but a plurality of detecting circuits become necessary.

As described above, there are merits and demerits, respectively, but the optimum technique for an image forming apparatus which is the subject can be applied.

Further, when in the paper conveying process, the paper used is conveyed with the center thereof as the reference, it is also possible to detect the size of the paper simply by providing the paper position aberration detecting sensor only on one of the right and left sides with respect to the paper.

While in FIG. 17, description has been made with 6 cells (modules) continuously disposed and 4 cells (modules) disposed at predetermined intervals, a similar effect can also be obtained if use is made of the technique of disposing N (N=1 or greater) paper position aberration detecting sensors depending on the size of paper which is a definite object.

(Embodiment 5)

This embodiment is an example in which the paper position aberration detecting sensor serves also to detect the sorts (media) of paper. The operation of the paper position aberration detecting sensor itself is similar to that in Embodiment 1 and therefore the description of Embodiment 1 is invoked and it need not be described.

Figure 18A:
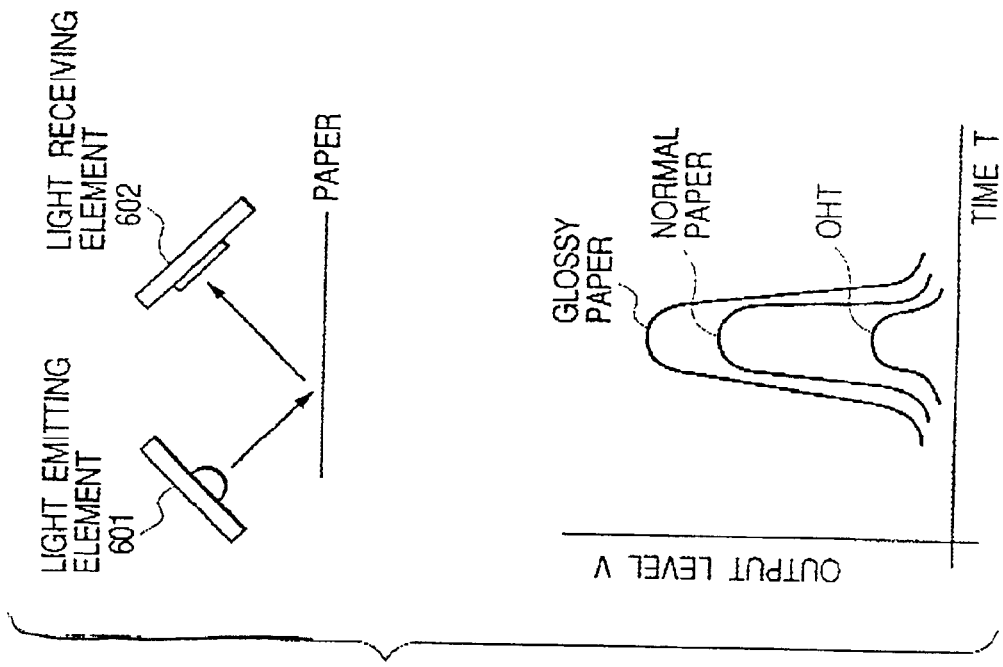
FIGS. 18A and 18B show a paper position aberration detecting sensor used in Embodiment 5 and the output levels thereof.
Figure 18B:
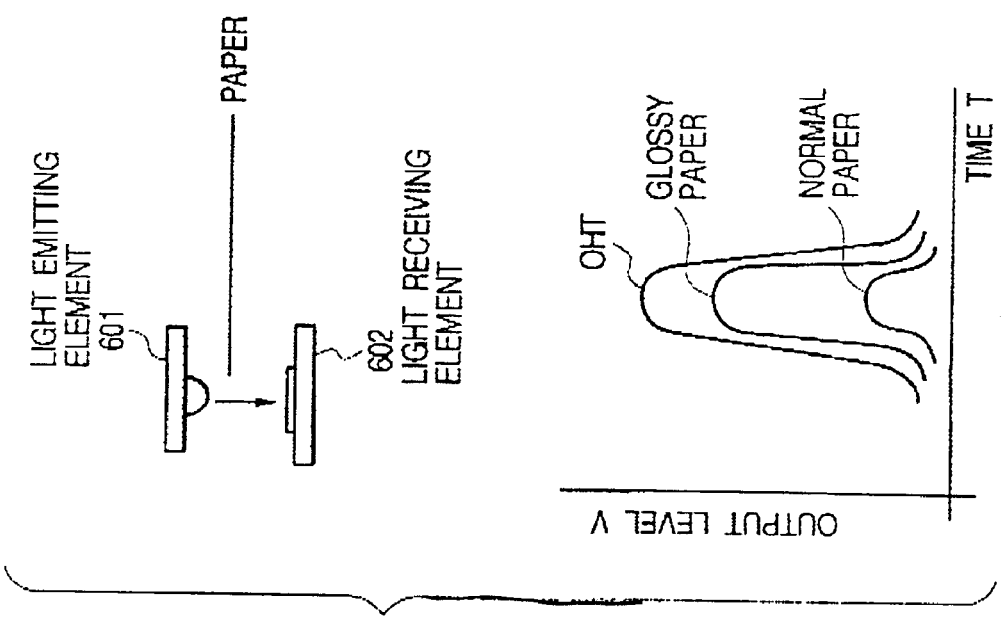

The present embodiment is an example in which when the fed paper is other paper such as glossy paper or an OHT sheet than normal paper, the paper position aberration detecting sensor serves also to detect the media thereof. The detecting process of the paper position aberration detecting sensor used in the present embodiment and the output level from the sensor are shown in FIGS. 18A and 18B.

A direct receiving type detecting sensor shown at the left is such that the output value of the sensor exhibits a maximum value because in spite of there being an OHT sheet, the OHT sheet has the nature of transmitting light therethrough.

A reflective receiving type detecting sensor shown at the right, conversely, passes light therethrough and does not reflect light on the light receiving surface thereof.

Consequently, the output value of this sensor exhibits a minimum value.

That is, depending on the sort of paper conveyed onto the paper position aberration detecting sensor, an analog output value proportional to the quantity of light received by the light receiving surf ace varies. This analog output is converted into a digital signal through an A/D converter and is detected by a CPU (calculation processing unit), whereby it can also be coped with to effect the discrimination of the sort of paper such as normal paper, glossy paper or an OHT sheet in conformity with the obtained output value.

While in the present embodiment, the discrimination between the sorts of paper is effected with the analog output being A/D-converted, it can also be easily accomplished to provide, for example, a threshold value at the rear stage of the analog output and binarize it to thereby effect digital discrimination. By such a technique, the paper position aberration detecting sensor can perform also the function of detecting the sort of paper, and the effect of curtailing the disposition space and cost thereof can be obtained.

(Embodiment 6)

Embodiment 6 shows an example in which in various paper sizes, the detection of conveyance jam of paper can be effected.

Figure 19A:
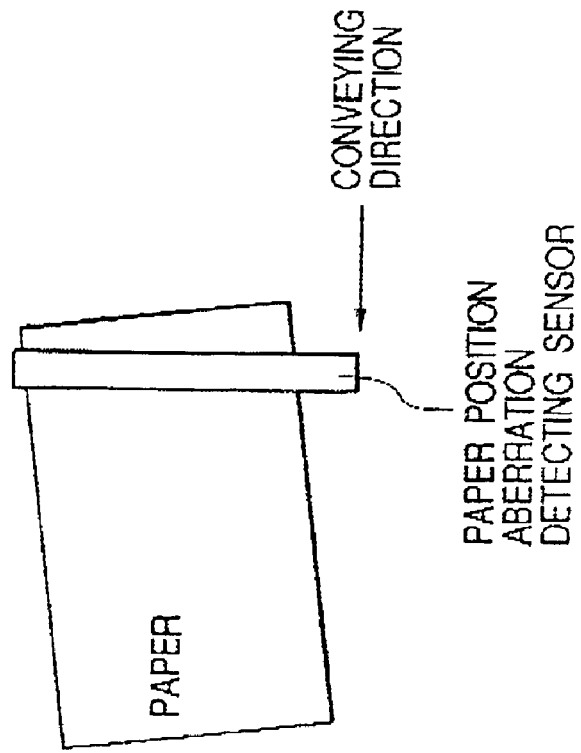
FIGS. 19A and 19B are an illustration of paper conveyance jam in Embodiment 6.
Figure 19B:
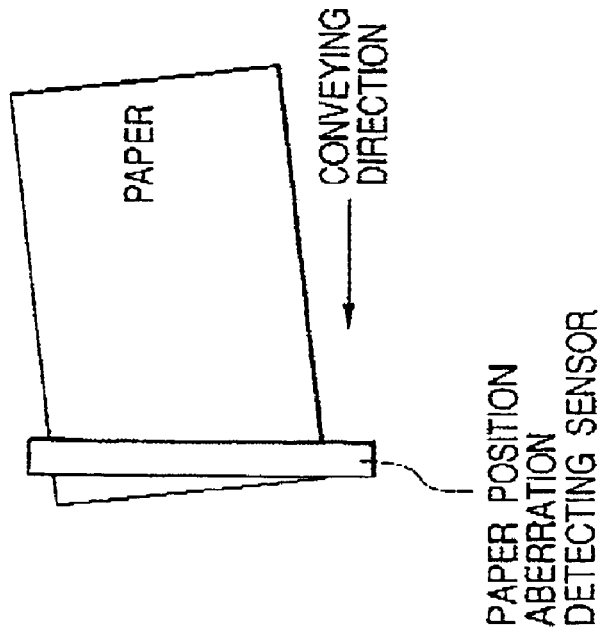

Description will be made with reference to FIGS. 19A and 19B. For example, the operation of the paper position aberration detecting sensor itself for the paper conveyed from the multi-paper tray by the paper feeding roller is similar to that in Embodiment 1 and therefore, the description of Embodiment 1 is invoked and it need not be described.

Here, by the detecting operation being performed at least twice, the skew-feed state of the paper can be detected. That is, the paper position aberration detecting operation is performed at the leading edge side of the paper, and the paper is conveyed and at the trailing edge side thereof, the detecting operation is again performed, whereby the skew-feed state of the paper can be detected. In this case, when the paper is conveyed, the detecting operation is executed in the case of the leading edge side of the paper shown in FIG. 19A and the case of the trailing edge side of the paper shown in FIG. 19B. That is, depending on the conveyed state of the paper, the paper is being skew-fed and thus, the counter address light-intercepted at the leading edge side of the paper and the counter address light-intercepted at the trailing edge side of the paper differ from each other, and it is possible to judge that the supplied paper is being skew-fed. Consequently, the danger of causing conveyance jam is very high and the paper should not be conveyed. Consequently, when a predetermined or greater difference is seen between the value detected in FIG. 19A and the value detected in FIG. 19B, it is judged that the paper has been supplied, and conveyance jam is judged to have occurred.

As described above, according to the present embodiment, the skew-fed paper is detected, whereby the paper position aberration detecting sensor can serve also as a jam detecting sensor, and the effect of curtailing the disposition space and cost thereof can be obtained.

(Embodiment 7)

Embodiment 7 is an example in which use is not made of the process as shown in Embodiment 1 wherein the amount of position aberration is detected by the paper position aberration detecting sensor, and on the basis of this information, the image writing start position is controlled on the printer controller 302 side, but the LSYNC signal is controlled on the engine controller 303 side to thereby obtain a similar effect.

Figure 20:
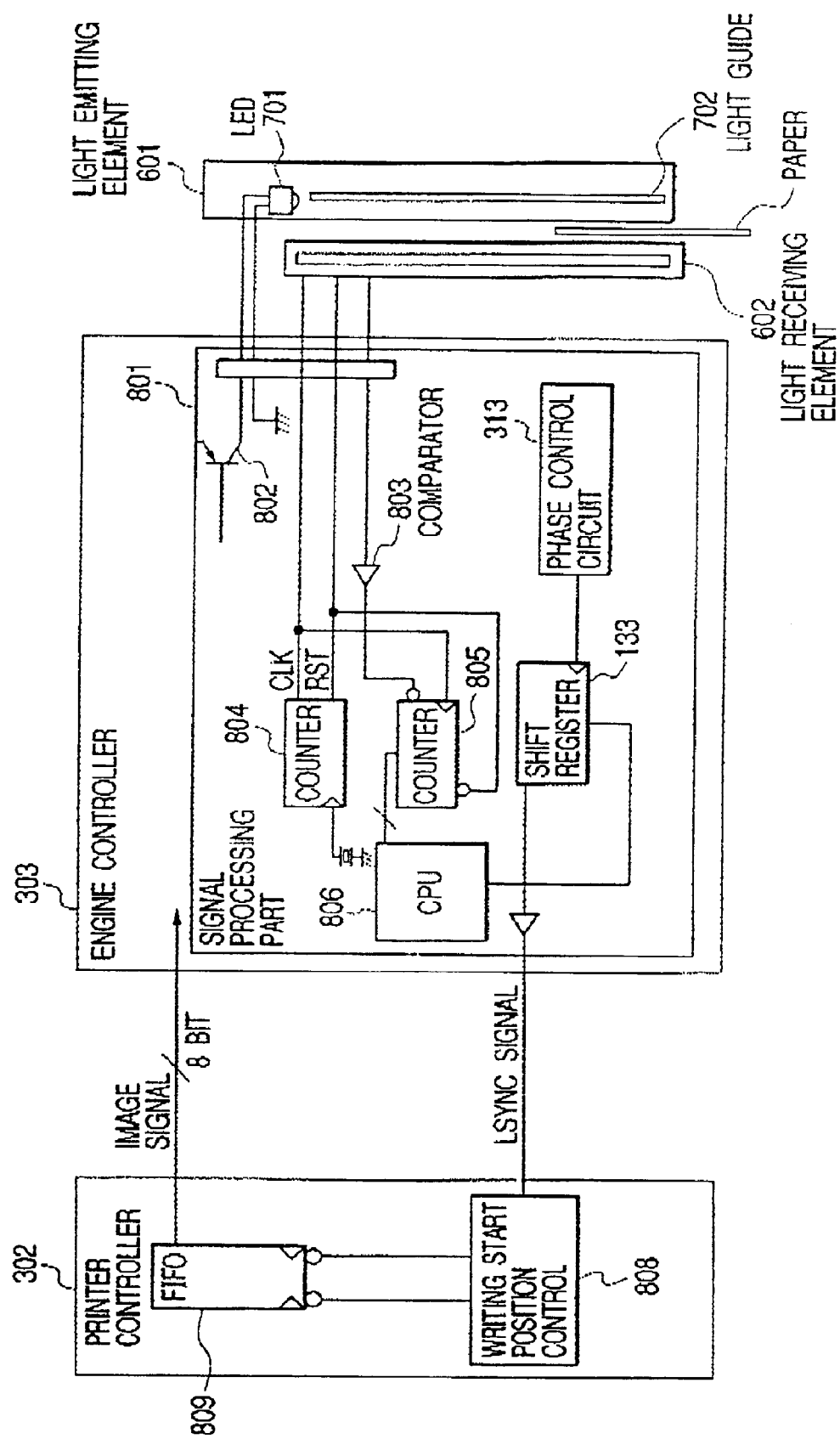
FIG. 20 is a block diagram showing the construction of the essential portions of Embodiment 7.

The circuit construction of this embodiment is shown in FIG. 20. FIG. 20 is a block diagram showing a construction for controlling the writing start position in the engine controller, and the same functions as those in FIG. 7 are given the same reference characters and need not be described here. Also, the operation of the paper position aberration detecting sensor is similar to that in Embodiment 1 and therefore the description of Embodiment 1 is invoked, and it need not be described here.

The detected value from the paper position aberration detecting sensor is inputted to a CPU 806, where it is subjected to the calculating processing. The result calculated here is loaded as a shift amount onto a shift register 133.

On the other hand, BD signal detected by the scanner motor 311 of FIG. 2 is produced as the LSYNC signal by a phase control circuit 313 and is inputted to the shift register 133. When as the aforementioned shift amount, for example, signal Information delayed by two pixels is loaded from the CPU 806 onto the shift register 133, the LSYNC signal causes LSNC signal delay by two pixels relative to the reference CLK to be generated and delivered to the printer controller 302 In the printer controller 302, an image signal is delivered in accordance with the received LSYNC signal, whereby it can be obtained as an image signal delayed by two pixels relative to the LSYNC signal inputted to the shift register 133.

Figure 21:
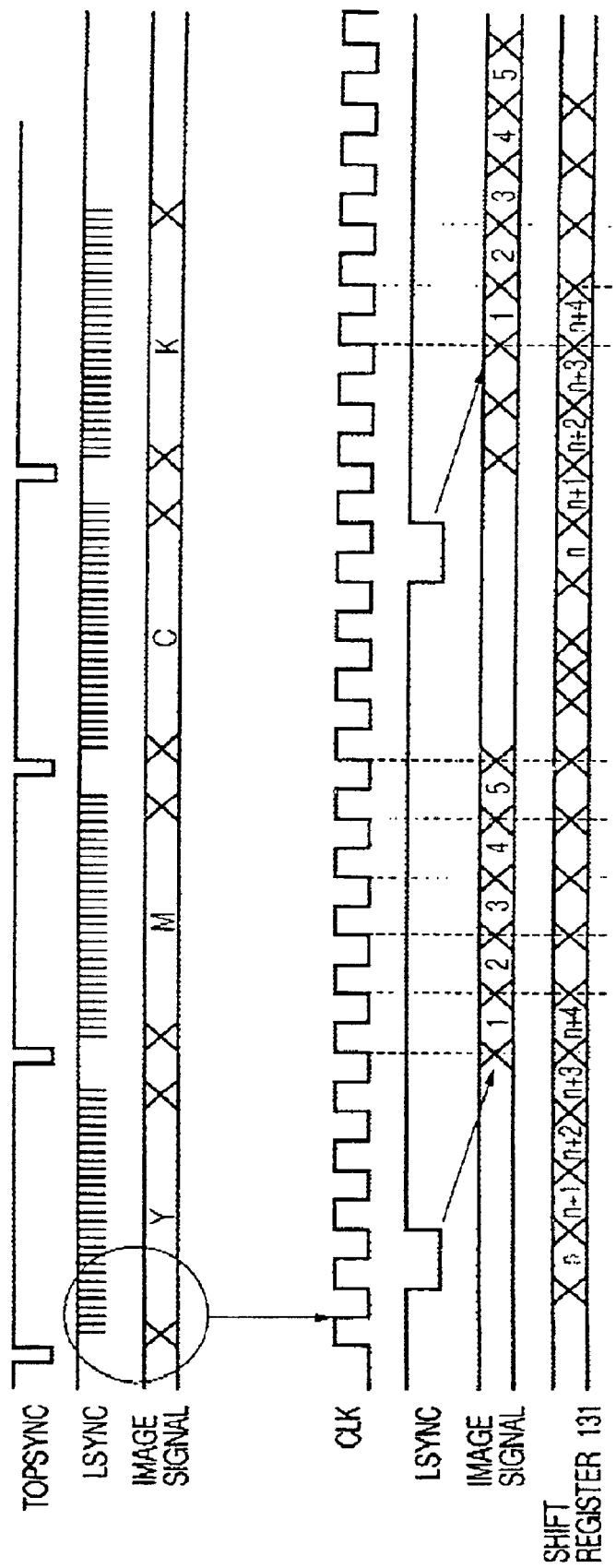
FIG. 21 shows the image output timing in Embodiment 7.

Description will now be made with reference to the image output timing shown in FIG. 21. The leading edge of paper in the sub scanning direction is detected and used as TOP-SYNC signal, and as regard the main scanning direction, LSYNC signal is used as the reference signal. On the basis of these two reference signals, Y, M, C and K image signals are delivered and an image is formed.

The CLK, LSYNC signal and the image signals will now be described with reference to an enlarged view shown in FIG. 21. First, when the LSYNC signal which is a reference signal in the main scanning direction is inputted, an image signal is delivered from a predetermined count value to the engine controller 303. Here, let it be assumed for the sake of convenience that an image is forwarded 4 clocks after the rising of the LSYNC signal to thereby form one line. In this case, when an image corresponding to five pixels is forwarded, the next LSYNC signal is inputted and the next line is formed.

Here, it is possible to control the LSYNC signal in accordance with the output signal from the aforedescribed paper position aberration detecting sensor to thereby print and image from an arbitrary position. That is, the result of the calculation effected by the CPU 806 on the basis of the detection from the paper position aberration detecting sensor is loaded onto the shift register 133. Here, it is loaded as n value onto the shift register 133. The shift register 133 onto which it has been loaded counts up from the n value and can therefore delay the LSYNC signal. Consequently, it becomes possible to control the image writing start position.

As described above, in the present embodiment, the LSYNC signal is delayed and controlled not on the printer controller 302 side but in the engine controller 303, whereby the image writing start position can be controlled.

(Eighth Embodiment)

In the case of an image forming apparatus such as a color laser printer using oilless fixing when an OHT with a band as a transparent recording medium with a band for oil fixing is conveyed as a recording medium, there is the possibility of imparting damage to a fixing unit having a fixing roller 56, etc. and therefore, when an OHT with a band is conveyed, it is necessary to stop the printing operation and Inform the user of it through a printer controller 91. So, in an eighth embodiment, there is proposed a method of discriminating an OHT with a band by the use of the paper position aberration detecting sensor already described in the first embodiment.

Figure 22:
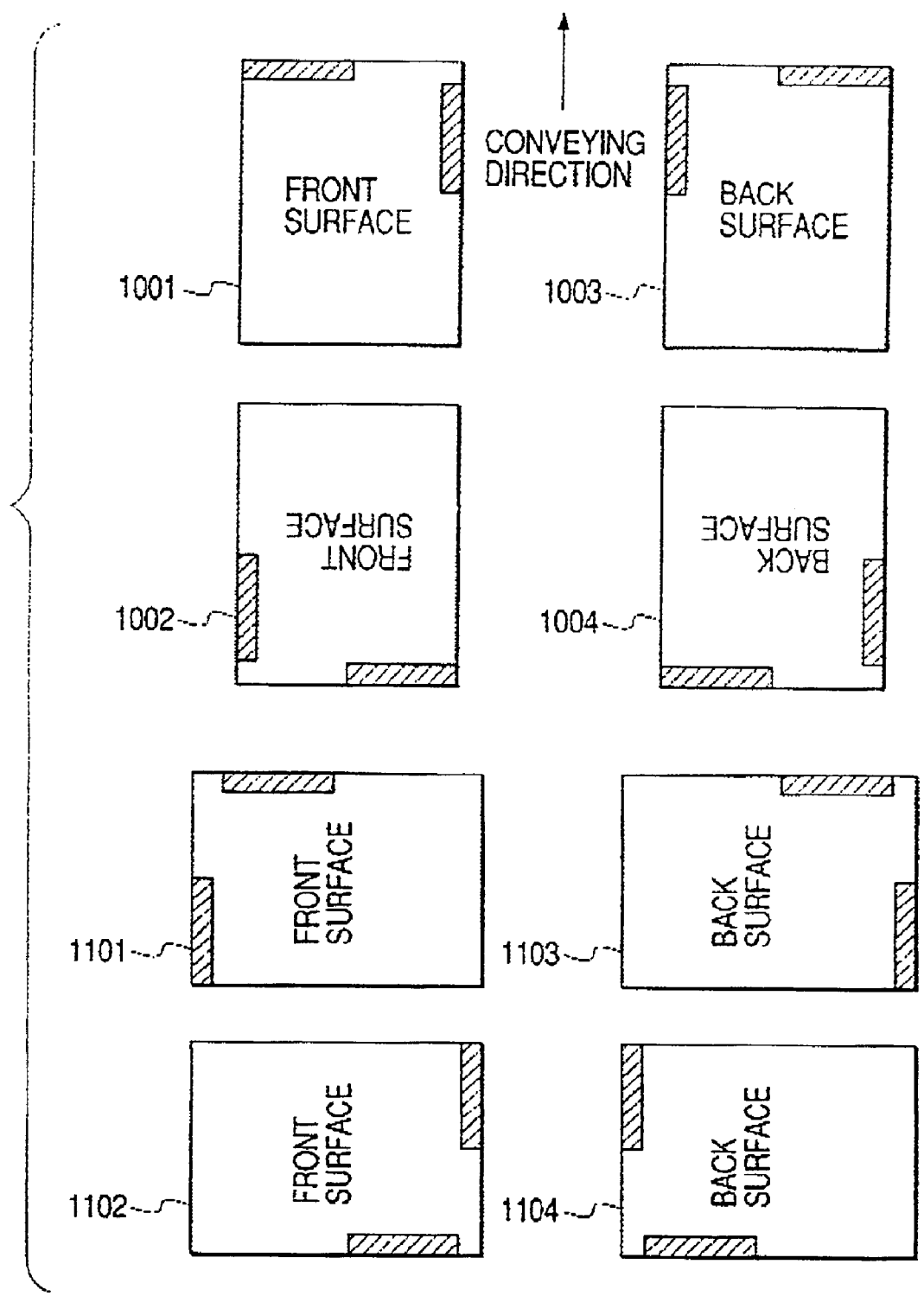
FIG. 22 shows plan views illustrating the arrangement of a band attached to a popular OHT with a band.
Figure 23A:
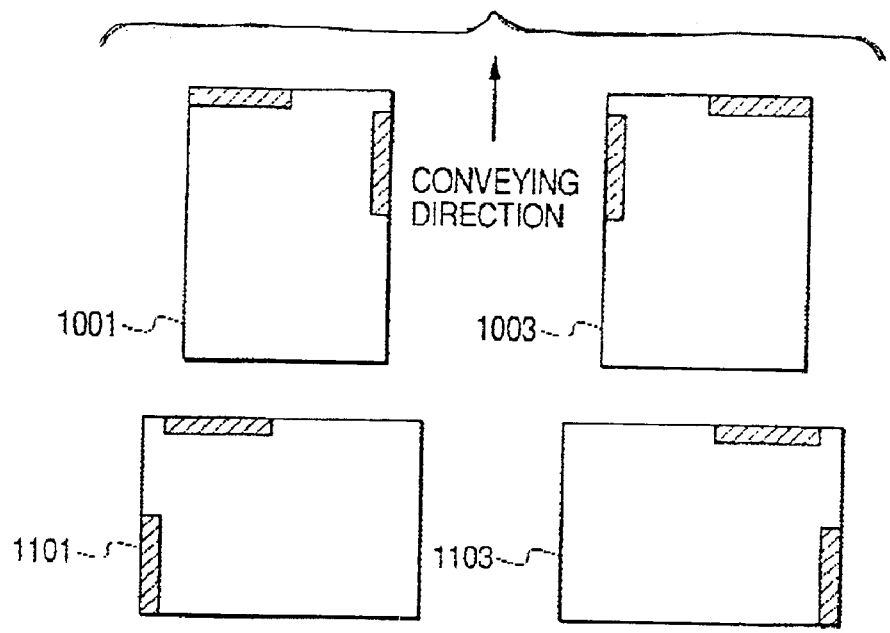
FIGS. 23A, 23B and 23C show the discrimination range for recording mediums in an eighth embodiment.
Figure 23B:
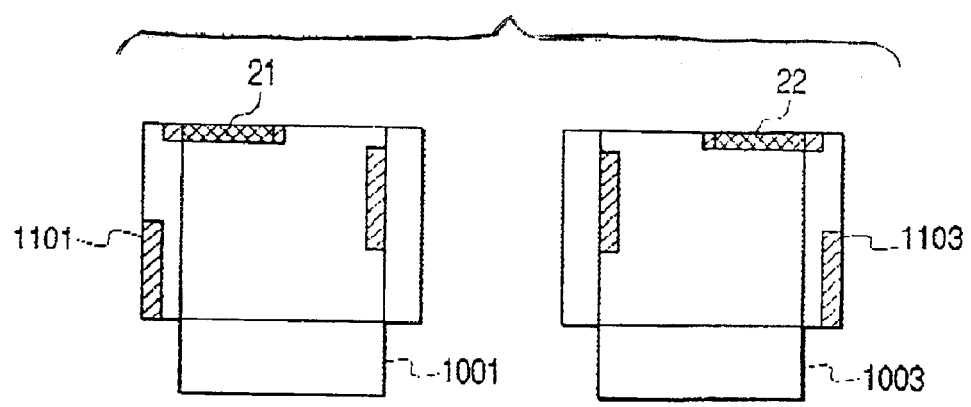
Figure 23C:
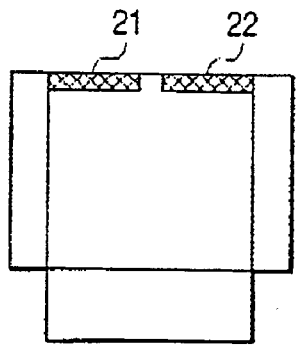
Figure 24A:
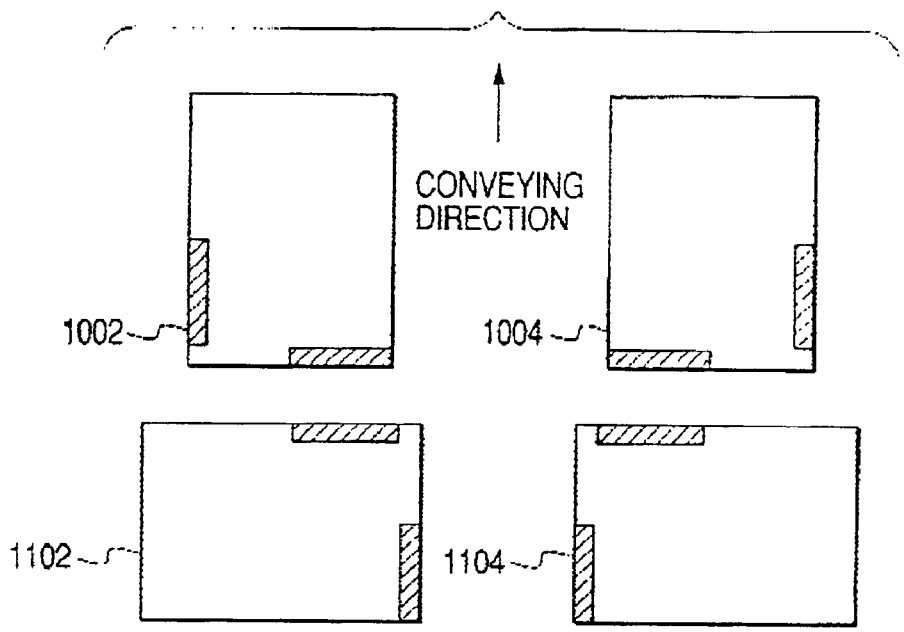
FIGS. 24A, 24B and 24C show the discrimination range for recording mediums in the eighth embodiment.
Figure 24B:
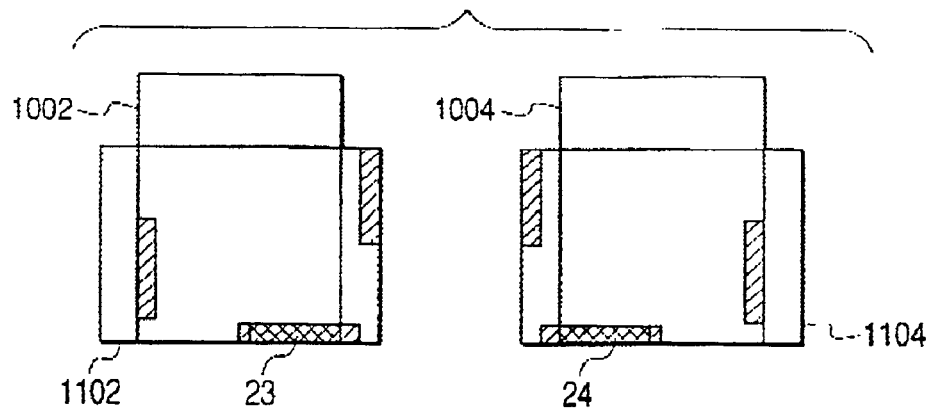
Figure 24C:
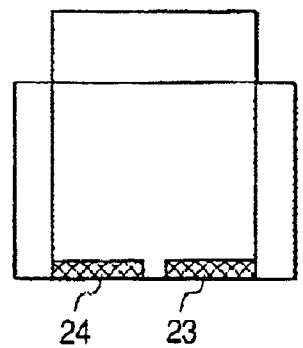
Figure 25:
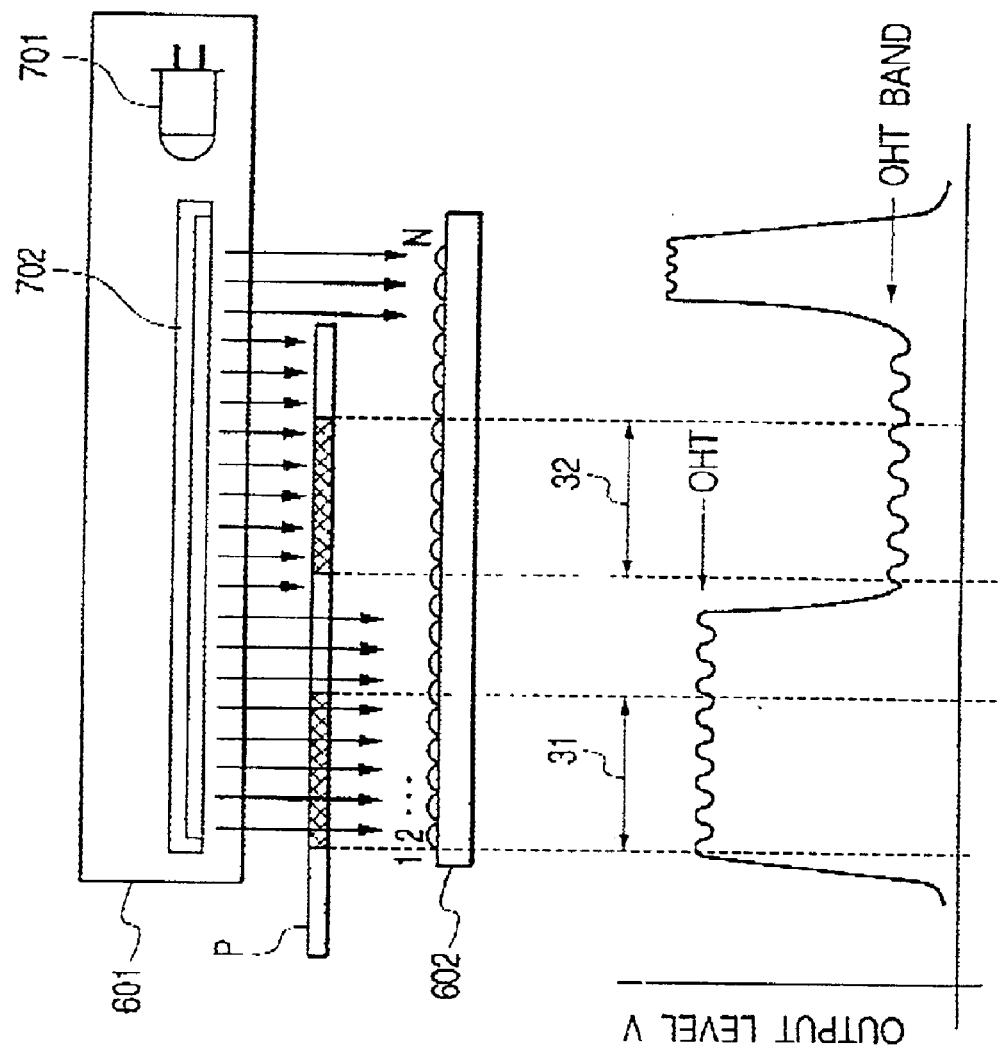
FIG. 25 shows an example of the output of a recording mediums position aberration detecting sensor.

Description will hereinafter be made with reference to the drawings. FIG. 22 shows plan views illustrating the arrangement of a band attached to a popular OHT with a band, FIGS. 23A, 23B and 23C show the detecting position when the band is at the leading edge, FIGS. 24A, 24B and 24C show the detecting position when the band is at the trailing edge, and FIG. 25 shows an example of the output of the recording medium position aberration detecting sensor. In the description of the eighth embodiment, constructions similar to those in the aforedescribed embodiments are given similar reference characters and need not be described.

As shown in FIG. 22, an OHT with a band which may be set on stacking means has a combination of front and back surfaces, top and bottom, and length and breadth. In the ensuing description, a case where the band is attached to the head of the OHT with respect to the conveying direction is referred to as the leading edge, and a case where the band is attached to the trailing edge of the OFT with respect to the conveying direction is referred to as the trailing edge.

The arranged states 1001, 1002, 1003, 1004, 1101, 1102, 1103 and 1104 of the band of the recording medium indicate the positions of the band as the band portion of the OHT with a band. For example, it is to be understood that the arranged stat 1001 in which the OHT with a band is set with its front surface indicates that the position of the band is the leading edge with respect to the conveying direction, and the conveying direction is lengthwise conveyance. Likewise considering, the arranged state 1002 indicates the front surface, the trailing edge and lengthwise conveyance, the arranged state 1003 indicates the back surface, the leading edge and lengthwise conveyance, the arranged state 1004 indicates the back surface, the trailing edge and lengthwise conveyance, the arranged state 1101 indicates the front surface, the leading edge and breadthwise conveyance, the arranged state 1102 indicates the front surface, the trailing edge and breadthwise conveyance, the arranged state 1103 indicates the back surface, the leading edge and breadthwise conveyance, and the arranged state 1104 indicates the back surface, the trailing edge and breadthwise conveyance. To discriminate the sort of the OHT with a band, it will suffice to detect the common portion of the band portions of lengthwise conveyance and breadthwise conveyance and the common portion of transparent portions without the band by the recording medium position aberration detecting sensor.

As shown in FIG. 23A, and as previously described, the arranged state 1001 indicates the front surface, the leading edge and lengthwise conveyance, the arranged state 1003 indicates the back surface, the leading edge and lengthwise conveyance, the arranged state 1101 indicates the front surface, the leading edge and breadthwise conveyance, and the arranged state 1103 indicates the back surface, the leading edge and breadthwise conveyance.

As shown in FIG. 23B, the arranged states 1001 and 1101 of the band are superposed one upon another, and the position aberration detecting sensor is disposed on the common portion in which the bands are superposed one upon another, and this common portion is defined as the discriminating position 21 of the OHT with a band when the band is at the leading edge with respect to the conveying direction. Likewise, the arranged states 1003 and 1103 of the band are superposed one upon another, and the common portion of the bands is defined as the discriminating position 22 of the OHT with a band.

Thus, when as shown in FIG. 23C, the band is set on the leading edge with respect to the conveying direction, it will be possible to discriminate the sort of the recording medium which is an OHT with a band if the discriminating position 21 and the discriminating position 22 are detected by the recording medium position aberration detecting sensor.

Likewise, as shown in FIGS. 24A and 24B, common portions in which the bands of the OHTS with bands overlap each other are defined as the discriminating position 23 and discriminating position 24 of the OHTS with bands.

Thus, when as shown in FIG. 24C, the bands are set at the trailing end with respect to the conveying direction, it will be possible to discriminate the sort of the recording medium which is an OHT with a band if the discriminating position 23 and the discriminating position 24 are detected by the recording medium position aberration detecting sensor 52.

Here, whether the leading edge or the trailing edge of the OHT with a band is set on the stacking means is indefinite and therefore, to effect the judgment of the OHT with a band, it is necessary to detect the output value of the recording medium position aberration detecting sensor at the leading edge of the recording medium and the trailing edge of the recording medium.

From FIGS. 23A to 23C and 24A to 24C, however, It can be seen that the detection range of the position aberration detecting sensor in the main scanning direction is equal at the leading edge and the trailing edge (that is, the discriminating position 21 and the discriminating position 23, and the discriminating position 22 and the discriminating position 24 are within an equal range).

Description will now be made of the output of the recording medium position aberration detecting sensor when the discrimination range of the sensor for the OHT with a band is designated as a discrimination range 31 (the same range as the range of the discriminating position 21 and the discriminating position 23) and a discrimination range 32 (the same range as the range of the discriminating position 22 and the discriminating position 24).

FIG. 25 shows as an example of the output of the recording medium position aberration detecting sensor the output waveform when an OHT with a band is set on the stacking means in the arranged state of FIG. 22 (the back surface, the leading edge and breadthwise conveyance). In this case, no band is attached within the discrimination range 31 of the OHT with a band and therefore, the sensor output of an OHT level is put out and the OHT can be judged. On the other hand, a band is attached within the discrimination range 32 of the OHT with a band and therefore, the sensor output of the band level of normal paper is put out and the normal paper can be judged. In this case, if the image forming operation is stopped and the user is informed that the recording medium is an OHT with a band, the fixing unit can be prevented from being damaged.

Also, when an OHT without a band for use with an oilless fixing device is conveyed as a recording medium, it is judged to be an OHT also within the discrimination range 31 of an OHT with a band and is likewise judged to be an OHT also within the discrimination range 32 of the OHT with a band and therefore, the image forming process is carried out by the conventional image forming sequence for the OHT.

Thus, when an OHT with a band is conveyed as the recording medium, the discrimination of the recording medium which is an OHT with a band becomes possible by the utilization of the feature that it is judged to be an OHT in one detection area of the discrimination range 31 of the OHT with a band and it is judged to be normal paper in the other detection area thereof. Further, when the recording medium is judged to be an OHT with a band, depending on within which of the discrimination range 31 and the discrimination range 32, it has been judged to be an OHT, it is also possible to detect whether the recording medium has been conveyed with the front surface or the back surface as the basis.

As described above, in the eighth embodiment, the band portion of an OHT with a band and the transparent portion thereof without a band are detected to thereby effect the discrimination of the OHT with a band. Also, when the discrimination of the sort (type) of the recording medium is to be effected, use is made of one or more of a plurality of discriminating means. Specifically, when the discrimination of the sort (type) of the recording medium is to be effected, use is made of only one of the plurality of discriminating means which is in an area through which the band portions of all of OHTs with bands capable of passing the conveying path pass (the discrimination range 31 and the discrimination range 32). Further, the position of the band portion of the OHT with a band is detected to thereby discriminate between the front and back surfaces of the OHT with a band as well. Also, when the OHT with a band has been detected, the conveying operation can be stopped by control means, not shown.

Therefore, when an OHT with a band for use with an oilless fixing device or the like is to be discriminated, even considering a disposition in which a band is attached or a case where the recording medium is conveyed upside down, a plurality of pairs of recording medium discriminating devices do not become necessary, and this is advantageous from the viewpoints of cost and disposition space.

(Ninth Embodiment)

We now propose a recording medium discriminating device which can discriminate the sorts (types) of recording mediums for the conveyance of recording mediums of all sizes supported by the image forming apparatus by the use of the recording medium position aberration detecting sensor 52 and at the same time, can also execute the detection of an OHT with a band.

Figure 26A:
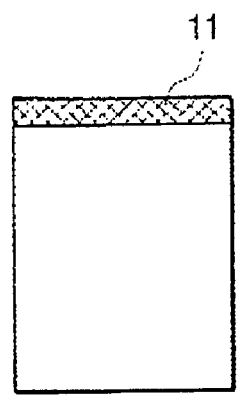
FIGS. 26A, 26B and 26C show the discrimination range for recording mediums in a ninth embodiment.
Figure 26B:
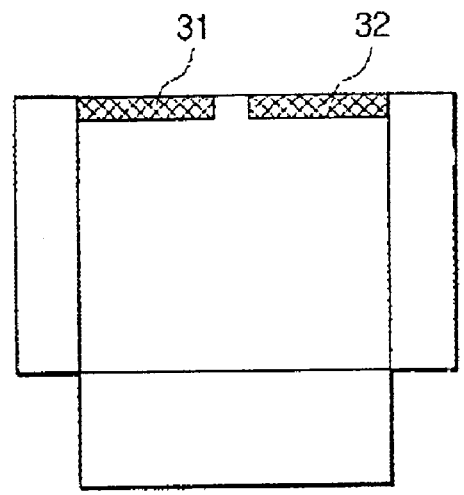
Figure 26C:
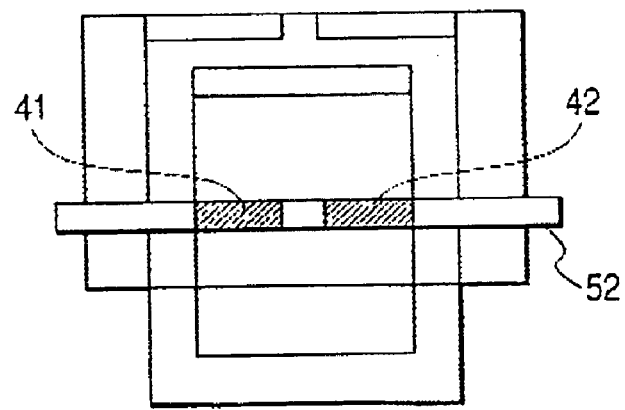

Description will hereinafter be made with reference to the drawings. FIGS. 26A, 26B and 26C show the discrimination ranges of the recording medium in a ninth embodiment. In the description of the ninth embodiment, constructions similar to those in the aforedescribed embodiment are given similar reference characters and need not be described.

Description will be made of a case where as shown in FIG. 26A, as in the eighth embodiment, as an example, the image forming apparatus supports the sizes (LEDGER, LEGLA, LETTER-P, LETTER-L, EXECUTIVE, A3, A4-P, A4-L, A5-P, A5-L, B4, B5-P and B5-L) of recording medium shown in FIG. 2.

In this case, it is 74.25 mm (=148.5/2 (mm)) in A5-P that the length X(mm) in the main scanning direction becomes minimum for the center of an image and therefore, if a discrimination range 11 which is the range of A5-P is detected by the recording medium position aberration detecting sensor 52, the sorts of recording mediums can be discriminated for the conveyance of recording mediums of all sizes.

Also, as shown in FIG. 26B, from the eighth embodiment, the discriminating position for an OHT with a band is within the discrimination range 31 and the discrimination range 32, and in both of a case where the OHT with a band is set on the stacking means 50 with its band positioned upwardly and a case where the OHT with a band is set on the stacking means 50 with its band positioned downwardly, if as shown, the discrimination range 31 and discrimination range 32 of the position aberration detecting sensor 52 are detected, it will become possible to judge the sort of the recording medium which is an OHT with a band.

Description will now be made of the detection range by the position aberration detecting sensor 52 for making the discrimination of the sorts (types) of recording mediums possible and making the detection of a recording medium which is an OHT with a band also possible by the use of the position aberration detecting sensor 52 for the conveyance of recording mediums of all sizes supported by the image forming apparatus.

FIG. 26C shows the above-mentioned ranges superposed on the same plane, and shows the discrimination range 41 and discrimination range 42 of the recording medium which are the common portions of these. That is, the discrimination range 41 and the discrimination range 42 are detected by the position aberration detecting sensor 52, whereby the discrimination of the recording medium becomes possible for the conveyance of recording mediums of all sizes supported by the image forming apparatus and it is also possible to effect the detection of an OHT with a band at the same time.

As described above, in the ninth embodiment, when the discrimination of the sort (type) of the recording medium is to be effected, use is made of only one of a plurality of discriminating means which is in an area through which recording mediums of all sizes capable of passing the conveying path pass and the band portions of all of OHTs with bands capable of passing the conveying path pass (the discrimination range 41 and the discrimination range 42).

Figure 27B:
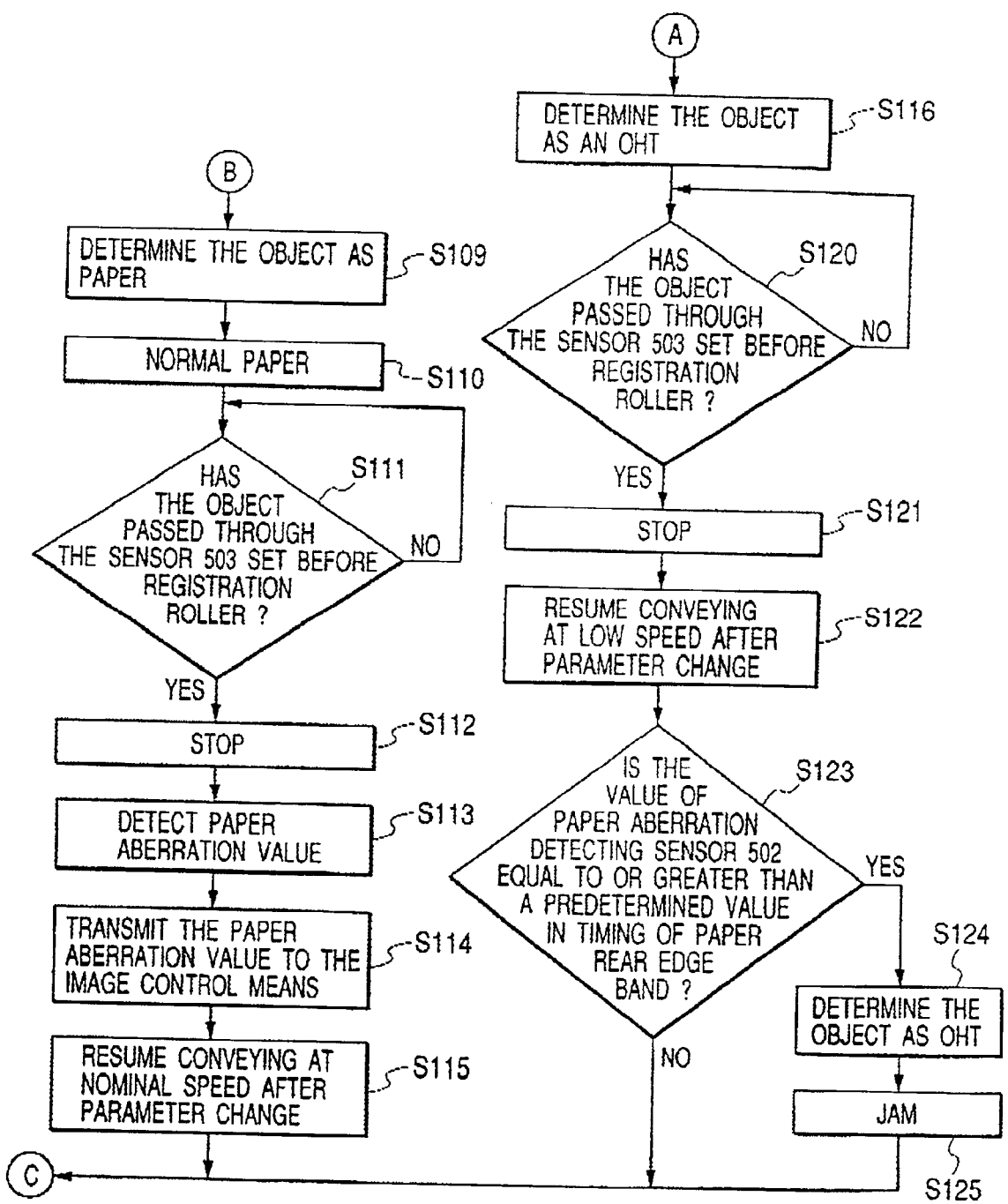
FIG. 27 is comprised of FIGS. 27A and 27B showing flow charts of the paper discriminating operation according to the eight embodiment.

FIGS. 27A and 27B show a flow chart of the CPU 113 when the detection of an OHT sheet is effected by the use of a light-transmissive sensor.

The feature of the flow chart shown in FIGS. 27A and 27B is that the position of paper and normal paper, an OHT sheet and an OHT sheet with a band are detected by a paper position aberration detecting sensor 502 to thereby select an optimum image forming sequence.

The CPU 113, when it receives a print starting signal from the controller 303, starts the conveyance of paper and the detection of the sort (type) of the paper (S100). Paper feeding is started from the paper feeding tray 511 (S101). Next, standby for a predetermined time is effected from the start of paper feeding till the arrival timing of the paper position aberration detecting sensor 502 (S102). Next, the detected value by the paper position aberration detecting sensor 502 is judged and if it is a predetermined value or greater, advance is made to S116, and if it is less than the predetermined value, advance is made to S104. At S104, the object is determined as paper or an OHT sheet with a band, and standby is effected until the object is conveyed for the period of the band of the OHT sheet with a band (S105), and once more the sort (type) of the paper is determined (S106). If at S106, the value of the paper sort (type) sensor is a predetermined value or greater, light has been transmitted after once intercepted by the paper sort (type) sensor and therefore, the object is determined as an OHT sheet with a band (S107), and the conveyance is suspended and jam is judged and reported and the printing operation is stopped (S108). On the other hand, if the aforementioned value is less than the predetermined value, the object is as paper (S109), and normal paper supply is effected (S110).

Thereafter, whether the object has passed the ante-registration detecting sensor 503 is judged (S111), and if it has passed, the object is temporarily stopped at the timing of the registration rollers 504 (S112), and the detection of the amount of paper aberration is effected (S113), and the amount of paper aberration is reported to the controller 302 (S114). Thereafter, the conveyance is resumed at a normal speed (S115).

Description will now be made of S116 and so on. If as the result of the determination at S103, the object has been determined as an OHT sheet (S116), whether it has passed the ante-registration detecting sensor 503 is judged (S120), and if it has passed, the object is temporarily stopped at the timing of the registration rollers 504 (S121), and the conveyance is resumed at a low speed (S122). Here, whether the value of the paper aberration detecting sensor is a predetermined value or greater is again determined at the timing of the trailing edge of the paper (S123), and if it is the predetermined value or greater, the object is determined as a normal OHT sheet, and if it is less than the predetermined value, the object is determined as an OHT sheet with a band (S124), and in that case, jam, is judged and reported and the printing operation is stopped (S125).

(Tenth Embodiment)

Next, an example in which the paper aberration detecting sensor 502 is disposed immediately behind the registration rollers 504 is shown as a tenth embodiment.

Figure 28:
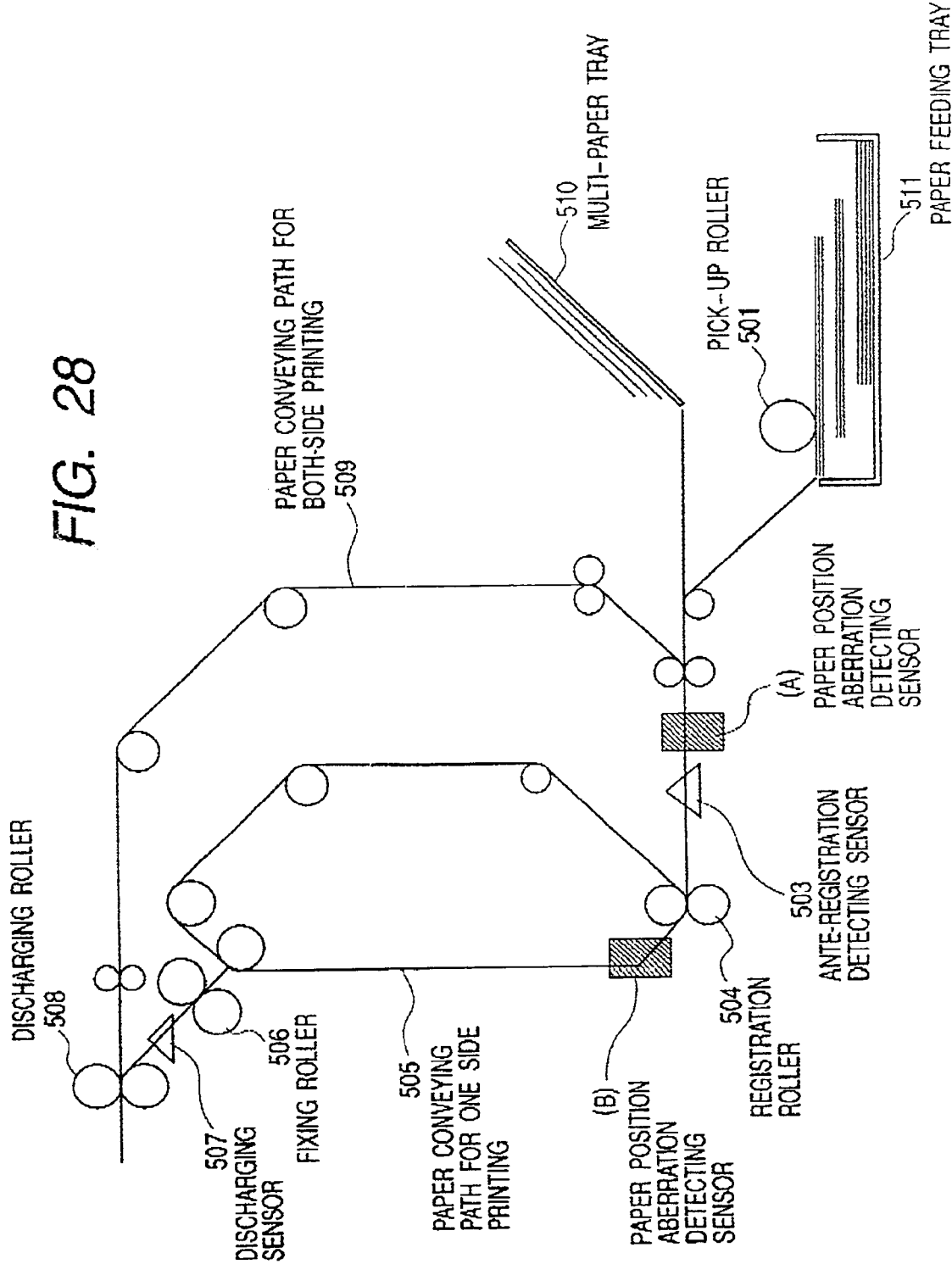
FIG. 28 is a cross-sectional view in which the paper position aberration detecting sensor is disposed as shown at (A) and (B).

Here, an example In which the paper aberration detecting sensor is disposed will be described with reference to a cross-sectional view shown in FIG. 28 (A) in FIG. 28 shows a case where the paper aberration detecting sensor 502 is disposed in the same way as in the aforedescribed first embodiment. Further, (B) in FIG. 28 shows a case where the paper aberration detecting sensor 502 is disposed Immediately behind the registration rollers 504. In the case where the paper aberration detecting sensor 502 is disposed at the position (B), paper position aberration is detected after the paper has arrived at the registration rollers 504 and therefore, skew feed is corrected by the registration rollers 504 and more highly accurate detection of paper position aberration becomes possible. Generally, it is often the case that the time from the registration rollers 504 to the image writing start timing is short. So, here, description will be made of the timing at which the detection of the paper position and the detection of the sort of the paper are effected.

The operation of the paper aberration detecting sensor 502 itself is similar to that in the aforedescribed embodiment and therefore need not be described. The reference characters in the present embodiment are also the same as those in the aforedescribed embodiment.

In the present embodiment, the paper aberration detecting sensor is installed immediately behind the ante-registration detecting sensor 503. Here, limited conditions will be described with reference to the timing chart of FIG. 29.

TOPSYNC signal for detecting the leading edge of the paper is detected and the signal is delivered to the printer controller 302 side. On the printer controller 302 side, the received TOPSYNC signal is subjected to predetermined processing after the rising thereof, and image data is developed and is delivered to the engine controller 303. Here, let it be assumed that the time until the TOPSYNC signal is received and the image is delivered is 0.5 second (see (4) in FIG. 29).

When the installed position of the paper aberration detecting sensor is described as the position (B) in FIG. 28, for the sake of convenience, 0.1 second (see (1) in FIG. 29) is required for the reading-out from the paper aberration detecting sensor 502, and a processing time of 0.3 second (see (2) in FIG. 29) is required for the calculating processing and delivery.

Also, assuming that in the printer controller 302 which has received this information, 0.5 second (see (3) in FIG. 29) is required for image development, when the installed position of the paper aberration detecting sensor 502 is the position (B) in FIG. 28, 1.0 second in total becomes necessary until the information from the paper aberration detecting sensor 502 is reported and processed.

The printer controller 302 requires 0.5 second as the process time for delivering an image signal from the TOPSYNC signal and therefore, becomes incapable of reflecting the total processing time (0.4 second in total) for the amount of position aberration of the paper in image development when it exceeds the processing time (0.5 second) for image development. Consequently, in such a case, it is necessary to make the detecting time for paper position aberration as early as possible and satisfy the processing time of the printer controller.

Figure 30B:
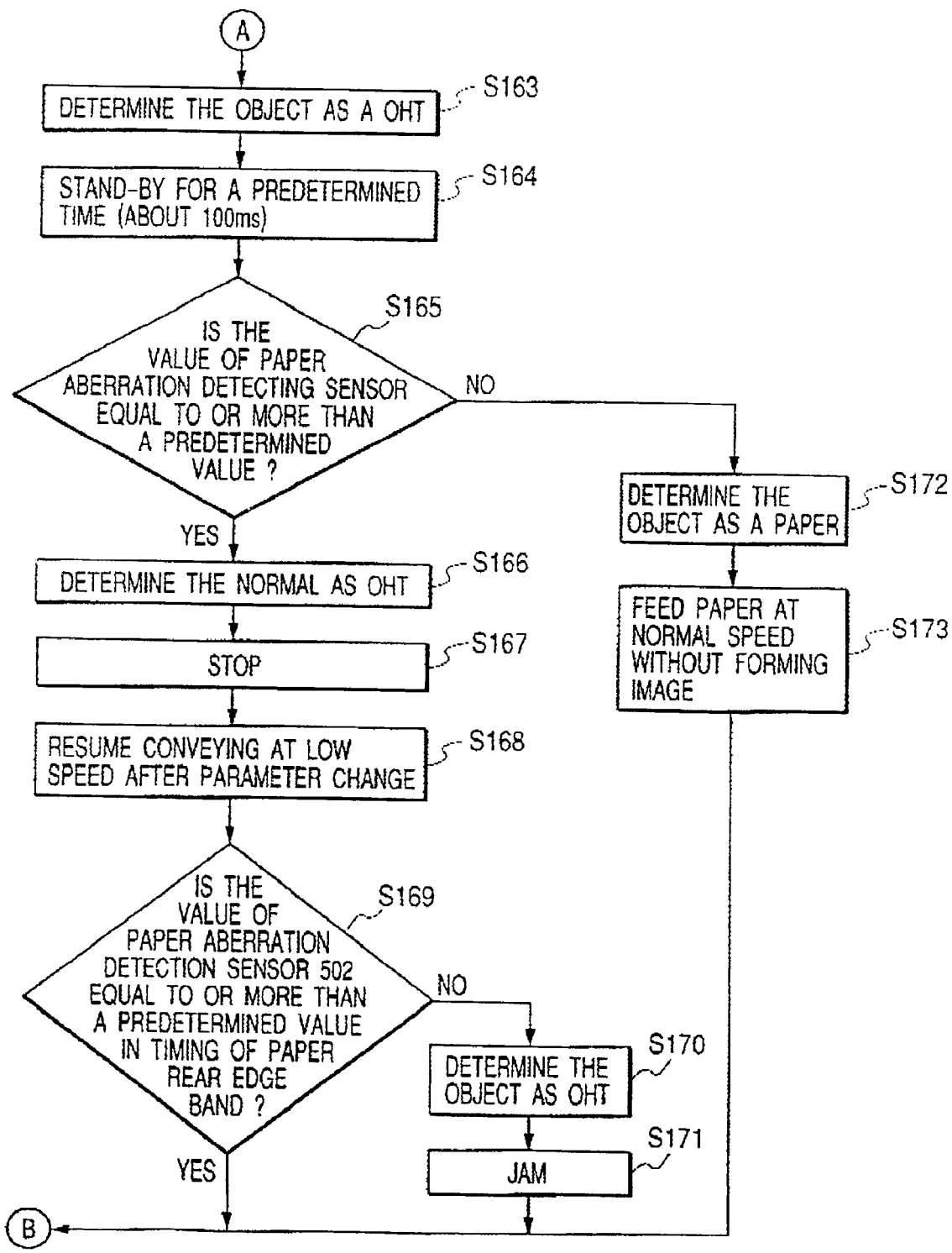
FIG. 30 is comprised of FIGS. 30A and 30B showing flow charts of the paper discriminating operation according to a tenth embodiment.

FIGS. 30A and 30B show a flow chart of the CPU 113 when such OHT sheet detection is effected. The feature of the flow chart shown in FIGS. 30A and 30B is that the result of the detection by the paper aberration detecting sensor 502 is returned to the printer controller 302 as quickly as possible, whereafter the sequence is changed depending on the sort (type) of the paper.

The CPU 113, when it receives a print starting signal from the controller 302, starts paper conveyance, paper position detection and paper sort detection (S150). Paper feeding is started from the paper feeding tray 511 (S151). Next, standby is effected until the paper passes the ante-registration detecting sensor 503 (S152). Next, standby is effected for a predetermined time till the arrival timing of the paper (S153). Next, the value of the paper aberration detecting sensor 502 is detected, and is reported to the controller 302 (S154). Next, the value of the paper aberration detecting sensor 502 is judged (S155), and if it is a predetermined value or greater, advance is made to S163, and if it is less than the predetermined value, advance is made to S156. That is, after the value of paper aberration is detected, the sort of the paper is discriminated by that value.

At S156, the object is determined as paper or an OHT sheet with a band, and standby is effected until the OHT sheet with a band is conveyed for the period of the band thereof (S157), and once more the sort of the paper is determined (S158). If at S159, the value of the paper aberration detecting sensor 502 is the predetermined value or greater, light has been transmitted after once intercepted by the paper sort (type) sensor and therefore, the object is determined as an OHT sheet with a band (S159), and the conveyance thereof is suspended and jam is judged and reported and also, the printing operation is stopped (S160). On the other hand, if the aforementioned value is less than the predetermined value, the object is determined as paper (S161), and normal paper supply is effected (S162).

Description will now be made of S163 and so on. If as the result of S155, the object is determined as an OHT sheet (S163), standby is effected for a predetermined time (S164), and whether the value of the paper aberration detecting sensor 502 is a predetermined value or greater is determined (S165), and if it is less than the predetermined value, it is judged that the paper conveyance is delayed (S172), and image information is not effected (S173). At this time, jam is not judged and the paper is conveyed out of the apparatus.

On the other hand, if the aforementioned value is the predetermined value or greater, the object is determined as a normal OHT sheet (S166), and the conveyance is temporarily stopped (S167). Thereafter, the value is changed into an image formation parameter for the OHT sheet, and low-speed conveyance is resumed (S168). Here, whether the value of the paper aberration detecting sensor 502 is the predetermined value or greater Is again determined at the timing of the trailing edge of the paper (S169), and if it is the predetermined value or greater, the object is determined as a normal OHT sheet, and if it is less than the predetermined value, the object is determined as an OHT sheet with a band (S170), and jam is judged and is reported and the printing operation is stopped (S171).

(Eleventh Embodiment)

In an eleventh embodiment, description will be made of the processing after at S108 and S125 in the flow chart of FIGS. 27A and 27B and S160 and S171 in the flow chart of FIGS. 30A and 30B, the paper being supplied by the engine controller 303 is determined as an OHT sheet with a band.

When the paper being supplied by the engine controller 303 is determined as an OHT sheet with a band and jam is judged, it imparts damage to the fixing portion and therefore, the printing operation must be resumed after the jam has been reliably treated. For that purpose, design is made such that the printing operation is resumed only when all of the following conditions are satisfied.

(1) The use closes the door after he has opened the door.
(2) No paper is detected on the paper conveying path when the door is closed.
(3) No paper is detected at any sensor during the check-up of any residual paper after the door has been closed.

The printing operation is resumed only when all these conditions are satisfied, whereby the possibility of conveying an OHT sheet with a band to the fixing portion to thereby impart damage thereto can be eliminated.

(Twelfth Embodiment)

In the aforedescribed eleventh embodiment, description has been made of the processing after the paper being supplied by the engine controller 303 is determined as an OHT sheet with a band. However, when the power source of the printer is switched off, the engine controller 303 does not memorize jam information.

So, in a twelfth embodiment, in order to cope with this problem, nonvolatile storing means is provided in the printer controller, and the jam information of the OHT sheet with a band is stored in this storing means, and during the switching-on of the power source, this information is reported to the engine controller, whereby it becomes possible to reliably stop the conveyance of the OHT sheet with a band. For this purpose, the engine controller is designed to judge that when the following conditions are satisfied during the switching-on of the power source, an OHT sheet with a band is residual in the printer, and not to perform the printing operation.

(1) During the switching-on of the power source, the information of the jam of the OHT sheet with a band from the printer controller 302 is received, and during the switching-on of the power source, paper is detected on the paper conveying path.
(2) During the switching-on of the power source, the information of the jam of the OHT sheet with a band from the printer controller 302 is received, and during the check-up of any residual paper during the initial operation of the printer, paper has been detected at any one sensor.

When any one of these conditions is satisfied, the printing operation is not performed, whereby even when the power source is switched off after the jam, the possibility of conveying the OHT sheet with a band to the fixing portion to thereby impart damage thereto can be eliminated.

While in the aforedescribed embodiment, there has been shown an example in which paper aberration and paper sort are detected at a time, or paper aberration is detected, whereafter paper sort (type) is detected, design may be made such that paper sort (type) is detected by the detected value by the paper aberration detecting sensor 502, whereafter the amount of paper aberration is detected.

Also, design may be made such that during the conveyance of the paper, the paper is temporarily stopped, and the amount of paper position aberration and the sort (type) of the paper are detected.

Also, design may be made such that when the paper is fed in a direction opposite to the direction in which the OHT sheet with a band is fed, the printing operation is suspended.

The details of the method of detecting the position aberration and sort (type) of the sheet in each of the above-described embodiments will now be described as thirteenth and fourteenth embodiments.

(Thirteenth Embodiment)
(Position Aberration Detecting Method)

Reference is had to FIGS. 31A and 31B to describe means for detecting any position aberration occurring when a sheet is conveyed from a feeding port, by the use of a paper position aberration detecting sensor ("CIS"=contact image sensor) in the thirteenth embodiment.

The epitome of the CIS is such as described in connection with FIG. 5.

FIGS. 31A and 31B show the disposition relation between a sensor for detecting both of the position aberration and sort (type) of a sheet in the image forming apparatus and the sheet, and the timing with signals inputted to and outputted from the sensor.

As shown in FIG. 31A, a light emitting element 32 has an LED 34 and a light guide 35, and light emitted from the LED 34 is uniformly applied to a light receiving element 33 by the light guide 35. As the light receiving element 33, use is generally made of one in which a photodiode is constructed into an array shape. Also, as shown in FIG. 31B, the output of the light receiving module (CIS 31) of the light receiving element 33 is not put out but becomes OFF when the light from the light emitting element 32 is intercepted by the sheet P.

The position at which ON and OFF are changed over is fluctuated by the disposition of the sheet. The ON/OFF signal indicative of the interception and transmission of the light reacts to each one light receiving element, and is outputted as a serial analog signal. Accordingly, it becomes possible to detect the amount of position aberration of the sheet by producing a pulse signal obtained by binarizing the analog signal by a predetermined slice level voltage, and counting the amount of the pulse signal.

Figure 32:
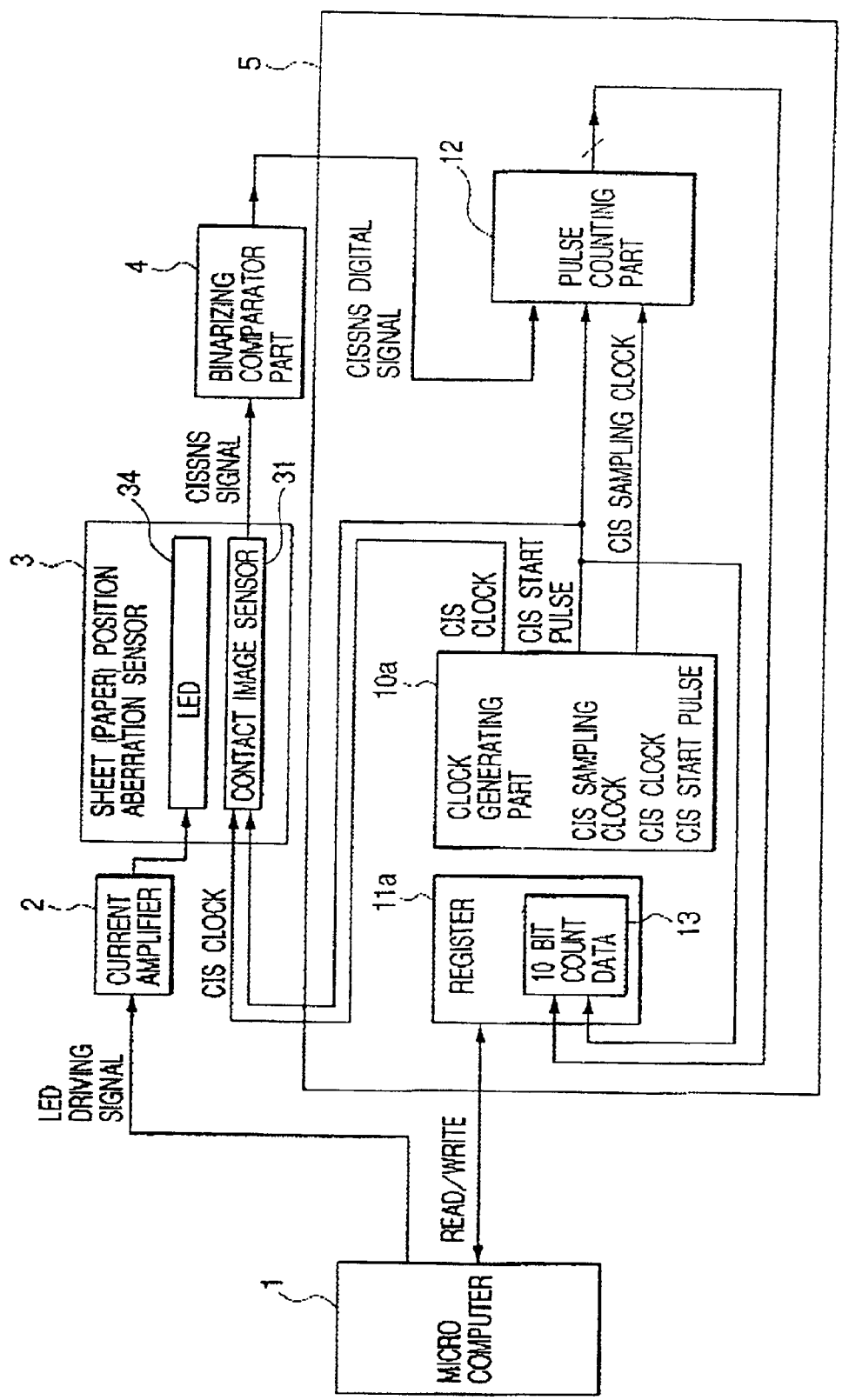
FIG. 32 is a block diagram showing a detecting circuit when the sensor for detecting both of the position aberration and sort (type) of the sheet in the image forming apparatus is used with a sheet position aberration detecting sensor.
Figure 33:
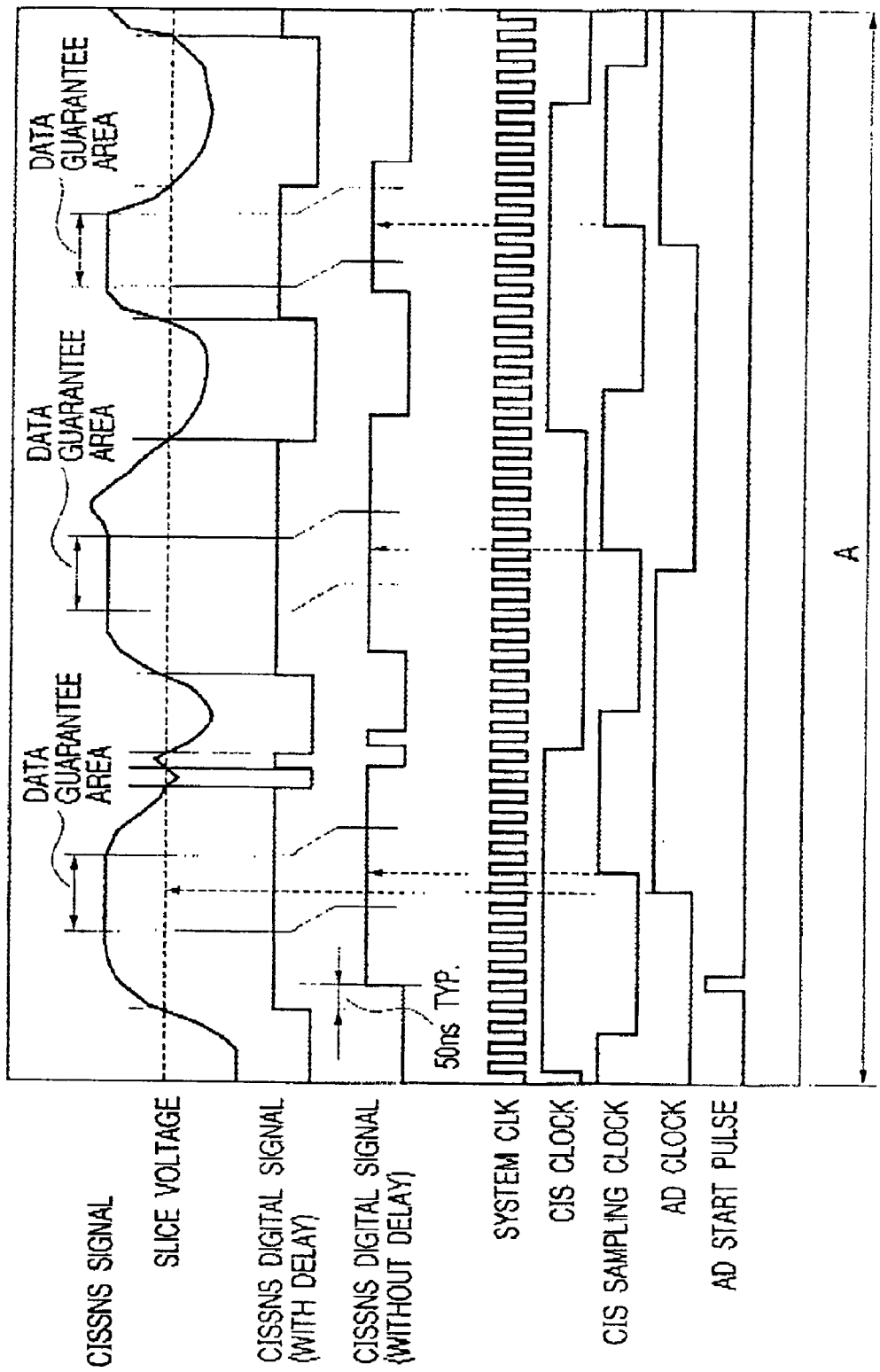
FIG. 33 shows CISSNS signal outputted by a contact image sensor in the image forming apparatus, the sampling operation for the CISSNS signal and the timing of each signal relating to an AD converter part.

A counting technique for the pulse signal outputted by the CIS 31 will now be described with reference to FIGS. 32 and 33. FIG. 32 shows a block diagram of a detection circuit when the sensor for detecting both of the position aberration and sort (type) of the sheet in the image forming apparatus is used with a sheet position aberration sensor. FIG. 33 shows CISSNS signal outputted by the CIS 31 in the image forming apparatus and the sampling operation for the CISSNS signal and the timing of each signal relating to an AD converter part.

In FIG. 32, a module for counting the pulse signal is comprised of a microcomputer 1, a current amplifier part 2, a position aberration & sort detecting sensor 3 as a sheet detecting sensor, a binarizing comparator part 4 and a logic module 5. The microcomputer 1 outputs a signal for driving the LED 34 constructed in the position aberration & sort detecting sensor 3. By the outputted LED driving signal, a current is amplified by the current amplifier part 2 and drives the LED 34, whereby light is emitted therefrom. The emitted light, as described in connection with FIG. 31A, is uniformly applied to the array-shaped light receiving element by the light guide.

In the logic module 5, CIS clock (e.g. of the order of 500 KHz-1 MHz) and CIS start pulse to be inputted to the CIS 31 are generated by a clock generating part 10a, and are inputted to the CIS 31. The CIS 31, as shown in FIG. 33, starts to scan the array-shaped light receiving element 33 in synchronism with the CIS start pulse, and serially outputs position aberration analog data of the same clock width as the CIS clock.

An outputted position aberration analog data signal (hereinafter referred to as the CISSNS signal) is shown in FIG. 33. This CISSNS signal has a predetermined data guarantee area and therefore, it is necessary to sample it after a predetermined time has elapsed from the rising timing of the CIS clock. When sampling is to be effected, pulse counting is effected as digital data. That is, the CISSNS signal is compared with a predetermined slice level voltage by the binarizing comparator part 4, and is converted into a digital pulse signal "0" or "1". This digital pulse signal will hereinafter be represented as CISSNS digital signal. In the binarizing comparator part 4, however, the delayed time (e.g. 50 ns) of response occurs and therefore a data guarantee area taking also the delay time of the CISSNS digital signal into account is sampled.

The CIS sampling clock of FIG. 33 is one generated with a delay of a predetermined period from the rising edge of the CIS clock so as to become the timing for reliably effecting sampling in this data guarantee area.

Also, the CISSNS signal is serially outputted in synchronism with both of the rising and falling edges of the CIS clock. Therefore, the CIS sampling clock Is generated so that the frequency thereof may become double the frequency of the CIS clock, and the CISSNS digital signal is sampled at the rising edge of the CIS sampling clock.

A pulse counting part 12 in FIG. 32 starts counting in synchronism with the CIS start pulse inputted from the clock generating part 10a. The counting of the CISSNS digital signal is effected by the CIS sampling clock of the clock generating part 10a, and the counted data value is latched, for example, as 10-bit count data 13 in a register 11a comprised of a logic module 5. The latching operation is performed in synchronism with the CIS start pulse in the clock generating part 10a. Thereafter, the latched count data is read out by the microcomputer 1, whereby it becomes possible to detect the amount of position aberration occurring when the sheet is conveyed to the feeding port.

(Sheet Sort Detecting Method)

Means for detecting the sort of a sheet such as an OHT by the use of the CIS 31 will now be described with reference to FIGS. 34 to 37.

In the present embodiment, the position aberration & sort (type) detecting sensor is disposed behind the feeding port in order that it may be used as a sensor for discriminating the sorts (types) of both sheets conveyed from the cassette and the multi-paper tray.

Figure 34:
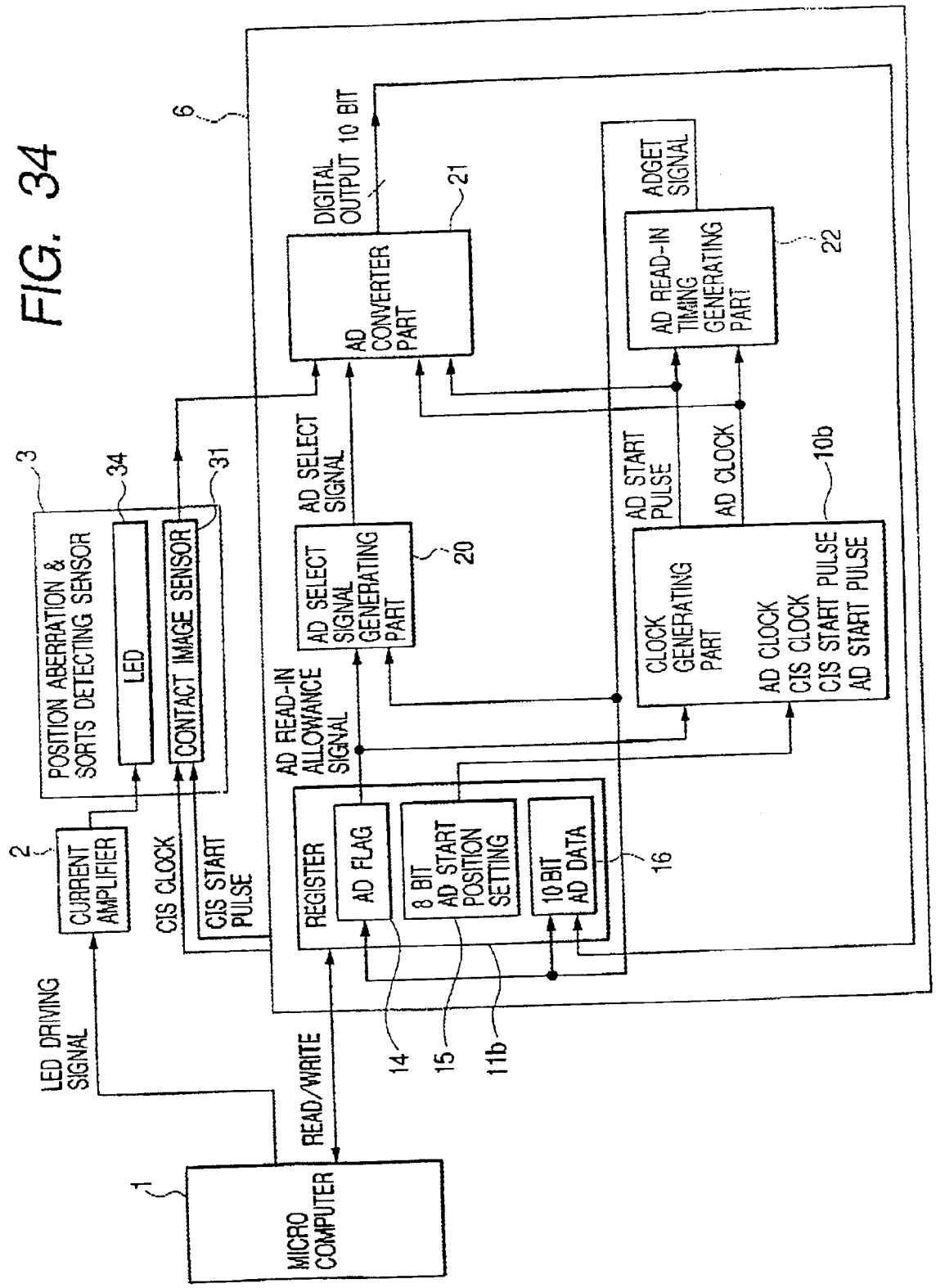
FIG. 34 is a schematic circuit block diagram showing a construction for detecting both of the position aberration and sort (type) of a sheet in an image forming apparatus according to a thirteenth embodiment.

FIG. 34 is a schematic circuit block diagram showing a construction for detecting both of the position aberration and sort (type) of a sheet in the image forming apparatus. For the sake of convenience, the above-described construction block for sampling the CISSNS signal obtained by binarizing the CISSNS signal outputted by the CIS 31 is omitted in FIG. 34.

Figure 35:
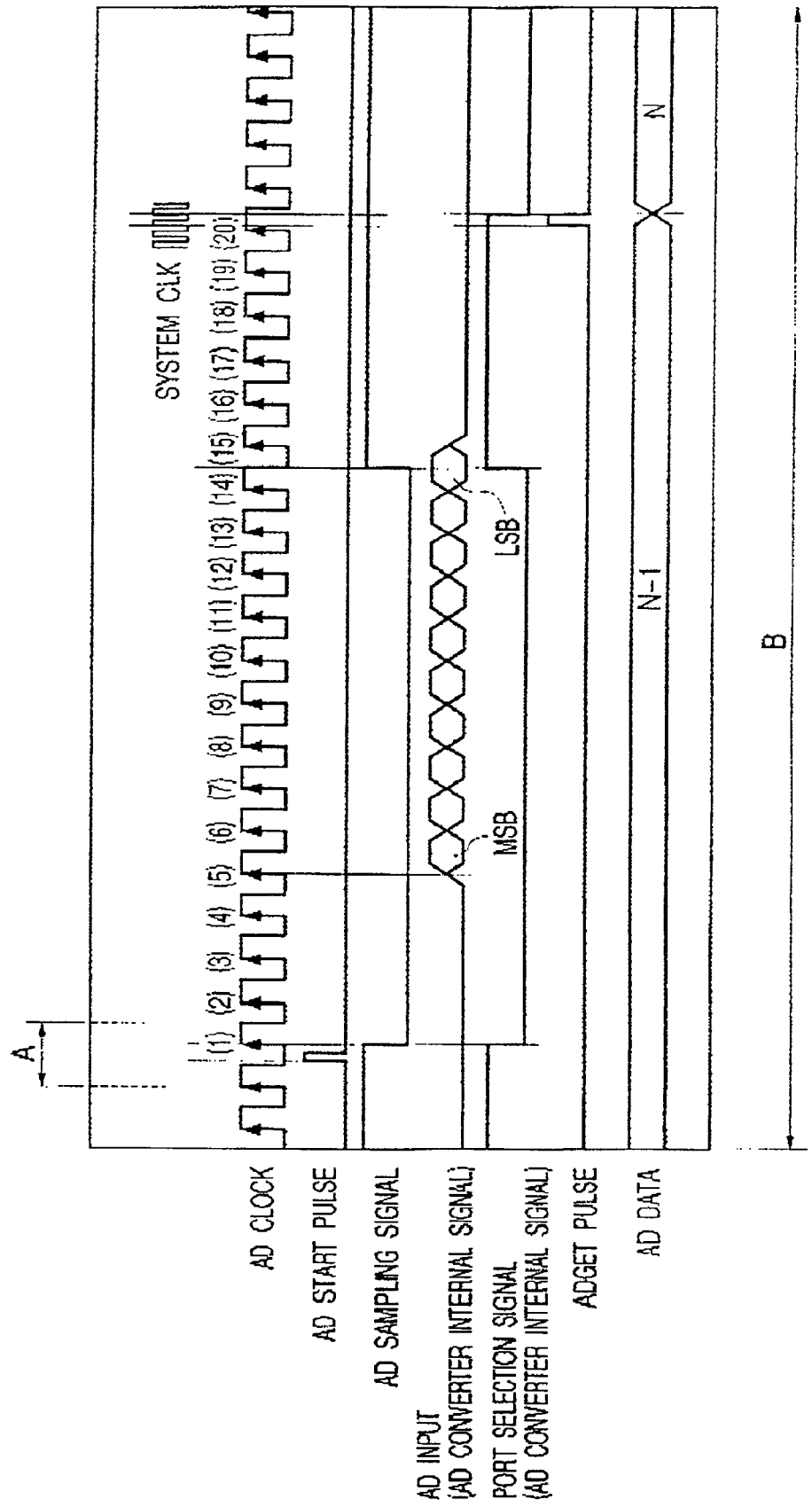
FIG. 35 shows the timing of each signal in an AD read-in timing generating part in the image forming apparatus.
Figure 36:
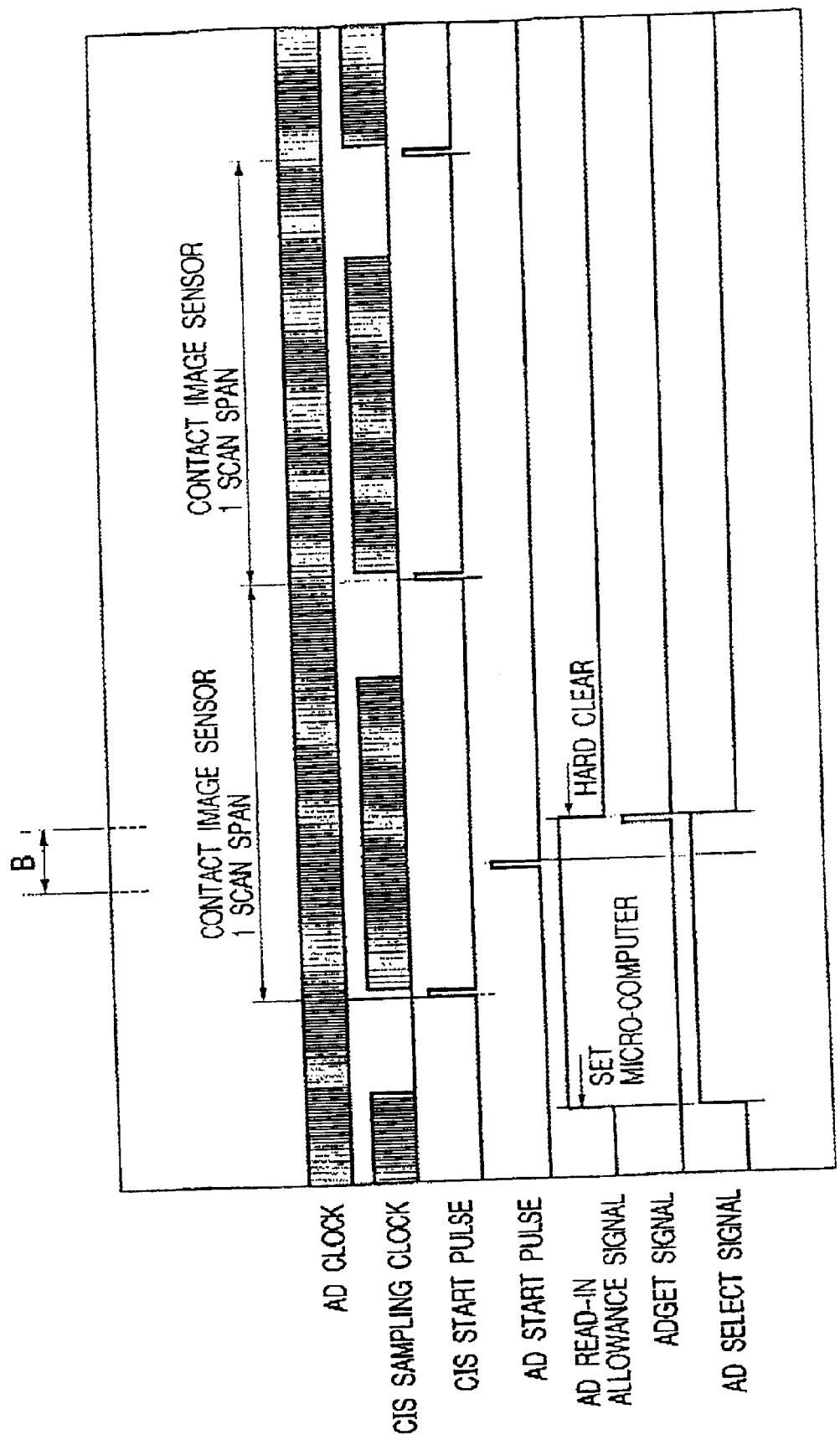
FIG. 36 shows the timing of signals in one scan of a contact image sensor in the image forming apparatus.

FIG. 33 shows the CISSNS signal outputted by the CIS 31, the sampling operation for the CISSNS signal and the timing of each signal relating to the AD converter part 21. FIG. 35 shows the timing of each signal in an AD read-in timing generating part in the image forming apparatus. FIG. 36 shows the timing of signals in one scan of the CIS 31 in the image forming apparatus. The timing A in FIG. 33 is the same as the timing A in FIG. 34, and the timing B in FIG. 34 is the same as the timing B in FIG. 35.

In FIG. 34, a module for detecting the voltage value of the CISSNS signal outputted by the CIS 31 by the use of the AD converter part 21 is comprised of a microcomputer 1, a current amplifier part 2, a position aberration & sort (type) detecting sensor 3 and a logic module 6. CIS clock and CIS start pulse inputted to the position aberration & sort (type) detecting sensor 3 and outputted CISSNS signal are similar to those in the above-described sheet position aberration detection and therefore need not be described.

The logic module 6 is comprised of an AD converter part 21, an AD read-in timing generating part 22, an AD select signal generating part 20, a clock generating part 10b and a register 11b. The register 11b is comprised of an AD flag register 14 (1 bit), an AD start position setting register 15 (8 bits) and an AD data register 16 (10 bits).

The AD flag register 14 is set by the microcomputer 1, and performs the latching and outputting of an AD read-in allowance signal. The AD start position setting register 15 has its data set by the microcomputer 1, and the CISSNS signal in what position in one scan of the CIS 31 is to be monitored is set. Digital data outputted by the AD converter part 21 is latched in the AD data register 16 by ADGET signal which will be described later. The AD flag register 14 set by the microcomputer 1 is cleared by the ADGET signal. The AD data register 16 is renewed into new data in synchronism with the ADGET signal.

The AD read-in allowance signal outputted from the AD flag register 14 is inputted to the AD select signal generating part 20 and an AD select signal is generated. The timing of the AD read-in allowance signal and the timing of the AD select signal are shown in FIGS. 35 and 36, respectively. The AD select signal is set to H in synchronism with the AD read-in allowance signal. The AD converter part 21, when the H level is inputted thereto from the AD select signal, sampling-charges a capacitor therein with an analog voltage applied to the input terminal thereof. When an AD start pulse is outputted, a port select signal is set to L in a predetermined time (the order of 1 $\mu$s or less) thereafter, and the holding of the analog signal sampled is effected. This port select signal is generated to change over a plurality of analog input ports, and enables the detection of a plurality of analog voltages in the image forming apparatus to be effected.

In the AD converter part 21, when the AD start pulse is inputted thereto, the AD sampling signal and the port select signal are set to L in synchronism with the rising edge of the next AD clock, and the analog voltage thitherto sampled and charged in the internal capacitor is held. Then, the generation and latching of digital data by each 1 bit are effected in synchronism with the rising of the fifth AD clock from the inputting of the AD start pulse.

In the AD read-in timing generating part 22, ADGET signal to be read into the AD data register 16 is generated in synchronism with the rising edge of a system clock (a basic clock for operating the logic module 6) generated after the rising of the twentieth AD clock from the inputting of the AD start pulse. Also, the AD flag register 14 and the AD select signal are hard-cleared in synchronism with this ADGET signal.

Also, the timing for holding the analog voltage having charged the internal capacitor of the AD converter part 21 is determined by the timing of the AD start pulse and the AD clock. The timing for holding is set so as to be effected in the data guarantee area of the analog voltage outputted by one light receiving element of the CIS 31. The analog pulse outputted by one light receiving element of the CIS 31 is primarily determined by CIS clock inputted to the CIS 31 and therefore, the AD clock and the CIS clock are generated at such predetermined timing shown in FIG. 33.

Also, as previously described, the analog voltage having charged the internal capacitor of the AD converter part 21 is held in synchronism with the rising edge of the AD clock after the inputting of the AD start pulse and therefore, the position into which the CISSNS is to be read-can be varied by the position of the AD start pulse set in one scan of the CIS 31. That is, in all positions of the sheet, it becomes possible to effect the reading-in of the CISSNS signal outputted by the CIS 31. Accordingly, it becomes possible to effect the detection of the sort of the sheet in all positions of the sheet.

Figure 37:
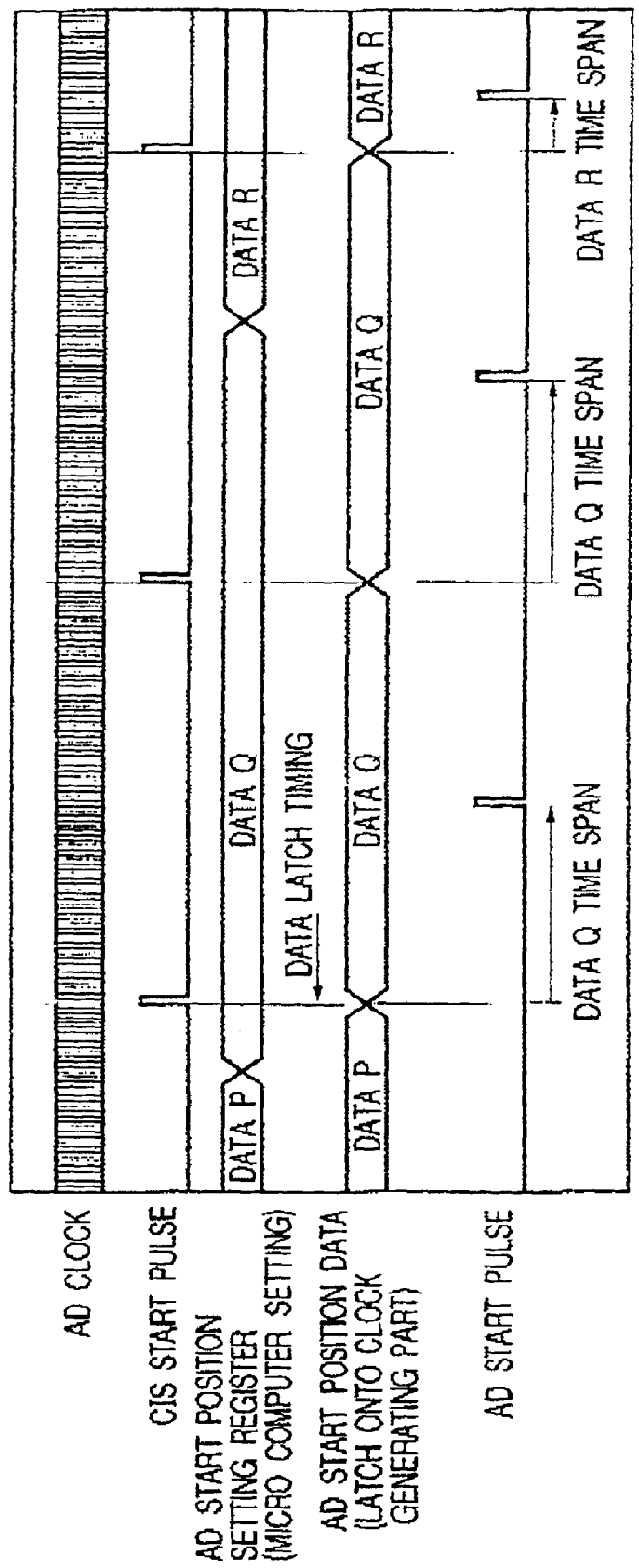
FIG. 37 shows the timing of signals relating to the generation timing of an AD start pulse in one scan of a contact image sensor in the image forming apparatus according to the thirteenth embodiment.

An example of the technique of setting the generation timing of the AD start pulse in one scan of the CIS 31 will now be described with reference to FIG. 37. FIG. 37 shows the timing of signals relating to the generation timing of the AD start pulse in one scan of the contact image sensor in the image forming apparatus.

The microcomputer 1 sets in the AD start position setting register 15 a position at which the sort of the sheet is to be detected. For example, when setting is made variable at a position whereat one scan is divided into 256, an 8-bit register is set to a predetermined value. The generated position signal of the set AD start pulse is inputted to the clock generating part 10b, and is latched in synchronism with the CIS start pulse. The AD start pulse is generated in a time corresponding to the latched data, and is outputted to the AD converter part 21 and the AD read-in timing generating part 22.

The analog output value of the CISSNS signal outputted by the position aberration & sort detecting sensor 3 is monitored in accordance with the AD start pulse generated in this manner, whereby it becomes possible to detect the analog voltage value outputted by the light receiving element 33 in all positions of the sheet.

Although in the thirteenth embodiment, design is made such that during one scan of the CIS 31, the detection of the sort (type) of the sheet is effected once, if a register is discretely constructed or design is made such that during one scan, the AD start pulse signal is generated a plurality of times at predetermined time intervals, the detection of the sort (type) of the sheet can be easily effected at least twice at a plurality of positions.

Also, the detection of the sort (type) of the sheet can be effected at least twice at a plurality of positions, whereby it becomes possible to precisely detect an OHT with a band or a punched sheet. Also, even when each element of the CIS 31 partly goes wrong, it becomes possible to cope with the trouble easily by using only the value of a light receiving element which has not gone wrong.

Also, while in the thirteenth embodiment, description has been made of the CIS 31, the detection of the sort (type) of the sheet can be effected easily even when the CIS 31 is replaced with an area image sensor using a CCD, a CMOS or the like.

(Fourteenth Embodiment)

A fourteenth embodiment of the present invention will now be described with reference to the drawings. In the following description, constructions similar to those in the aforedescribed embodiment are given similar reference characters and need not be described.

An image forming apparatus according to the fourteenth embodiment is characterized in that regarding the analog output value of the CIS 31, the peak value (the maximum amount of change) of the voltage is sampled and held for a predetermined period and the sampled and held voltage is detected by an AD converter or the like to thereby discriminate the sort of a sheet.

The technique of detecting any position aberration occurring when the sheet is conveyed to the feeding port by using the CIS 31 in the fourteenth embodiment is similar to that in the thirteenth embodiment and need not be described.

Figure 38:
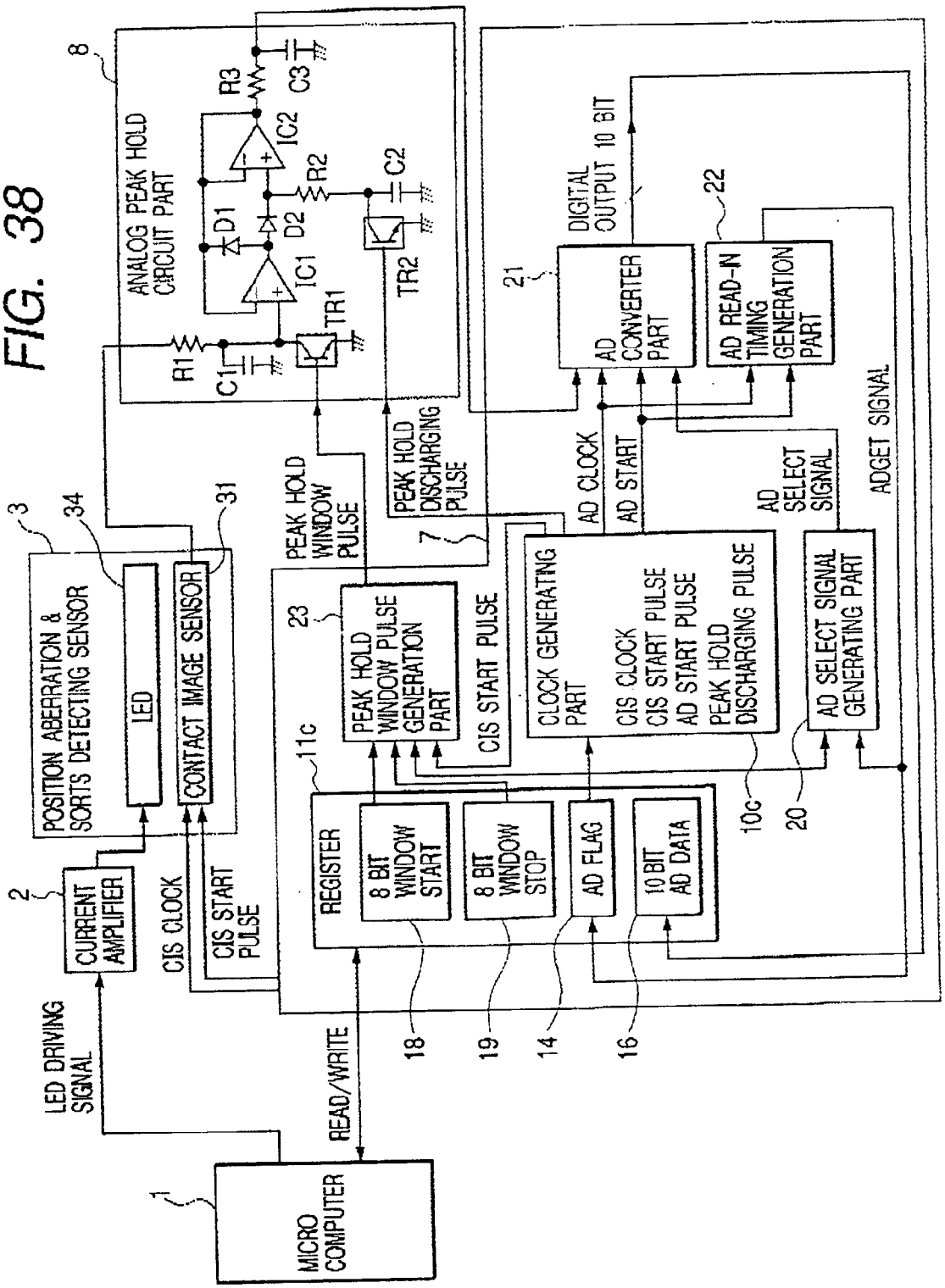
FIG. 38 is a schematic circuit block diagram showing a construction for detecting both of the position aberration and sort (type) of a sheet in an image forming apparatus according to a fourteenth embodiment.

FIG. 38 is a schematic circuit block diagram showing a construction for detecting both of the position aberration and sort of the sheet in the image forming apparatus. Specifically, it shows a schematic module construction for detecting the peak value of the CISSNS signal outputted by the CIS 31 by a peak hold circuit part 8, and digitally converting the peak voltage value by an AD converter part 21. For the sake of convenience, a construction for sampling the CISSNS digital signal obtained by binarizing the CISSNS signal outputted by the CIS 31 is omitted in FIG. 38.

Figure 39:
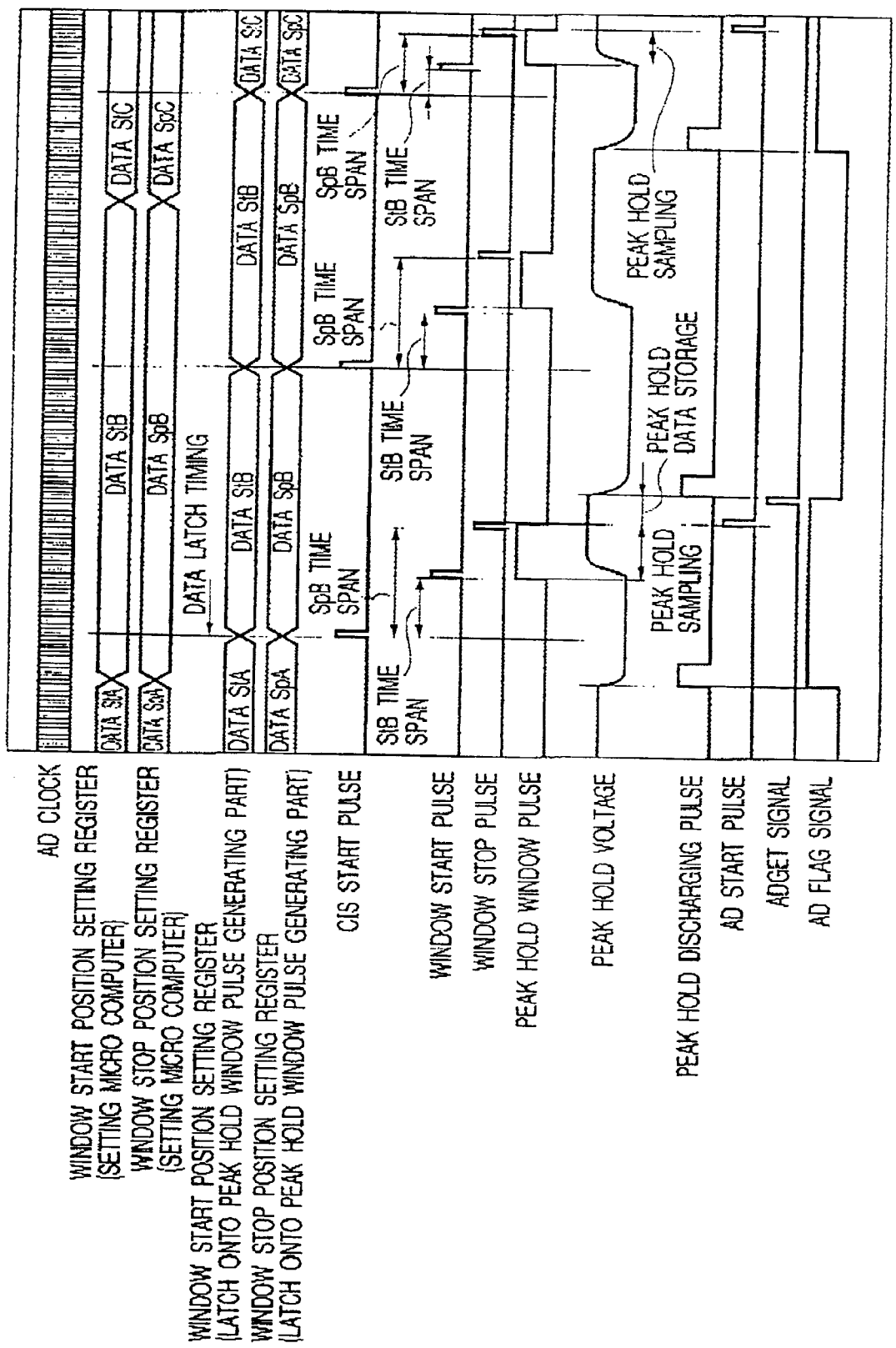
FIG. 39 shows a peak-held analog voltage and the timing of each signal relating to an analog peaks hold circuit part and an AD converter part in the image forming apparatus according to the fourteenth embodiment.

FIG. 39 shows the peak-held analog voltage and the timing of each signal relating to the analog peak hold circuit part and the AD converter part in the image forming apparatus.

In FIG. 38, a signal inputted to and a signal outputted from the position aberration & sort (type) detecting sensor 3 are similar to those in the sheet position aberration detection described in the thirteenth embodiment and therefore need not be described.

A module for detecting the analog voltage value outputted by the analog peak hold circuit 8 by the use of the AD converter part 21 is comprised of a microcomputer 1 and a logic module 7. The logic module 7 in turn is comprised of the AD converter part 21, an AD select signal generating part 20, a clock generating part 10c, a peak hold window pulse generating part 23 and a register 11c. The register 11c is comprised of an AD flag register 14 (1 bit), a window start position setting register 18 (8 bits), a window stop position setting register 19 (8 bits) and an AD data register 16 (10 bits).

The AD flag register 14 is set by the microcomputer 1, and the latching and outputting of an AD read-in allowance signal are effected. The window start position setting register 18 and the window stop position setting register 19 are set by the microcomputer 1 and in one scan of the CIS 31, at what time span an analog pulse signal at what position is monitored is set. As in the thirteenth embodiment, digital data outputted by the AD converter part 21 is latched in the AD data register 16 by the ADGET signal. The AD flag register 14 set by the microcomputer 1 is cleared by the ADGET signal, and the AD data register 16 is renewed into new data by the ADGET signal.

As in the thirteenth embodiment, the AD read-in allowance signal outputted from the AD flag register 14 is inputted to the AD select signal generating part 20, and an AD select signal is generated. Also, the AD clock and AD start pulse inputted to the AD converter part 21, the internal operation of the AD converter part 21 and the ADGET signal outputted from the AD read-in timing generating part 22 are similar to those in the thirteenth embodiment and therefore need not be described.

The microcomputer 1 sets in the aforedescribed window stop position setting register 19 a position for peak-hold-detecting the CISSNS signal outputted by the CIS 31. For example, when setting is made variable at a position whereat one scan is divided into 256, an 8-bit register is set.

The values of the set window start position setting register 18 and window stop position setting register 19 are inputted to the peak hold window pulse generating part 23 and are latched in synchronism with the CIS start pulse.

In the peak hold window pulse generating part 23, there are generated a window start pulse corresponding to the value of the window start position setting register 18 and a window stop pulse corresponding to the value of the window stop position setting register 19. A peak hold window pulse set to H level by the window start pulse and cleared to L level by the window stop pulse is then generated and is inputted to the analog peak hold circuit part 8.

A peak hold discharge pulse is generated in the clock generating part 10c. The peak hold discharge pulse is a pulse signal for effecting the discharge of charges peak-held by the analog peak hold circuit 8. As shown in FIG. 39, the peak hold discharge pulse is outputted in synchronism with both of the rising edge and falling edge of the AD read-in allowance signal.

Description will now be made of the operation in the analog peak hold circuit part 8 to which the peak hold window pulse and the peak hold discharge pulse have been inputted.

The analog peak hold circuit part 8 peak-samples the CISSNS signal inputted from the CIS 31 in accordance with the peak hold window pulse. When the peak hold window pulse is at L level, a transistor TR1 is turned on and therefore, the CISSNS signal is inputted to an operational amplifier IC1. A resistor R1 and a capacitor C1 together constitute a filter for eliminating the noise of the CISSNS signal.

The operational amplifier IC1 buffer-outputs the inputted CISSNS signal. The output of the operational amplifier IC1, however, outputs a value higher by the Vf voltage of a diode D1 relative to an input voltage. A value having dropped by the Vf voltage of a diode 2 is inputted to an operational amplifier IC2. Accordingly, the Vf voltages of the diode D1 and the diode D2 are offset and are buffer-outputted. The diode 2, a resistor R2 and a capacitor C2 have their peak voltages held when a transistor TR2 is OFF. Conversely, when the peak hold discharge pulse is H, the transistor TR2 is turned on and therefore, charges accumulated in the capacitor C2 are discharged. The operational amplifier IC2 outputs to the AD converter part 21 the voltage value of the peak hold window pulse peak-value-held for a period L. Thereafter, the discharge of a voltage sampled by the peak hold discharge pulse is effected.

The analog output value of the CISSNS signal outputted by the position aberration & sort (type) detecting sensor 3 having detected in the manner described above is latched in an AD data register 16 by an operation similar to that of the AD converter part 21 in the thirteenth embodiment. The latched AD data is read out by the microcomputer 1, whereby it becomes possible to detect the analog voltage value of the light receiving element 33 in all positions of the sheet.

While in the fourteenth embodiment, design is made such that the peak hold detection of the sort (type) of the sheet is effected once in one scan of the CIS 31, if a register is discretely constructed or design is made such that the window start signal and the window stop signal are generated a plurality of times at predetermined time intervals in one scan, the detection of the sort (type) of the sheet can be easily effected at least twice at a plurality of positions in one scan.

Also, the detection of the sort of the sheet is effected at least twice at a plurality of positions, whereby it becomes possible to precisely detect an OHT with a band or a punched sheet. Also, even when each element of the CIS 31 partly goes wrong, it becomes possible to cope with the trouble easily by using only the value of a receiving element which has not gone wrong.

Also, while in the fourteenth embodiment, description has been made of the CIS 31, the detection of the sort (type) of the sheet can be effected easily even when the CIS 31 is replaced with an area image sensor using a CCD, a CMOS or the like.

Also, while in the fourteenth embodiment, description has been made of the construction in which the analog CISSNS signal outputted by the CIS 31 is peak-held, a sensor or a detecting mechanism for detecting the position aberration of a sheet which resembles it is constructed and a minimum output value, an integrated mean value or the like is detected, whereby it is also possible to effect the detection of the sort (type) of the sheet.

(Fifteenth Embodiment)

A fifteenth embodiment of the present invention will hereinafter be described in detail with reference to the drawings. In the following description, constructions similar to those in the aforedescribed embodiment are given similar reference characters and need not be described.

An image forming apparatus according to the fifteenth embodiment is characterized in that regarding the analog output value of the CIS 31, the peak value of a voltage is sampled and held for a predetermined period, and the sampled and held voltage is detected by an AD converter contained in the microcomputer 1, whereby the sort (type) of a sheet is discriminated.

FIG. 40 is a schematic circuit block diagram showing a construction for detecting both of the position aberration and sort (type) of a sheet in the image forming apparatus. Specifically, it schematically shows a module construction for detecting the peak value of the CISSNS signal outputted by the CIS 31 by the analog peak hold circuit part 8, and digitally converting the peak voltage value by the AD converter contained in the microcomputer 1. For the sake of convenience, a construction for sampling CISSNS digital signal obtained by binarizing the CISSNS signal outputted by the CIS 31 is omitted in FIG. 40.

A module for detecting the analog voltage value outputted by the analog peak hold circuit part 8 by the use of the AD converter part 21 contained in the microcomputer 1 is comprised of the microcomputer 1 and a logic module 9. The logic module 9 in turn is comprised of a clock generating part 10*d*, a peak hold window pulse generating part 23 and a register 11*d*. The register 11*d* is comprised of an AD flag register 14 (1 bit), a window start position setting register 18 (8 bits) and a window stop position setting register 19 (8 bits).

The AD start pulse generated by the clock generating part 10*c* and the AD data register 16 constructed in the register 11*c* in the fourteenth embodiment are not necessary in the fifteenth embodiment because they are processed by the AD converter in the microcomputer 1. The clock generating portion 10*c* and the register 11*c* from which this AD converter function has been eliminated are the clock generating part 10*d* and the register 11*d*. Accordingly, the writing (setting and cleaning) of data into the register 11*d* is effected by the microcomputer 1.

The technique of reading in the analog detection signal outputted from the analog peak hold circuit part 8, as compared with that in the thirteenth embodiment, is increased in speed surplus regarding the read-in timing or the like of the AD converter. In the thirteenth embodiment, sampling after the predetermined time is necessary because of the data guarantee area (the order of 300 ns) of the CISSNS signal, whereas in the present embodiment, the sampling and holding by the AD converter are effected at the time span (optimum time: the order of 100 $\mu$s or less) of the peak hold window pulse and therefore, detection becomes easily possible even in the AD converter contained in the microcomputer. As the result, as in the fourteenth embodiment, it becomes possible to detect position aberration and effect the discrimination of the sort (type) of the sheet in all positions of the sheet.

(Other Embodiments)

While in the aforedescribed embodiments, there has been shown an example in which the present invention is applied to an electrophotographic type four-color laser printer as an image forming apparatus, the present invention is not restricted thereto, but may also be applied to an image forming apparatus such as a copying machine or a facsimile apparatus. Also, the printer is not restricted to a color printer, but may be a monochromatic printer. Further, the image forming method need not always be an electrophotographic one, but can also be applied to an image forming apparatus of the ink jet type or the like.

As described above, in an image forming apparatus having position aberration detecting means for detecting the position aberration of a sheet with respect to the sheet conveying direction, the position aberration detecting means has sheet detecting means serving also as sheet sort (type) detecting means for discriminating the sort (type) of a sheet being conveyed and therefore, without increasing the cost, there can be provided a technique which can reliably detect the sorts (types) of variable sheets in the image forming apparatus.

That is, there is constructed sheet sort (type) detecting means designed to detect side registration position aberration by the use, for example, of a contact image sensor, and correct an image signal, and using a contact image sensor instead of a sheet sort (type) detecting sensor and therefore, without increasing the cost, it becomes possible to use both of the simpler function of correcting the position aberration of a sheet being fed and the function of a sheet sort (type) detecting sensor. Further, it becomes possible to effect the detection of the sort (type) of the sheet in all positions of the sheet by the use of a contact image sensor, and it becomes possible to detect all sheets including an OHT with a band more accurately and reliably.

What is claimed is:

1. An image forming apparatus comprising:
   a conveying unit adapted to convey a sheet;
   an optical sensor providing a plurality of light receiving elements and adapted to optically detect an end portion of the sheet in a direction perpendicular to a conveying direction of the sheet;
   an aberration determining unit adapted to determine an aberration amount of the sheet position in the perpendicular direction on the basis of an output signal from said optical sensor;
   a controller adapted to control a write position of an image in the perpendicular direction on the basis of a determining result of said aberration determining unit; and
   a sheet type determining unit adapted to determine a type of the sheet on the basis of the output signal from said optical sensor.

2. An image forming apparatus according to claim 1, further comprising a size determining unit adapted to determine size of the sheet on the basis of the output signal from said optical sensor.

3. An image forming apparatus according to claim 1, further comprising a detector adapted to detect a leading edge of the sheet conveyed on the conveying path of the sheet to determine the write position of an image in the conveying direction of the sheet, and wherein said optical sensor is disposed upstream of said detector in the conveying path of the sheet.

4. An image forming apparatus according to claim 1, further comprising a detector adapted to detect a leading edge of the sheet conveyed on the conveying path of the sheet to determine the write position of an image in the conveying direction of said sheet, wherein said optical sensor is disposed downstream of said detector in the conveying path of the sheet.

5. An image forming apparatus according to claim 1, wherein said optical sensor comprises a plurality of modules.

6. An image forming apparatus according to claim 1, further comprising a plurality of said optical sensors arranged in said perpendicular direction.

7. An image forming apparatus according to claim 6, further comprising a first optical sensor for a sheet of a small definite size, and a second optical sensor for a sheet of a large definite size larger than the small size.

8. An image forming apparatus according to claim 1, wherein said sheet type determining unit determines the type of the sheet on the basis of intensity of the quantity of light received by said light receiving elements.

9. An image forming apparatus according to claim 8, wherein said sheet (type) determining unit determines that the sheet is glossy paper.

10. An image forming apparatus according to claim 8, wherein said sheet type determining unit determines that the sheet is an overhead transparency.

11. An image forming apparatus according to claim 8, wherein said sheet type determining unit determines that the sheet is an overhead transparency with a band for oil fixing.

12. An image forming apparatus according to claim 11, wherein an operation of the apparatus is stopped when said sheet type determining unit determines that the sheet is an overhead transparency with a band for oil fixing.

13. An image forming apparatus according to claim 1, further comprising a skew-feed determining unit adapted to determine on the basis of an output signal from said optical sensor that the sheet is skew-fed.

14. An image forming apparatus according to claim 1, wherein said optical sensor is disposed in a conveying path for both-side printing.

15. An image forming apparatus according to claim 12, further comprising a nonvolatile storing unit adapted to store jam information of the overhead transparency sheet with a band.

16. An image forming apparatus according to claim 1, wherein
   said optical sensor serially outputs an analog data signal,
   said apparatus further comprising:
   a binarizing comparator adapted to compare the analog data signal with a predetermined slice level voltage to generate a digital data signal,
   a pulse counter adapted to count a pulse of the digital data signal,
   wherein said aberration determining unit determines the aberration amount of the sheet position in the perpendicular direction on the basis of a count value of said pulse counter.

17. An image forming apparatus according to claim 1, wherein said optical sensor serially outputs an analog data signal, said apparatus further comprising a peak hold circuit adapted to sample a peak voltage of the analog data signal from said optical sensor,
   wherein said sheet type determining unit determines the type of the sheet on the basis of the peak voltage sampled by said peak hold circuit.

18. An image forming apparatus according to claim 1, wherein said optical sensor comprises a contact image sensor.

* * * * *

UNITED STATES PATENT AND TRADEMARK OFFICE
CERTIFICATE OF CORRECTION

PATENT NO. : 6,873,820 B2
DATED : March 29, 2005
INVENTOR(S) : Mitsugu Tanaka et al.

Figure 3:
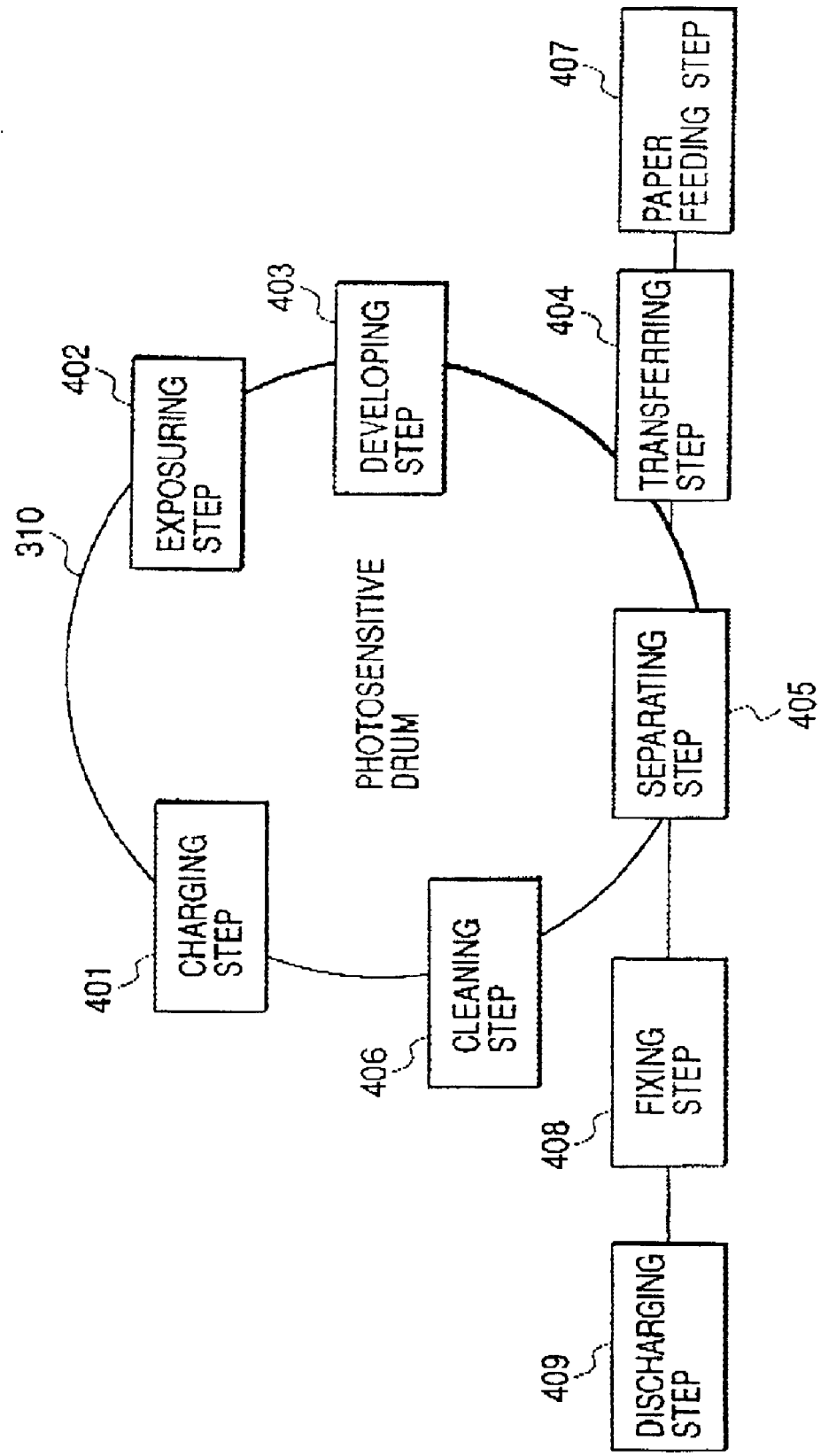
FIG. 3 shows the epitome of the printing process.

It is certified that error appears in the above-identified patent and that said Letters Patent is hereby corrected as shown below:

Drawings,
Sheet 3, Figure 3, "EXPOSURING" should read -- EXPOSING --.

Column 2,
Line 42, "mediums" should read -- medium --.

Column 3,
Line 46, "paper detection" should read -- paper (sheet) and informs a CPU 107 of the result of the detection --.

Column 9,
Line 14, "sows" should read -- shows --.
Line 63, "Fig. 15, an" should read -- Fig. 15, is an --.

Column 10,
Line 16, "are" should read -- as --.
Line 18, "as" should read -- are --.

Column 12,
Line 18, "Information" should read -- information --.
Line 22, "controller 302 In" should read -- controller 302. In --.

Column 13,
Line 1, "Inform" should read -- inform --.
Line 28, "stay" should read -- state --.

Column 14,
Line 24, "It" should read -- it --.

Column 16,
Line 41, "till" should read -- until --.

Column 17,
Line 20, "In" should read -- in --.
Line 26, "Immedi-" should read -- immedi- --.

Column 18,
Line 27, "till" should read -- until --.
Line 34, "sort of" should read -- sort (type) of --.
Line 39, "sort of" should read -- sort (type) of --.
Line 66, "Is" should read -- is --.

UNITED STATES PATENT AND TRADEMARK OFFICE
CERTIFICATE OF CORRECTION

PATENT NO. : 6,873,820 B2
DATED : March 29, 2005
INVENTOR(S) : Mitsugu Tanaka et al.

It is certified that error appears in the above-identified patent and that said Letters Patent is hereby corrected as shown below:

Column 19,
Line 18, "use" should read -- user --.

Column 21,
Line 27, "Is" should read -- is --.

Column 22,
Line 45, "thitherto" should read -- hitherto --.

Column 23,
Line 5 "read-can" should read -- read can --.
Line 19,"sort of" should read -- sort (type) of --.

Column 24,
Line 3, "sort of" should read -- sort (type) of --.

Signed and Sealed this

Twenty-third Day of August, 2005

JON W. DUDAS
*Director of the United States Patent and Trademark Office*